US012812362B2

(12) United States Patent
Elazzouni et al.

(10) Patent No.: US 12,812,362 B2
(45) Date of Patent: Nov. 24, 2026

(54) USER PLANE PROGRAMMABLE LAYER FOR RADIO COMMUNICATIONS

(71) Applicant: QUALCOMM Incorporated, San Diego, CA (US)

(72) Inventors: Sherif Elazzouni, San Diego, CA (US); Ozcan Ozturk, San Diego, CA (US); Gavin Bernard Horn, La Jolla, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 18/327,820

(22) Filed: Jun. 1, 2023

(65) Prior Publication Data

US 2024/0406714 A1 Dec. 5, 2024

(51) Int. Cl.
*H04W 8/24* (2009.01)
*H04L 1/1607* (2023.01)
(Continued)

(52) U.S. Cl.
CPC ............. *H04W 8/24* (2013.01); *H04L 1/1607* (2013.01); *H04W 28/0252* (2013.01);
(Continued)

(58) Field of Classification Search
CPC ....... H04W 4/50; H04W 76/10; H04W 48/16; H04W 60/00; H04W 8/24; H04W 88/085;
(Continued)

(56) References Cited

U.S. PATENT DOCUMENTS

| | | | | |
|---|---|---|---|---|
| 11,595,875 B2 * | 2/2023 | Huang | .................. | H04W 40/02 |
| 2019/0075552 A1 * | 3/2019 | Yu | ......................... | H04W 24/10 |

(Continued)

FOREIGN PATENT DOCUMENTS

| | | | |
|---|---|---|---|
| EP | 3913881 A1 * | 11/2021 | ............. H04L 69/22 |
| WO | WO-2019160298 A1 * | 8/2019 | ........ H04W 28/0252 |

(Continued)

OTHER PUBLICATIONS

Translation of WO-2023001173-A1 (Year: 2023).*

(Continued)

*Primary Examiner* — Matthew C Sams
(74) *Attorney, Agent, or Firm* — Holland & Hart LLP

(57) ABSTRACT

Methods, systems, and devices for wireless communications are described. A first wireless device may establish a user plane adaptation protocol (UPAP) with a second wireless device. Accordingly, when generating a message to transmit to the second wireless device, the first wireless device may use a UPAP layer entity to insert a main header and/or one or more service headers onto network layer traffic. The main header may be common to multiple deployments and the service header may be unique to each deployment and/or to each packet. The one or more service headers may be used to perform Quality of Service (QOS) handling, to expose UPAP programmability to services and gateway, to perform on-path header updates, to indicate instructions or rules, or any combination thereof.

27 Claims, 36 Drawing Sheets

(51) Int. Cl.

| | |
|---|---|
| ***H04W 28/02*** | (2009.01) |
| ***H04W 72/51*** | (2023.01) |
| ***H04W 72/566*** | (2023.01) |
| ***H04W 76/10*** | (2018.01) |

(52) U.S. Cl.
CPC ......... *H04W 72/51* (2023.01); *H04W 72/569* (2023.01); *H04W 76/10* (2018.02)

(58) Field of Classification Search
CPC ..... H04W 24/02; H04W 4/029; H04W 40/02; H04W 60/04; H04W 64/00; H04W 76/12; H04W 76/16; H04W 76/20; H04W 8/22; H04W 80/02; H04W 80/10; H04W 12/033; H04W 12/037; H04W 12/06; H04W 12/42; H04W 16/04; H04W 24/08; H04W 24/10; H04W 28/02; H04W 28/088; H04W 36/12; H04W 36/142; H04W 36/22; H04W 4/02; H04W 4/023; H04W 4/026; H04W 4/027; H04W 4/14; H04W 4/40; H04W 4/60; H04W 48/02; H04W 48/08; H04W 48/18; H04W 48/20; H04W 72/04; H04W 72/53; H04W 72/535; H04W 72/569; H04W 76/15; H04W 76/22; H04W 8/02; H04W 8/065; H04W 8/14; H04W 8/245; H04W 80/08; H04W 84/042; H04W 84/18; H04W 88/14; H04W 92/14; H04W 72/51; H04W 28/0252; H04L 41/5051; H04L 67/34; H04L 1/1607; H04L 12/4641; H04L 41/0803; H04L 41/40; H04L 41/5009; H04L 41/5025; H04L 41/5045; H04L 45/58; H04L 45/74; H04L 49/354; H04L 5/0044; H04L 67/10
See application file for complete search history.

(56) References Cited

U.S. PATENT DOCUMENTS

| | | | | |
|---|---|---|---|---|
| 2020/0367109 A1* | 11/2020 | Chen | .................... | H04W 28/18 |
| 2021/0185589 A1* | 6/2021 | Telang | .................. | H04W 48/02 |
| 2021/0345108 A1 | 11/2021 | Li et al. | | |
| 2022/0346161 A1 | 10/2022 | Poscher et al. | | |
| 2023/0319674 A1* | 10/2023 | Chen | .................... | H04W 76/10 370/328 |
| 2024/0163692 A1* | 5/2024 | Yuan | ...................... | H04W 8/22 |

FOREIGN PATENT DOCUMENTS

| | | | | |
|---|---|---|---|---|
| WO | WO-2021155942 A1 * | 8/2021 | ............ | H04W 48/08 |
| WO | WO-2023001173 A1 * | 1/2023 | ............. | H04L 67/34 |
| WO | WO-2023220147 A1 * | 11/2023 | ......... | H04L 41/0803 |

OTHER PUBLICATIONS

Dayalan U.K., et al., "Prototyping a Fine-Grained QoS Framework for 5G and NextG Networks Using Powder", 18th International Conference on Distributed Computing in Sensor Systems (DCOSS), IEEE, May 30, 2022, pp. 416-419, XP034185802.
Huawei, et al., "Flow Based QoS Framework for E-UTRA Connected to 5GC", R2-1708400, 3GPP TSG-RAN WG2 Meeting #99, 3rd Generation Partnership Project Mobile Competence Centre, 650, Route Des Lucioles, F-06921 Sophia-Antipolis CE, vol. RAN WG2, No. Berlin, Germany, Aug. 21, 2017-Aug. 25, 2017, Aug. 20, 2017, XP051318264, Section 2.1, Section 2.3, Figures 1, 3, 6 Pages.
International Search Report and Written Opinion—PCT/US2024/029761—ISA/EPO—Oct. 1, 2024.

* cited by examiner

500

1300

USER PLANE PROGRAMMABLE LAYER FOR RADIO COMMUNICATIONS

INTRODUCTION

The following relates to wireless communications, including a user plane programmable layer.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communications by a network entity is described. The method may include transmitting, from the network entity to a logical unit, a capability message that indicates that the network entity supports instructions for a service associated with a radio layer for wireless communication with one or more UEs, establishing, with the logical unit, a data session associated with a UE of the one or more UEs based on transmitting the capability message, receiving, from the logical unit, an instruction for performing a radio function associated with the service with the UE based on the data session, and executing the instruction for performing the radio function at the radio layer.

A network entity is described. The network entity may include one or more processors, and one or more memories coupled with the one or more processors and storing processor-executable code that, when executed by the one or more processors, is configured to cause the network entity to: transmit, from the network entity to a logical unit, a capability message that indicates that the network entity supports instructions for a service associated with a radio layer for wireless communication with one or more UEs, establish, with the logical unit, a data session associated with a UE of the one or more UEs based on transmitting the capability message, receive, from the logical unit, an instruction for performing a radio function associated with the service with the UE based on the data session, and execute the instruction for performing the radio function at the radio layer.

Another network entity is described. The network entity may include means for transmitting, from the network entity to a logical unit, a capability message that indicates that the network entity supports instructions for a service associated with a radio layer for wireless communication with one or more UEs, means for establishing, with the logical unit, a data session associated with a UE of the one or more UEs based on transmitting the capability message, means for receiving, from the logical unit, an instruction for performing a radio function associated with the service with the UE based on the data session, and means for executing the instruction for performing the radio function at the radio layer.

A non-transitory computer-readable medium storing code for wireless communications by a network entity is described. The code may include instructions executable by one or more processors to cause the network entity to transmit, from the network entity to a logical unit, a capability message that indicates that the network entity supports instructions for a service associated with a radio layer for wireless communication with one or more UEs, establish, with the logical unit, a data session associated with a UE of the one or more UEs based on transmitting the capability message, receive, from the logical unit, an instruction for performing a radio function associated with the service with the UE based on the data session, and execute the instruction for performing the radio function at the radio layer.

Some examples of the method, network entities, and non-transitory computer-readable medium described herein may further include operations, features, means, or instructions for receiving a first message including the instruction, a packet, and a header, establishing, with the UE, a data radio bearer based on the data session, transmitting a second message including a first radio link control service data unit based on establishing the data radio bearer with the UE, where the first radio link control service data unit includes the packet and the header, receiving a third message including a second radio link control service data unit based on the second message, where the second radio link control service data unit includes the header and a response for the packet, embedding a header in a fourth message, where the fourth message includes a response for the packet, and transmitting a fourth message based on the instruction, and where the instruction may be executed after receiving the third message.

In some examples of the method, network entities, and non-transitory computer-readable medium described herein, the fourth message includes a service header associated with a flow between the UE and the logical unit and the service header includes a parameter based on the instruction.

Some examples of the method, network entities, and non-transitory computer-readable medium described herein may further include operations, features, means, or instructions for receiving a first message including the instruction and a packet, where executing the instruction may be based on the first message, establishing, with the UE, a data radio bearer based on the data session, and transmitting a second message including the packet based on establishing the data radio bearer with the UE and the instruction, where the instruction may be executed before transmitting the second message.

In some examples of the method, network entities, and non-transitory computer-readable medium described herein, the logical unit includes a second network entity.

A method for wireless communications by a network entity is described. The method may include transmitting, to a logical unit, a capability message that indicates a service that the network entity supports, establishing, with the logical unit, a data session associated with a flow between the logical unit and a UE based on transmitting the capability message, establishing, with the UE, a data radio bearer associated with the flow based on the data session, receiving, from the logical unit, a first message associated with the flow including a first header associated with a first layer based on the data session with the logical unit, generating a radio link control service data unit that includes a second header associated with the first layer based on the first header and one or more radio functions of the network entity, and transmitting, via the data radio bearer, a second message including the radio link control service data unit.

A network entity is described. The network entity may include one or more processors, and one or more memories coupled with the one or more processors and storing processor-executable code that, when executed by the one or more processors, is configured to cause the first UE to: transmit, to a logical unit, a capability message that indicates a service that the network entity supports, establish, with the logical unit, a data session associated with a flow between the logical unit and a UE based on transmitting the capability message, establish, with the UE, a data radio bearer associated with the flow based on the data session, receive, from the logical unit, a first message associated with the flow including a first header associated with a first layer based on the data session with the logical unit, generate a radio link control service data unit that includes a second header associated with the first layer based on the first header and one or more radio functions of the network entity, and transmit, via the data radio bearer, a second message including the radio link control service data unit.

Another network entity is described. The network entity may include means for transmitting, to a logical unit, a capability message that indicates a service that the network entity supports, means for establishing, with the logical unit, a data session associated with a flow between the logical unit and a UE based on transmitting the capability message, means for establishing, with the UE, a data radio bearer associated with the flow based on the data session, means for receiving, from the logical unit, a first message associated with the flow including a first header associated with a first layer based on the data session with the logical unit, means for generating a radio link control service data unit that includes a second header associated with the first layer based on the first header and one or more radio functions of the network entity, and means for transmitting, via the data radio bearer, a second message including the radio link control service data unit.

A non-transitory computer-readable medium storing code for wireless communications by a network entity is described. The code may include instructions executable by one or more processors to cause the network entity to transmit, to a logical unit, a capability message that indicates a service that the network entity supports, establish, with the logical unit, a data session associated with a flow between the logical unit and a UE based on transmitting the capability message, establish, with the UE, a data radio bearer associated with the flow based on the data session, receive, from the logical unit, a first message associated with the flow including a first header associated with a first layer based on the data session with the logical unit, generate a radio link control service data unit that includes a second header associated with the first layer based on the first header and one or more radio functions of the network entity, and transmit, via the data radio bearer, a second message including the radio link control service data unit.

In some examples of the method, network entities, and non-transitory computer-readable medium described herein, the first message includes a main header and a first service header associated with a service and the second message includes the main header, the first service header, and a second service header associated with a radio function of the network entity.

Some examples of the method, network entities, and non-transitory computer-readable medium described herein may further include operations, features, means, or instructions for receiving, from the logical unit, a set of multiple messages including the first message, each of the set of multiple messages including a service header associated with the service and performing prioritization on the set of multiple messages based on the respective service headers, where transmitting the second message may be based on the prioritization.

Some examples of the method, network entities, and non-transitory computer-readable medium described herein may further include operations, features, means, or instructions for modifying the first service header based on an instruction received from a second logical unit, where transmitting the second message may be based on the modified first service header.

In some examples of the method, network entities, and non-transitory computer-readable medium described herein, the first message includes a set of service headers including the first service header and the method, apparatuses, and non-transitory computer-readable medium may include further operations, features, means, or instructions for adding a third service header to the second message based on an instruction received from a second logical unit.

In some examples of the method, network entities, and non-transitory computer-readable medium described herein, the first message includes a set of service headers including the first service header, the second message includes a subset of the set of service headers including the first service header, and the subset of the set of service headers excludes at least one service header of the set of service headers.

In some examples of the method, network entities, and non-transitory computer-readable medium described herein, the first header includes an indication that the first message may be to be processed by the network entity prior to generating the radio link control service data unit and the second header may be based on the indication that the first message may be to be processed by the network entity.

In some examples of the method, network entities, and non-transitory computer-readable medium described herein, the first header includes an identifier of the network entity, an instruction, a measurement, information about the data session, or any combination thereof.

In some examples of the method, network entities, and non-transitory computer-readable medium described herein, the logical unit includes a second network entity, a User Plane Function, or both.

A method for wireless communications by a logical unit is described. The method may include receiving a capability message indicating that a network entity supports instructions for a service associated with a radio layer for wireless communication with a UE, establishing a data session associated with a flow between the logical unit and the UE based on the capability message, transmitting a first message associated with the flow and including a main header, a service header associated with a first layer, an indication that the service header is to be processed by the network entity, and an instruction for performing a radio function associated with the service with the UE, and receiving a second message associated with the flow and including the main header based on the first message.

A logical unit is described. The logical unit may include one or more processors, and one or more memories coupled with the one or more processors and storing processor-executable code that, when executed by the one or more processors, is configured to cause the first UE to: receive a capability message indicating that a network entity supports instructions for a service associated with a radio layer for wireless communication with a UE, establish a data session associated with a flow between the logical unit and the UE based on the capability message, transmit a first message associated with the flow and including a main header, a service header associated with a first layer, an indication that the service header is to be processed by the network entity, and an instruction for performing a radio function associated with the service with the UE, and receive a second message associated with the flow and including the main header based on the first message.

Another logical unit is described. The logical unit may include means for receiving a capability message indicating that a network entity supports instructions for a service associated with a radio layer for wireless communication with a UE, means for establishing a data session associated with a flow between the logical unit and the UE based on the capability message, means for transmitting a first message associated with the flow and including a main header, a service header associated with a first layer, an indication that the service header is to be processed by the network entity, and an instruction for performing a radio function associated with the service with the UE, and means for receiving a second message associated with the flow and including the main header based on the first message.

A non-transitory computer-readable medium storing code for wireless communications by a logical unit is described. The code may include instructions executable by one or more processors to cause the logical unit to receive a capability message indicating that a network entity supports instructions for a service associated with a radio layer for wireless communication with a UE, establish a data session associated with a flow between the logical unit and the UE based on the capability message, transmit a first message associated with the flow and including a main header, a service header associated with a first layer, an indication that the service header is to be processed by the network entity, and an instruction for performing a radio function associated with the service with the UE, and receive a second message associated with the flow and including the main header based on the first message.

In some examples of the method, logical units, and non-transitory computer-readable medium described herein, the indication that the service header may be to be processed by the network entity includes an indication to perform the processing prior to generating a service data unit associated with a radio link control layer, an indication to insert the service header into the first message, or both.

In some examples of the method, logical units, and non-transitory computer-readable medium described herein, the service header includes an identifier of the network entity, a second instruction, a measurement, or any combination thereof.

In some examples of the method, logical units, and non-transitory computer-readable medium described herein, the logical unit includes a second network entity, a User Plane Function, or both.

A method for wireless communications is described. The method may include generating a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE, generating a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other, and outputting one or more messages including the first service data unit and the second service data unit.

An apparatus is described. The apparatus may include one or more processors, and one or more memories coupled with the one or more processors and storing processor-executable code that, when executed by the one or more processors, is configured to cause the first UE to: generate a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE, generate a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other, and output one or more messages including the first service data unit and the second service data unit.

Another apparatus is described. The apparatus may include means for generating a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE, means for generating a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other, and means for outputting one or more messages including the first service data unit and the second service data unit.

A non-transitory computer-readable medium storing code for wireless communications by an apparatus is described. The code may include instructions executable by one or more processors to cause the apparatus to generate a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE, generate a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other, and output one or more messages including the first service data unit and the second service data unit.

Some examples of the method, apparatuses, and non-transitory computer-readable medium described herein may further include operations, features, means, or instructions for establishing, with the UE, a data radio bearer, where the one or more messages may be output by a network entity and may be based on establishing the data radio bearer with the UE.

Some examples of the method, apparatuses, and non-transitory computer-readable medium described herein may further include operations, features, means, or instructions for establishing, with a network entity, a data radio bearer, where the one or more messages may be output by the UE and may be based on establishing the data radio bearer with the network entity.

Some examples of the method, apparatuses, and non-transitory computer-readable medium described herein may further include operations, features, means, or instructions for obtaining a first message including the first packet, the first main header, and the first service header and modifying the first service header based on the first message, where the first service data unit may be generated based on the modified first service header.

Some examples of the method, apparatuses, and non-transitory computer-readable medium described herein may further include operations, features, means, or instructions for modifying the first service header includes updating a timestamp.

Some examples of the method, apparatuses, and non-transitory computer-readable medium described herein may further include operations, features, means, or instructions for obtaining a first message including the first packet, the first main header, the first service header, and a third service header associated with a second service and removing the third service header for generation of the first service data unit such that the first service data unit excludes the third service header.

Some examples of the method, apparatuses, and non-transitory computer-readable medium described herein may further include operations, features, means, or instructions for obtaining a first message including the first packet, the first main header, and the first service header and adding a third service header for generation of the first service data unit such that the first service data unit includes the third service header, where the first message excludes the third service header.

In some examples of the method, apparatuses, and non-transitory computer-readable medium described herein, the first service header, the second service header, or both include an instruction.

In some examples of the method, apparatuses, and non-transitory computer-readable medium described herein, the instruction indicates that an acknowledgement may be to be sent upon receipt of the one or more messages, that packets associated with the one or more messages may be to be reordered according to an arrangement indicated by the instruction, that the packets associated with the one or more messages may be to be dropped after a threshold time, that the packets associated with the one or more messages may be to be timestamped, or any combination thereof.

In some examples of the method, apparatuses, and non-transitory computer-readable medium described herein, the first service header includes a reordering timer, a reordering domain, an indication to drop the first packet after the reordering timer expires, an indication to transmit acknowledgement feedback for the first packet, or any combination thereof.

In some examples of the method, apparatuses, and non-transitory computer-readable medium described herein, the first main header and the second main header each include a data control flag, a header length, a sequence number, information associated with extension fields, or any combination thereof.

A method for wireless communications is described. The method may include communicating a first message that includes a first service data unit associated with a radio link control layer, deriving, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE, generating a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header, and communicating a second message that includes the second service data unit.

An apparatus is described. The apparatus may include one or more processors, and one or more memories coupled with the one or more processors and storing processor-executable code that, when executed by the one or more processors, is configured to cause the first UE to: communicate a first message that includes a first service data unit associated with a radio link control layer, derive, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE, generate a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header, and communicate a second message that includes the second service data unit.

Another apparatus is described. The apparatus may include means for communicating a first message that includes a first service data unit associated with a radio link control layer, means for deriving, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE, means for generating a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header, and means for communicating a second message that includes the second service data unit.

A non-transitory computer-readable medium storing code for wireless communications by an apparatus is described. The code may include instructions executable by one or more processors to cause the apparatus to communicate a first message that includes a first service data unit associated with a radio link control layer, derive, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE, generate a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header, and communicate a second message that includes the second service data unit.

Some examples of the method, apparatuses, and non-transitory computer-readable medium described herein may further include operations, features, means, or instructions for establishing, with the UE, a data radio bearer, where the first message may be communicated, and the second message may be output, by a network entity and may be based on establishing the data radio bearer with the UE.

Some examples of the method, apparatuses, and non-transitory computer-readable medium described herein may further include operations, features, means, or instructions for establishing, with a network entity, a data radio bearer, where the first message may be communicated, and the second message may be output, by the UE and may be based on establishing the data radio bearer with the network entity.

In some examples of the method, apparatuses, and non-transitory computer-readable medium described herein, the first service header includes an instruction and the method, apparatuses, and non-transitory computer-readable medium may include further operations, features, means, or instructions for executing the instruction, where generating the second service data unit may be based on the instruction.

In some examples of the method, apparatuses, and non-transitory computer-readable medium described herein, the first service header includes information about the first packet, a reordering timer, a reordering domain, an indication to drop the first packet after the reordering timer expires, an indication to transmit acknowledgement feedback for the first packet, or any combination thereof.

In some examples of the method, apparatuses, and non-transitory computer-readable medium described herein, the first main header and the second main header each include a data control flag, a header length, a sequence number, information associated with extension fields, or any combination thereof.

DETAILED DESCRIPTION

Figure 1:
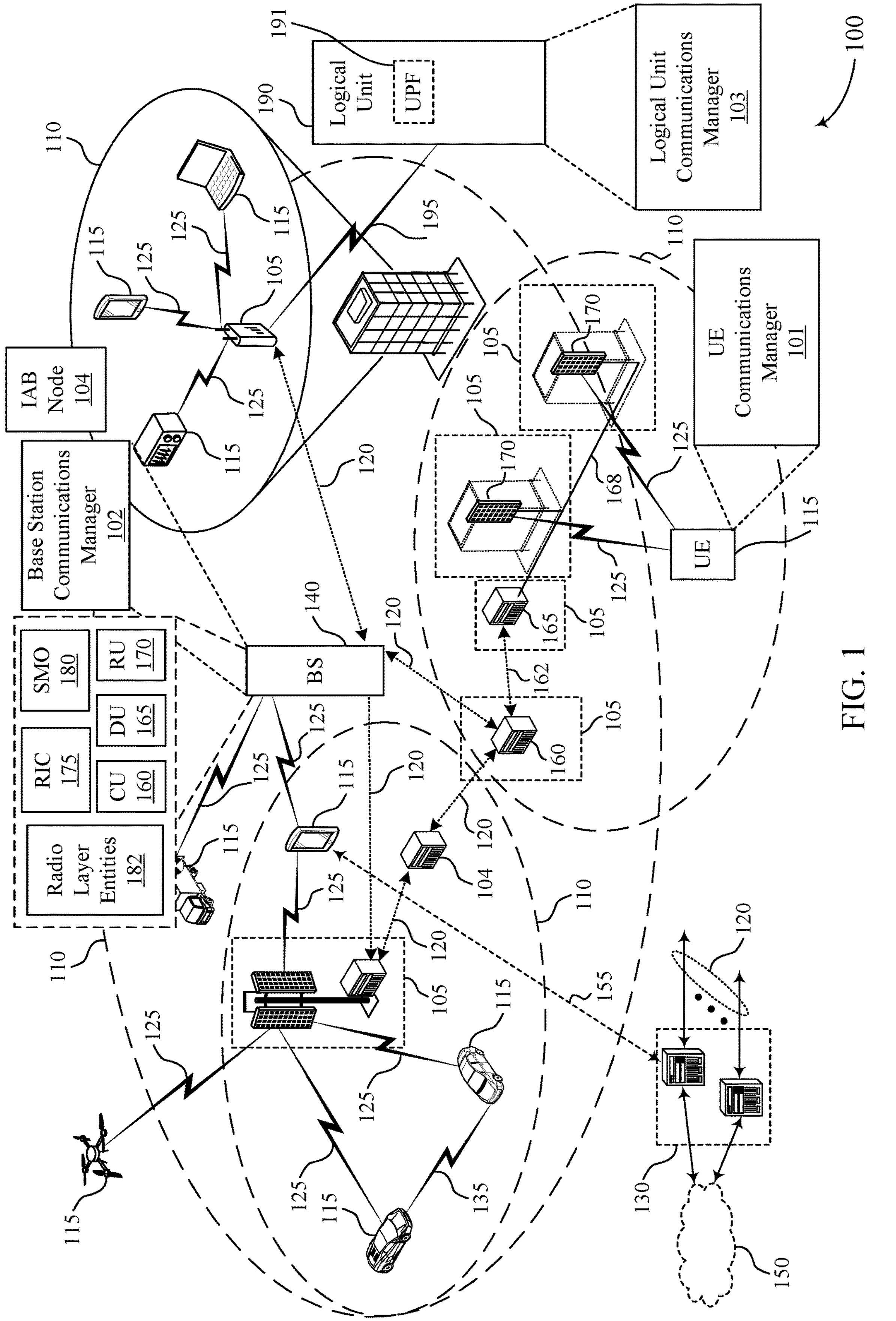
FIG. 1 shows an example of a wireless communications system that supports user plane programmable layer for radio communications in accordance with one or more aspects of the present disclosure.

In some examples, a network may include one or more logical units (e.g., a User Plane Function (UPF), a central unit (CU), a distributed unit (DU)). The CU may be configured to communicate with the UPF and the DU, and the DU may be configured to communicate with user equipments (UEs), other DUs, or both. The UPF may be configured to communicate user traffic (e.g., data) with external networks and may communicate network layer traffic (e.g., internet protocol (IP) packets) with the CU. The CU may include a service data adaptation protocol (SDAP) layer entity that performs Quality of Service (QOS) flow handling. For instance, the SDAP may map between a QoS flow associated with the network layer traffic and a data radio bearer (DRB) and may insert a header onto each packet of the network layer traffic. A flow may refer to a path between components (e.g., between a data network and a UE) associated with a data session, where a data session may refer to a logical connection between a UE and a UPF or a logical unit associated with a service. A data radio bearer may refer to a channel for the transfer of user data between a UE and a network entity. In some examples, the SDAP layer entity may perform flow-specific QoS handling. For instance, each packet of network layer traffic (e.g., each IP packet) associated with a same QoS may have a same SDAP header. Having the same SDAP header may result in a lack of programmability and service adaptability. Additionally, two packets associated with different deployments (e.g., a first packet associated with an Internet of Things (IoT) deployment and a second packet associated with an extended reality (XR) deployment) may have SDAP headers that have the same fields (e.g., a format of the SDAP headers may be statically configured for any of a number of deployments). For instance, both SDAP headers may have a data/control field and/or a reserved field. However, some information in the SDAP header used for one deployment may be unused for another deployment. Thus, the SDAP header may have unnecessary overhead for at least some deployments.

The present disclosure describes techniques that may enable increased programmability and service adaptability and/or may enable decreased overhead for at least some deployments as compared to others. For instance, a network entity (e.g., a DU) may include radio layer entities, including a user plane adaptation protocol (UPAP) layer entity, a radio link control (RLC) layer entity, a medium access control (MAC) layer entity, and a physical (PHY) layer entity. The UPAP layer entity may replace one or more functionalities of the SDAP layer entity and/or a packet data convergence protocol (PDCP) layer entity of a CU, where the CU is configured to provide packets between the network entity and a logical unit (e.g., a UPF). By replacing these one or more functionalities, utilizing the UPAP may enable the network entity to communicate directly with the logical unit (e.g., to communicate directly with the UPF instead of via the CU). Additionally, the UPAP layer entity may have functionalities that may have increased flexibility relative to SDAP layer entities and PDCP layer entities.

For instance, some of the functionalities performed by the UPAP layer entity may include performing QoS handling and inserting headers onto network layer traffic packets, such as a main header (e.g., common to multiple deployments and/or multiple packets, such as IoT and XR) and, optionally, one or more service headers (e.g., headers that are unique between deployments and/or between packets). For instance, no service header may be inserted on an IP packet associated with IoT, whereas a service header may be inserted on an IP packet associated with XR. Thus, the overhead associated with the UPAP header for the IP packet associated with IoT may be decreased as compared to XR. Additionally, as the service headers may vary between packets, the service headers may include unique fields, unique values within the same field, executable instructions, or any combination thereof that may enable different packets of network layer traffic to be treated differently (e.g., by any of the radio layer entities at the network entity).

In some examples, having the UPAP layer at the network entity (e.g., the DU) may enable a logical unit associated with a service to more directly interact with radio layers (e.g., UPAP, RLC, MAC, PHY). A service may refer to an operation that an external network (e.g., an external network distinct from a network that includes the network entity) may perform with the aid of a UE and/or a network entity. In some examples, a logical unit associated with a service may program the network entity to perform a function using a service interface. For instance, the logical unit may transmit an indication of instructions for performing a radio function to the network entity. In some examples, the instructions may refer to executable code, a set of rules, values of parameters, or any combination thereof that a wireless device may use in order adjust its operation. The radio function may be defined as the functions performed by radio layer entities (e.g., UPAP layer entities, RLC layer entities, MAC layer entities, PHY layer entities). Thus, using the UPAP layer may enable a more diverse range of functionalities that a network entity may perform.

In some examples, the logical unit (e.g., UPF) may include some or all of the functionalities of the UPAP layer. For instance, the logical unit may include a UPAP layer entity, in which case the network entity may not include a UPAP layer entity. Alternatively, the logical unit may include a high UPAP layer entity and the network entity may include a low UPAP layer entity, where the high UPAP layer entity may perform tasks such as header compression and ciphering, and where the low UPAP layer entity may be used to perform operations on high UPAP headers such as amending, modifying, or removing high UPAP headers In some examples, the low UPAP layer entity may be programmed through an inter-UPAP interface between the logical unit and the network entity.

Aspects of the disclosure are initially described in the context of wireless communications systems. Additional aspects of the disclosure are described in the context of upper plane architectures, a UPAP Protocol Data Unit (PDU), UPAP headers, layer architectures, process flows, a service header timestamping scheme, and a reordering scheme. Aspects of the disclosure are further illustrated by and described with reference to apparatus diagrams, system diagrams, and flowcharts that relate to user plane programmable layer for radio communications.

FIG. 1 shows an example of a wireless communications system 100 that supports user plane programmable layer for radio communications in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, a NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), SDAP, PDCP). The CU 160 may be connected to one or more DUs 165 or RUs 170, and the one or more DUs 165 or RUs 170 may host lower protocol layers, such as layer 1 (L1) (e.g., PHY) layer) or L2 (e.g., RLC layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support user plane programmable layer for radio communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). It should be understood that although a portion of FR1 is greater than 6 GHZ, FR1 is often referred to (interchangeably) as a "Sub-6 GHZ" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. IP connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a UPF). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHZ.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques described herein, in addition to or as an alternative to be carried out between UEs 115 and network entities 105, may be implemented via additional or alternative wireless devices, including IAB nodes 104, DUs 165, CUs 160, radio units (RUS) 170, and the like. For example, in some implementations, aspects described herein may be implemented in the context of a disaggregated RAN architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more network entities 105 may include CUs 160, DUs 165, and RUs 170 and may be referred to as donor network entities 105 or IAB donors. One or more DUs 165 (e.g., and/or RUs 170) associated with a donor network entity 105 may be partially controlled by CUs 160 associated with the donor network entity 105. The one or more donor network entities 105 (e.g., IAB donors) may be in communication with one or more additional network entities 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network entities 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, PHY, etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a network entity 105 may additionally or alternatively be performed by components of the disaggregated RAN architecture (e.g., IAB nodes, DUs, CUs, etc.).

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, a network may include one or more logical units 190 (e.g., a UPF 191, a CU 160, a DU 165). The CU may be configured to communicate with the UPF and the DU, and the DU may be configured to communicate with a UE 115, other DUs, or both. The UPF 191 may be configured to communicate user traffic (e.g., data) with external networks and may communicate network layer traffic (e.g., IP packets) with the CU. The CU may include an SDAP layer entity that performs QoS flow handling. For instance, the SDAP may map between a QoS flow associated with the network layer traffic and a data radio bearer and may insert a header onto each packet of the network layer traffic. In some examples, the SDAP layer entity may perform flow-specific QoS handling. For instance, each packet of network layer traffic (e.g., each IP packet) associated with a same QoS may have a same SDAP header. Having the same SDAP header may result in a lack of programmability and service adaptability. Additionally, two packets associated with different deployments (e.g., a first packet associated with an IoT and a second packet associated with an XR deployments) may have SDAP headers that have the same fields. However, some information in the SDAP header used for one deployment may be unused for another deployment. Thus, the SDAP header may have unnecessary overhead for at least some deployments.

The present disclosure describes techniques that may enable increased programmability and service adaptability and/or may enable decreased overhead for at least some deployments as compared to others. For instance, a network entity 105 (e.g., a network entity with a DU) may include radio layer entities 182, including a UPAP layer entity, a RLC layer entity, a MAC layer entity, and a PHY layer entity. The UPAP layer entity may replace one or more functionalities of the SDAP layer entity and/or a PDCP layer entity of a CU, where the CU is configured to provide packets between the network entity and a logical unit 190 (e.g., a UPF 191). By replacing these one or more functionalities, utilizing the UPAP may enable the network entity to communicate directly with the logical unit (e.g., to communicate directly with the UPF instead of via the CU). Additionally, the UPAP layer entity may have functionalities that may have increased flexibility relative to SDAP layer entities and PDCP layer entities.

For instance, some of the functionalities performed by the UPAP layer entity may include performing QoS handling and inserting headers onto network layer traffic packets, such as a main header (e.g., common to multiple deployments and/or multiple packets, such as IoT and XR) and, optionally, one or more service headers (e.g., headers that are unique between deployments and/or between packets). For instance, no service header may be inserted on an IP packet associated with IoT, whereas a service header may be inserted on an IP packet associated with XR. Thus, the overhead associated with the UPAP header for the IP packet associated with IoT may be decreased as compared to XR. Additionally, as the service headers may vary between packets, the service headers may include unique fields, unique values within the same field, executable instructions, or any combination thereof that may enable different packets of network layer traffic to be treated differently (e.g., by any of the radio layer entities at the network entity).

In some examples, having the UPAP layer at the network entity 105 (e.g., the DU) may enable a logical unit 190 associated with a service to more directly interact with radio link layers (e.g., UPAP, RLC, MAC, PHY). For instance, a logical unit 190 associated with a service may program the network entity 105 (e.g., via link 195) to perform a function using a service interface. In some cases, the logical unit 190 may transmit instructions for performing a radio function to the network entity 105. Thus, using the UPAP layer may enable a more diverse range of functionalities that a network entity 105 may perform.

In some examples, the UPF 191 may include some or all of the functionalities of the UPAP layer. For instance, the UPF 191 may include a UPAP layer entity, in which case the network entity 105 may not include a UPAP layer entity. Alternatively, the UPF 191 may include a high UPAP layer entity and the network entity 105 may include a low UPAP layer entity, where the high UPAP layer entity may perform tasks such as header compression and ciphering, and where the low UPAP layer entity may be used to perform operations on high UPAP headers such as amending, modifying, or removing high UPAP headers In some examples, the low UPAP layer entity may be programmed through an inter-UPAP interface between the UPF 191 and the network entity 105.

UE communications manager 101 and/or base station communications manager 102 may be configured to generate a first service data unit associated with a first radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit 190 and a UE 115; to generate a second service data unit associated with the radio link control layer, the second service data unit including a second packet, a second main header associated with the first layer, and a second service header for the second packet associated with the service, where each of the second main header and the second service header are associated with the flow between the logical unit 190 and the UE, and where the first service header and the second service header are distinct from each other; and to output one or more messages including the first service data unit and the second service data unit.

Additionally or alternatively, UE communications manager 101 and/or base station communications manager 102 may be configured to communicate a first message that includes a first service data unit associated with a radio link control layer; derive, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit 190 and a UE 115; to generate a second service data unit associated with the radio link control layer and including a second packet, a second main header, and a second service header associated with the service, where each of the second main header and the second service header are associated with the flow between the logical unit 190 and the UE 115, where the second service header is based on the first service header and the second service header is distinct from the first service header; and to communicate a second message that includes the second service data unit.

Base station communications manager 102 may be configured to transmit, to a logical unit 190, a capability message that indicates that the base station 140 supports instructions for a service associated with a radio layer for wireless communication with one or more UEs 115; to establish, with the logical unit 190, a data session associated with a UE 115 of the one or more UEs 115 based on transmitting the capability message; to receive, from the logical unit 190, an instruction to perform a radio function associated with the service with the UE based on the data session; and execute the instruction to perform the radio function at the radio layer.

Additionally or alternatively, base station communications manager 102 may be configured to transmit, to a logical unit 190, a capability message that indicates a service that the base station 140 supports; to establish, with the logical unit 190, a data session associated with a flow between the logical unit 190 and a UE 115 based on transmitting the capability message; to establish, with the UE 115, a data radio bearer associated with the flow based on the data session; to receive, from the logical unit 190, a first message associated with the flow including a first header associated with a first layer based on the data session with the logical unit 190; to generate a radio link control service data unit that includes a second header associated with the first layer based on the first header and one or more radio functions of the base station 140; and to transmit, via the data radio bearer, a second message including the radio link control service data unit.

Logical unit communications manager 103 may be configured to receive a capability message indicating that a network entity 105 supports instructions for a service associated with a radio layer for wireless communication with a UE 115; to establish a data session associated with a flow between a logical unit 190 and a UE 115; to transmit a first message associated with the flow and including a main header, a service header associated with a first layer, an indication that the service header is to be processed by the network entity 105, and an instruction to perform a radio function associated with the UE 115; and to receive a second message associated with the flow and including the main header based on the first message.

Figure 2A:
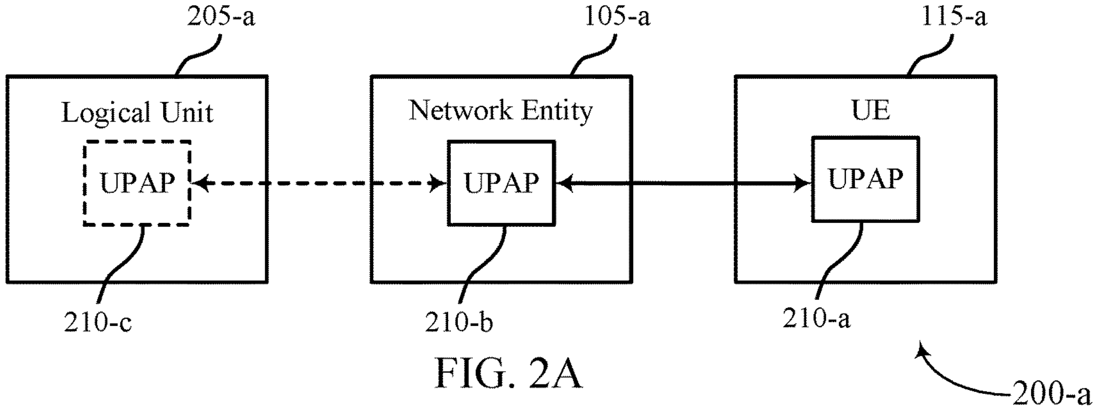
FIGS. 2A, 2B, and 2C show examples of wireless communications systems that supports user plane programmable layer for radio communications in accordance with one or more aspects of the present disclosure.
Figure 2B:
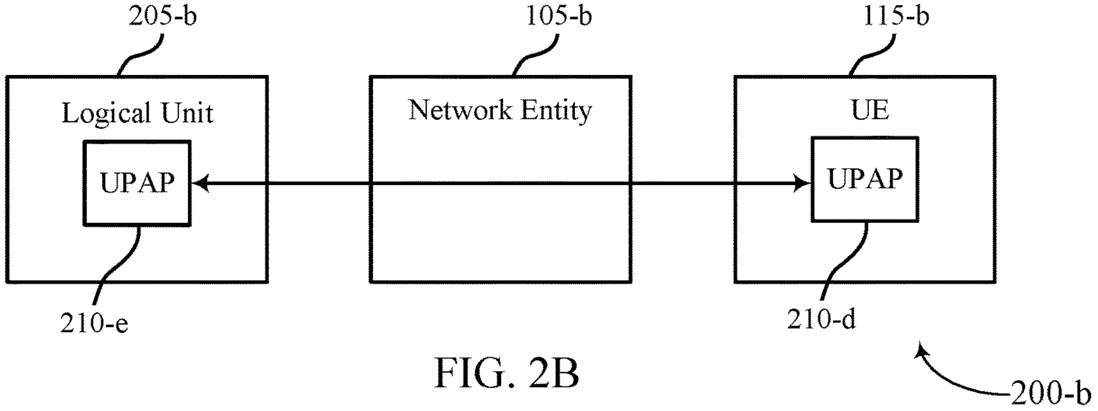
Figure 2C:
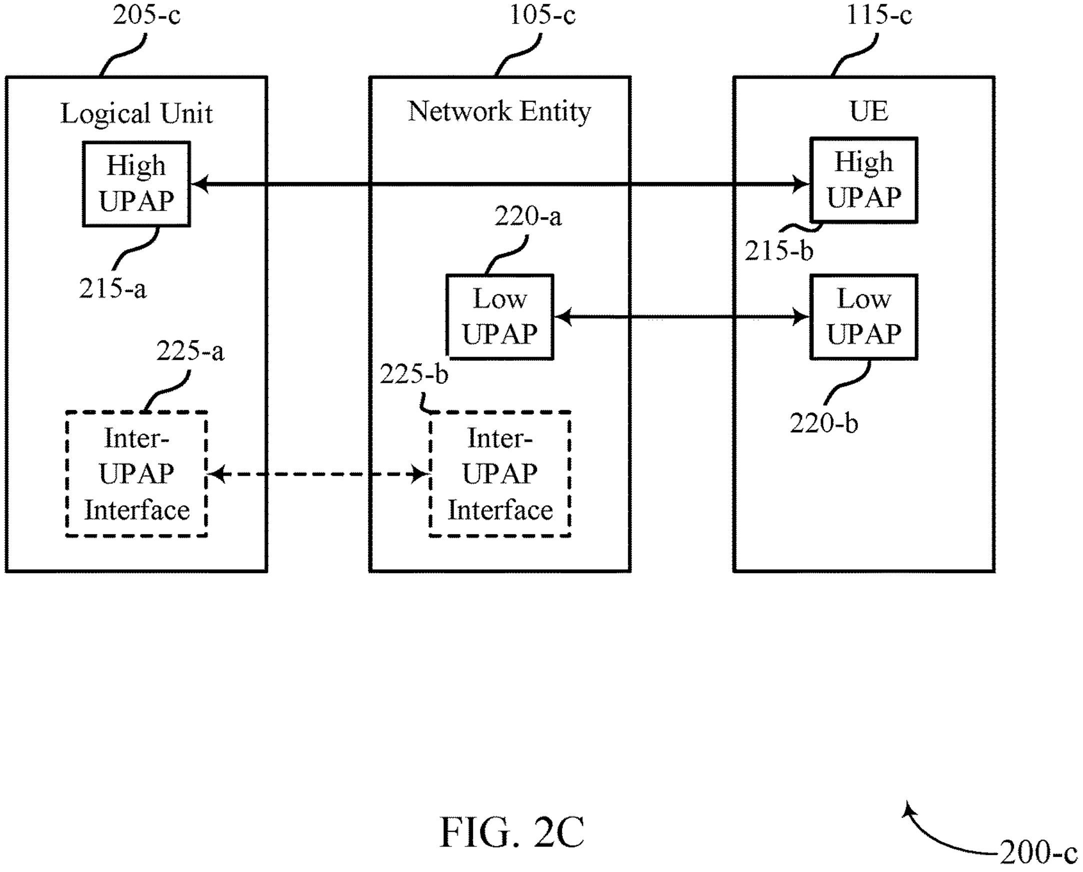

FIG. 2A through 2C show examples of wireless communications systems 200-*a*, 200-*b*, and 200-*c* that support a user programmable layer for radio communications in accordance with one or more aspects of the present disclosure. In some examples, wireless communications systems 200-*a*, 200-*b*, and 200-*c* may implement one or more aspects of wireless communications system 100. For instance, network entities 105-*a*, 105-*b*, and 105-*c* may each be an example of a network entity 105 and/or a DU 165 as described with reference to FIG. 1 and UEs 115-*a*, 115-*b*, and 115-*c* may each be an example of a UE 115 as described with reference to FIG. 1. In some examples, logical units 205-*a*, 205-*b*, and 205-*c* may each be an example of a network entity 105 as described with reference to FIG. 1. In some examples, logical units 205-*a*, 205-*b*, and 205-*c* may each be an example of a logical unit 190 (e.g., a UPF) as described with reference to FIG. 1, and/or a DU 165 as described with reference to FIG. 1.

In wireless communications system 200-*a*, logical unit 205-*a* may be configured to communicate with network entity 105-*a* and network entity 105-*a* may be configured to communicate with UE 115-*a*. Additionally, network entity 105-*a* may establish UPAP with UE 115-*a*. For instance, network entity 105-*a* may have a UPAP layer entity 210-*b* and UE 115-*a* may have UPAP layer entity 210-*a*. Additionally, in some examples, logical unit 205-*a* may establish UPAP with network entity 105-*a*. For instance, logical unit 205-*a* may have UPAP layer entity 210-*c*. In some examples, the UPAP configuration may be dependent on the radio link, which may enable the radio protocols to be abstracted from the UPF service. In some examples, the UPAP may be used for packet forwarding (e.g., in architectures that employ or are similar to IAB). In some examples, network entity 105-*a* may support establishing multiple UPAP layer entities for a single data session deployment, which may be described in more detail herein, for instance, with reference to FIGS. 4A and 4B. Additional details about examples in which network entity 105-*a* and UE 115-*a* establish UPAP layer entities may be described herein, for instance, with reference to FIGS. 3A, 3B, 7A-7D, and 8.

In wireless communications system 200-*b*, logical unit 205-*b* may be configured to communicate with network entity 105-*b* and network entity 105-*b* may be configured to communicate with UE 115-*b*. In some examples, logical unit 205-*b* may include some or all functionalities of the UPAP layer. For instance, logical unit 205-*b* (e.g., a UPF, a DU, a network entity) may be configured to establish corresponding UPAP layer entities with UE 115-*b*. For instance, logical unit 205-*b* may have UPAP layer entity 210-*e* and UE 115-*b* may have UPAP layer entity 210-*d*. In some examples, the UPAP performs QoS handling and is not exposed to radio state and/or protocols. Accordingly, service headers may be added a priori and may be propagated to the appropriate network entity (e.g., network entity 105-*b*). In some examples, network entity 105-*b* may handle MAC and/or RLC functionalities (e.g., network entity 105-*b* may not handle UPAP functionalities). Additional details about examples in which logical unit 205-*b* includes some or functionalities of the UPAP layer be described herein, for instance, with reference to FIGS. 12 and 13.

In wireless communications system 200-*c*, logical unit 205-*c* may be configured to communicate with network entity 105-*c* and network entity 105-*c* may be configured to communicate with UE 115-*c*. In some examples, functionalities of the UPAP layer may be split between logical unit 205-*c* and network entity 105-*c*. For instance, logical unit 205-*c* may establish corresponding high UPAP layer entities with UE 115-*c* and network entity 105-*c* may establish corresponding low UPAP layer entities with UE 115-*c*. For instance, logical unit 205-*c* may have a first high UPAP layer entity 215-*a*, network entity 105-*c* may have a first low UPAP layer entity 220-*a*, and UE 115-*c* may have a second high UPAP layer entity 215-*b* and a second low UPAP layer entity 220-*b*. In some examples, high UPAP layer entities 215-*a* and 215-*b* may be used to insert and remove high UPAP headers as well as to perform tasks such as header compression, header decompression, ciphering, deciphering, or any combination thereof. Additionally, low UPAP layer entities 220-*a* and 220-*b* may be used to perform operations on high UPAP headers such as amending, modifying, or removing high UPAP headers as well as to insert or remove low UPAP headers. In some examples, low UPAP layer entity 220-*a* may be programmed through an inter-UPAP interface between logical unit 205-*c* and network entity 105-*c*. In such examples, logical unit 205-*c* may have an inter-UPAP interface entity 225-*a* and network entity 105-*c* may have an inter-UPAP interface entity 225-*b*. In some examples, non-radio-related functions may be performed in the high UPAP in logical unit 205-*c* and radio-related tasks may be performed in the low UPAP in network entity 105-*c* with the inter-UPAP interface. Additional details about high UPAP and low UPAP may be described herein, for instance, with reference to FIGS. 14 through 16.

In some examples, UPAP layer entities may be used to perform data session (e.g., PDU session) to DRB mapping, QoS handling, and header insertion and extraction. For instance, UPAP layer entities 210-*a* through 210-*e*, high UPAP layer entities 215-*a* and 215-*b*, low UPAP layer entities 220-*a* and 220-*b*, or any combination thereof may be configured to perform QoS handling and may insert a main header onto network layer traffic packets (e.g., a main header common to multiple deployments). Additionally, the UPAP layer entities 210-*a* through 210-*e*, high UPAP layer entities 215-*a* and 215-*b*, low UPAP layer entities 220-*a* and 220-*b*, or any combination thereof may be configured to insert one or more service headers onto network layer traffic packets (e.g., service headers that are packet-dependent and/or deployment dependent and that may be programmable). In some examples, the main header and/or the service headers may be used to realize a QoS model. For instance, the network layer traffic packets may include information utilizable by a scheduler. Using a service header, the QoS model may be tailored to particular use cases and/or scheduler capabilities (e.g., the service header may include deadline information). In some examples, UPAP layer entities may determine the user plane DU packet pipeline and UPAP interaction with other services and/or logical units, such as UPF.

Additionally, the main header and/or service headers may expose UPAP programmability to services and gateways (e.g., logical unit 205-*a*, logical unit 205-*b*) to configure the packet path and/or RAN pipeline. For instance, services (e.g., services associated with logical unit 205-*a*) may provide instructions in service headers that network entity 105-*a* may use to perform radio functions (e.g., the services may program the radio layer or may otherwise provide programmability of RAN by services). In some such examples, network entity 105-*a* may expose available service headers and associated functionality to the radio layer via an application programming interface (API). In some examples, the programmable packet headers, when processed by a UPAP layer entity at an intermediate or destination node, may encapsulate in-band instructions to the node about the treatment of a packet and/or information about the packet intended for node usage. In one example, (e.g., programmable and/or reconfigurable targeted reordering of packets), reordering may be fully enabled or disabled for a DRB. If reordering is enabled, the baseline (e.g., default) is that each packet from a DRB are reordered together. However, in certain deployments, full reordering may be unneeded. For instance, in XR reordering, packets associated with the same application data unit (ADU) may be reordered. In general, groupings of packets that should be reordered together may define a reordering domain. UPAP layer entities may perform marking-based reordering whereby packets that have similar header marks in the reordering field are reordered separately from other packets constituting a reordering domain. Additional details for this example may be described herein, for instance, with reference to FIG. 11.

In some examples, UPAP layer entities 210-*a* through 210-*c*, high UPAP layer entities 215-*a* and 215-*b*, low UPAP layer entities 220-*a* and 220-*b*, or any combination thereof may be used to perform on-path header updates. For instance, packet headers (e.g., service headers) may be added, removed, or updated along the path (e.g., from logical unit 205-*a* to UE 115-*a*). In some examples, service headers may indicate in-band packet rules to on-path nodes. For instance, service headers may indicate whether to transmit acknowledgement (ACK) feedback for a packet, how to perform reordering, to drop a packet after a predefined time (e.g., a time T), to perform timestamping, to perform explicit congestion notification (ECN) marking, or any combination thereof. Additional details about main headers and service headers may be described herein, for instance, with reference to FIGS. 5, 6A, 6B, and 6C. Additional details about how service headers may be used to perform on-path header updates may be described herein, for instance, with reference to FIG. 9. Additional details about how service headers may be used to indicate in-band packet rules may be described herein, for instance, with reference to FIG. 10.

In some examples, a network entity (e.g., network entity 105-*a*, 105-*b*, or 105-*c*) may transmit, to a logical unit (e.g., logical unit 205-*a*, 205-*b*, or 205-*c*), a capability message that indicates that the network entity supports instructions for a service associated with a radio layer for wireless communication with one or more UEs (e.g., UE 115-*a*, UE 115-*b*, UE 115-*c*). The network entity may establish, with the logical unit, a data session associated with a UE of the one or more UEs based on transmitting the capability message and may receive, from the logical unit, an instruction for performing a radio function associated with the service with the UE based on the data session. Additionally, the network entity may execute the instruction for performing the radio function at the radio layer. Additional details may be described herein, for instance, with reference to FIG. 17.

In some examples, a network entity (e.g., network entity 105-*a*, 105-*b*, or 105-*c*) may transmit, to a logical unit (e.g., logical unit 205-*a*, 205-*b*, or 205-*c*), a capability message that indicates a service that the network entity supports. The network entity may establish, with the logical unit, a data session associated with a flow between the logical unit and a UE (e.g., UE 115-*a*, 115-*b*, UE 115-*c*). The network entity may establish, with the UE, a data radio bearer associated with the flow based on the data session. The logical unit may transmit a first message associated with the flow to the network entity. The first message may include a first header associated with a first layer based on the data session with the logical unit. Additionally or alternatively, the first message may include a main header, a service header associated with the first layer, an indication that the service header is to be processed by the network entity, an instruction for performing a radio function associated with the service with the UE, or any combination thereof. Additional details may be described herein, for instance, with reference to FIG. 18.

In some examples, a wireless device (e.g., one of logical units 205-*a* through 205-*c*, one of network entities 105-*a* through 105-*c*, one of UEs 115-*a* through 115-*c*) may generate a first service data unit associated with a radio link control layer and including a first packet, a first main header for the first packet associated with a first layer above the radio link control layer, and a first service header for the first packet associated with a service provided by one or more network entities in a network. In such examples, each of the first main header and the first service header may be associated with a flow between a logical unit and a UE. In some such examples, the wireless device may generate a second service data unit associated with the radio link control layer, the second service data unit including a second packet, a second main header associated with the first layer, and a second service header for the second packet associated with the service. In some such examples, each of the second main header and the second service header may be associated with the flow between the logical unit and the UE. Additionally, the first service header and the second service header may be distinct from each other. In some examples, the wireless device may output one or more messages including the first service data unit and the second service data unit. Additional details may be described herein, for instance, with reference to FIG. 19.

In some examples, a wireless device (e.g., one of logical units 205-*a* through 205-*c*, one of network entities 105-*a* through 105-*c*, one of UEs 115-*a* through 115-*c*) may be configured to communicate (e.g., receive) a first message that includes a first service data unit associated with a radio link control layer. The wireless device may derive, from the first service data unit, a first packet, a first main header for the first packet associated with a first layer above the radio link control layer (e.g., a UPAP main header), and a first service header for the first packet associated with a service provided by one or more network entities in a network, where each of the first main header and the first service header are associated with a flow between a logical unit and a UE. In some examples, the wireless device may generate a second service data unit associated with the radio link control layer and including a second packet, a second main header, and a second service header associated with the service, where each of the second main header and the second service header may be associated with the flow between the logical unit and the UE, and where the second service header is based on the first service header and the second service header distinct from the first service header. In some examples, the wireless device may communicate (e.g., transmit) a second message that includes the second service data unit. Additional details may be described herein, for instance, with reference to FIG. 20.

In some examples, using service headers may enable increased programmability and service adaptability. Additionally, the techniques described herein may enable UPAP headers associated with some deployments to have decreased overhead as compared to UPAP headers associated with other deployments. For instance, no service header may be inserted on an IP packet associated with IoT, whereas a service header may be inserted on an IP packet associated with XR. Thus, the overhead associated with the UPAP header for the IP packet associated with IoT may be decreased as compared to XR. Additionally, as the service headers may vary between packets, the service headers may include unique fields, unique values within the same field, executable instructions, or any combination thereof that may enable different packets of network layer traffic to be treated differently (e.g., by a RLC layer entity, a MAC layer entity, a PHY layer entity). In some examples, using UPAP layer entities may enable merging of Core and RAN services, which may simplify protocols and reduce duplication across CORE and RAN. Merged services may be hosted based on deployment topology and capabilities for the constraints of each service. In some such examples, real-time link management may be moved to the RAN edge, which may enable decoupling of configuration (e.g., for RRC) and activation (e.g., for MAC) of performance sensitive features. Adaptation at the RAN may enable more efficient activation and/or selection of features based on user experience constraints.

Figure 3A:
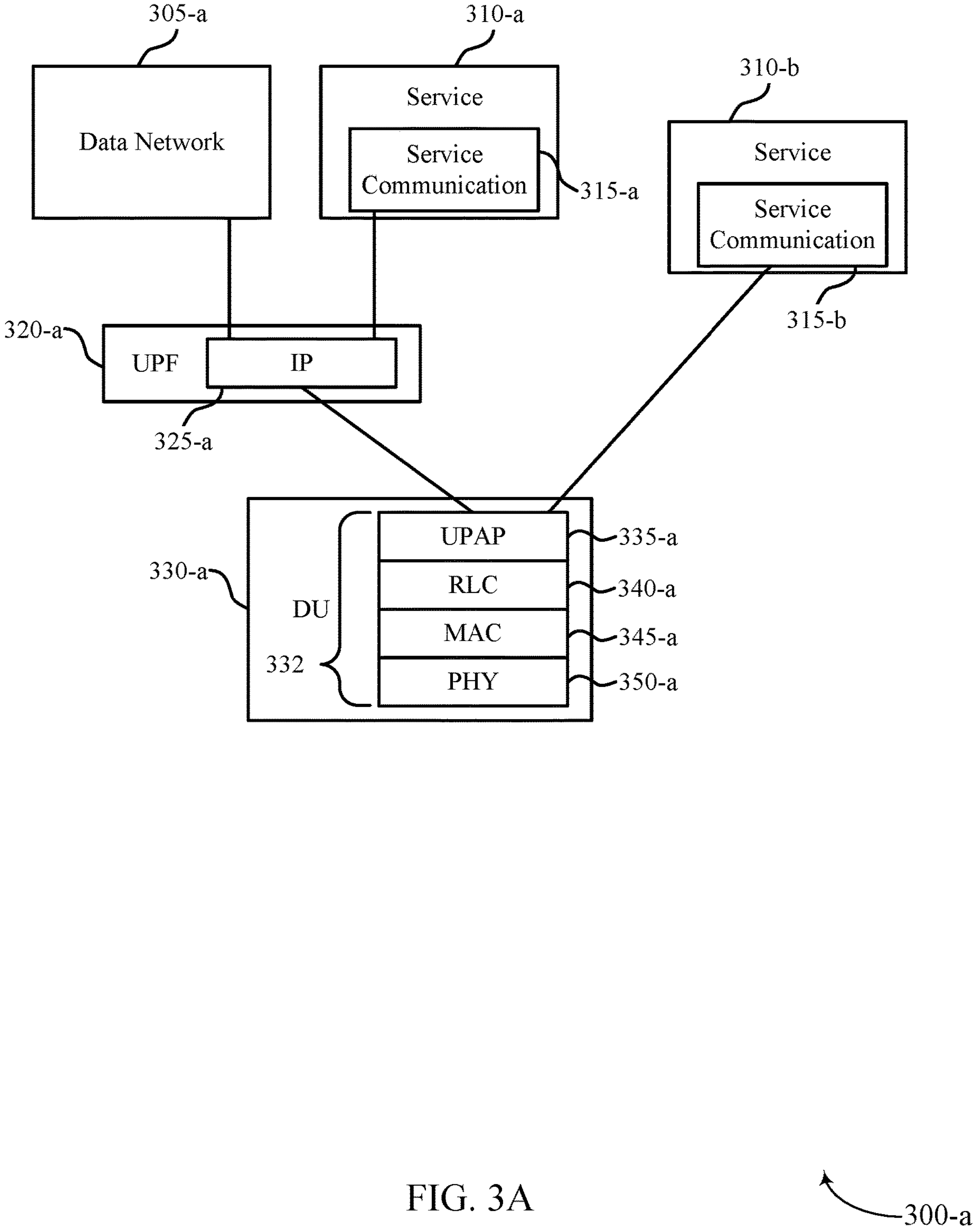
FIGS. 3A and 3B show examples of upper plane architectures that support user plane programmable layer for radio communications in accordance with one or more aspects of the present disclosure.
Figure 3B:
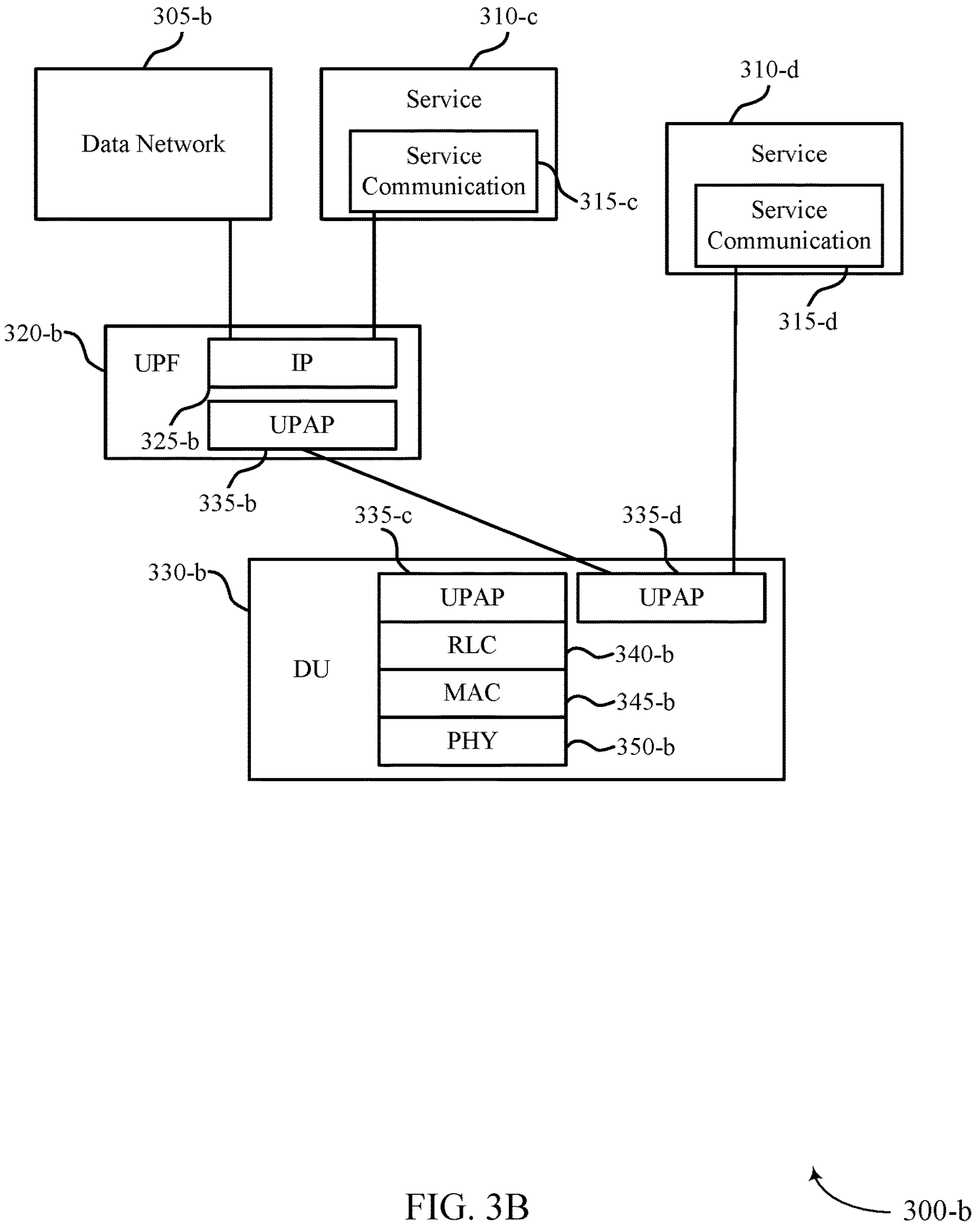

FIGS. 3A and 3B show examples of upper plane architectures 300-*a* and 300-*b* that support a user programmable layer for radio communications in accordance with one or more aspects of the present disclosure. In some examples, upper plane architectures 300-*a* and 300-*b* may implement one or more aspects of wireless communications systems 100 and/or 200-*a* through 200-*c*. For instance, UPFs 320-*a* and 320-*b* may each be an example of a logical unit 205-*a* as described with reference to FIG. 2A. Additionally or alternatively, DUs 330-*a* and 330-*b* may each be an example of a network entity 105-*a* as described with reference to FIG. 2A and/or a network entity 105 and/or a DU 165 as described with reference to FIG. 1. Additionally, any of UPAP layer entities 335-*a*, 335-*c*, or 335-*d* may be an example of a UPAP layer entity 210-*b* as described with reference to FIG. 2A and/or UPAP layer entity 335-*b* may be an example of a UPAP layer entity 210-*c* as described with reference to FIG. 2.

In upper plane architecture 300-*a*, UPF 320-*a* may communicate with data network 305-*a*, logical unit 310-*a* (e.g., via service communication interface 315-*a*), and DU 330-*a*. DU 330-*a* may communicate with logical unit 310-*b* (e.g., via service communication interface 315-*b*). In some examples, UPF 320-*a* may be configured with an IP layer entity 325-*a* and DU 330-*a* may be configured with UPAP layer entity 335-*a*. RLC layer entity 340-*a*, MAC layer entity 345-*a*, and PHY layer entity 350-*a*. In some examples, the UPAP layer, the RLC layer, the MAC layer, and the PHY layer may be referred to as radio layers 332.

In upper plane architecture 300-*b*, UPF 320-*b* may communicate with data network 305-*b*, logical unit 310-*c* (e.g., via service communication interface 315-*c*), and DU 330-*b*. DU 330-*b* may communicate with logical unit 310-*d* (e.g., via service communication interface 315-*d*). In some examples, UPF 320-*b* may be configured with an IP layer entity 325-*b* and a UPAP layer entity 335-*b*. Additionally, DU 330-*b* may be configured with an RLC layer entity 340-*b*, a MAC layer entity 345-*b*, a PHY layer entity 350-*b*, a first UPAP layer entity 335-*c*, a second UPAP layer entity 335-*d*. The first UPAP layer entity 335-*c* may act as a radio interface component (e.g., a UPAP layer entity that performs tasks for a specific radio interface, such as the radio interface between DU 330-*b* and a UE), whereas the second UPAP layer entity 335-*d* may act as a capability exposure component that may interface with services through an interface (e.g., a standardized interface).

A UPF (e.g., UPF 320-*a* or 320-*b*) configured to communicate directly with a DU, such as DU 330-*a* or 330-*b*, (e.g., instead of via a CU) and/or configured with a UPAP layer entity may be referred to as an enhanced UPF (eUPF). Similarly, a DU (e.g., DU 330-*a* or 330-*b*) configured to communicate directly with a UPF, such as UPF 320-*a* or 320-*b*, (e.g., instead of via a CU) and/or that is configured with a UPAP layer entity may be referred to as an enhanced DU (CDU). In some examples, the eUPF may act as a gateway to a data network (e.g., data network 305-*a*, data network 305-*b*) and may perform Layer 3 (L3) functionalities (e.g., processing and policies) and/or one or more Layer 2 (L2) functions. In some examples, the eDU may perform radio access functions and/or may perform one or more non-radio L2 functions (e.g., ciphering).

In some examples, logical units 310-*a* and 310-*c* may be associated with a first type of service that uses an abstracted radio link layer model. For instance, logical units 310-*a* and 310-*b* may interact with a UPF (e.g., 320-*a* or 320-*b*) and may thus not keep track of radio L2 details, such as the type of RAT used for delivery. Additionally, logical units 310-*a* and 310-*c* may be limited in the policies they may implement (e.g., charging, throttling to adapt application layers). Examples of the first type of service may include video streaming, web browsing, or file download.

In some examples, logical units 310-*b* and 310-*d* may be associated with a second type of service that interacts directly with the L2 radio layer of the respective DU (e.g., DUs 330-*a* and 330-*b*, respectively). Logical units associated with the second type of service may operate with identification of radio layer events. For instance, positioning interfaces and configuration of specific control plane signaling may be radio dependent. Logical units associated with the second type of service may use DU APIs to convey information to the respective DUs (e.g., for programmability). In some examples, the second type of service may be local and/or radio-dependent (e.g., radio-as-a-service), and may thus enable non-data services and/or mixed data-sensing services.

In some examples, a User Plane Adaptation may act as the upper most layer in DU (e.g., an eDU). In some examples, the User Plane Adaptation may interface with two or more types of entities. For instance, the User Plane Adaptation may interface with a UPF (e.g., an eUPF), which may be a gateway to a data network (e.g., data network 305-*a*, 305-*b*) and some services (e.g., the first type of services described herein). In such cases, the UPAP may perform flow-to-DRB conversion according to a PDU configuration. Additionally, the UPAP may act as a local DU gateway to the second type of services described herein, which may be referred to as User Plane services, that may be capable of accessing the DU directly using an open API. Through the open DU API, a service of the second type may establish a data session (e.g., a PDU session) that may create one or more UPAP layer entities in the DU.

Figure 4A:
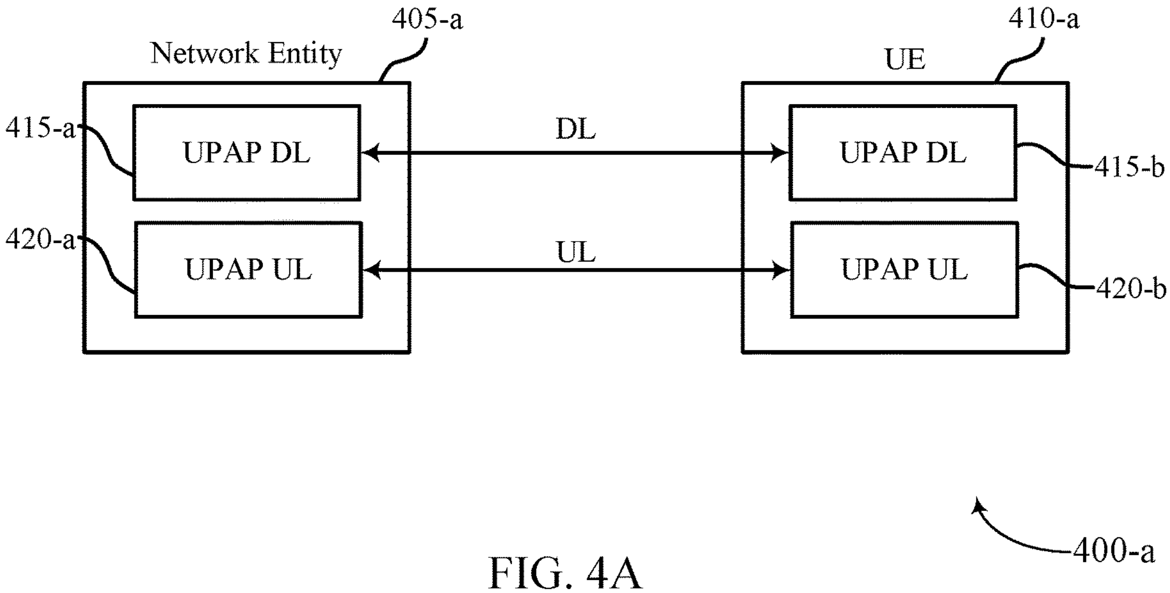
FIGS. 4A and 4B show examples of wireless communications systems that supports user plane programmable layer for radio communications in accordance with one or more aspects of the present disclosure.
Figure 4B:
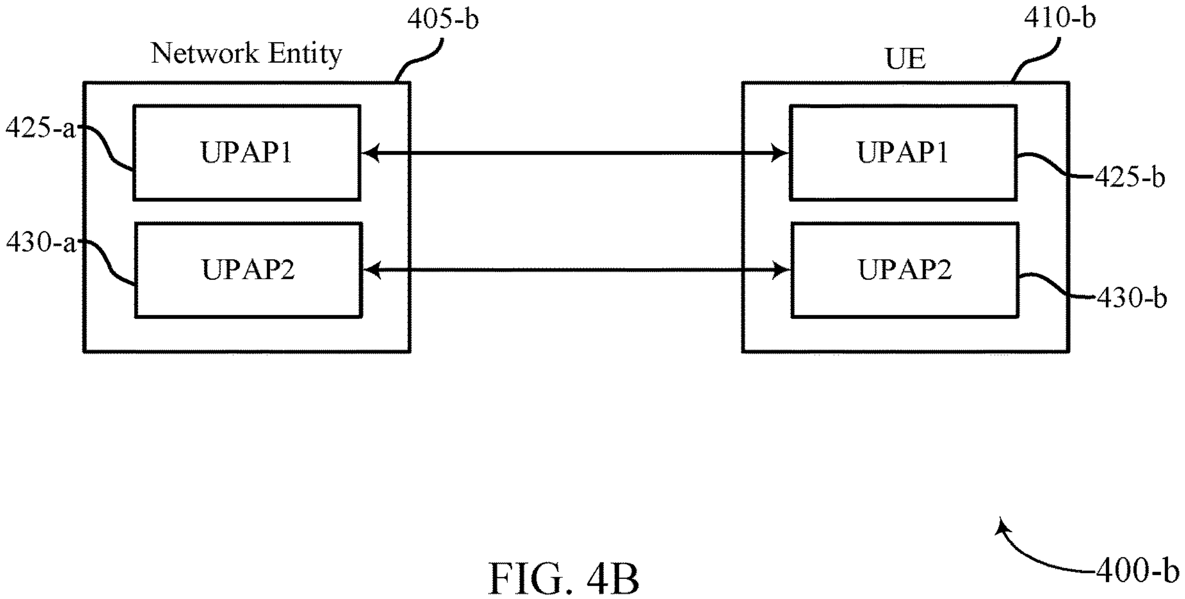

FIGS. 4A and 4B show examples of wireless communications systems 400-*a* and 400-*b* that support a user programmable layer for radio communications in accordance with one or more aspects of the present disclosure. In some examples, wireless communications systems 400-*a* and 400-*b* may implement one or more aspects of wireless communications system 100, wireless communications systems 200-*a* through 200-*c*, upper plane architectures 300-*a* and 300-*b*, or any combination thereof. For instance, network entities 405-*a* and 405-*b* may each be an example of a network entity 105 and/or a DU 165 as described with reference to FIG. 1, network entity 105-*a* as described with reference to FIG. 2A, DU 330-*a* as described with reference to FIG. 3A, DU 330-*b* as described with reference to FIG. 3B, or any combination thereof. Additionally, UEs 410-*a* and 410-*b* may each be an example of a UE 115 as described with reference to FIG. 1 and/or UE 115-*a* as described with reference to FIG. 2A. Additionally, UPAP layer entities 415-*a*, 420-*a*, 425-*a*, and 430-*a* may each be examples of a UPAP layer entity 210-*b* as described with reference to FIG. 2A, a UPAP layer entity 335-*a* as described with reference to FIG. 3A, a UPAP layer entity 335-*c* or 335-*d* as described with reference to FIG. 3B, or any combination thereof. Additionally, UPAP layer entities 415-*b*, 420-*b*, 425-*b*, and 430-*b* may each be examples of a UPAP layer entity 210-*a* as described with reference to FIG. 2A.

As described herein, a data session (e.g., a PDU session) may establish multiple UPAP layer entities in a network entity (e.g., a DU, an DU). For instance, a single IP address may map to multiple UPAP layer entities.

In a first example, illustrated in wireless communications system 400-*a*, network entity 405-*a* (e.g., a DU, an eDU) may establish a first set of downlink UPAP layer entities with UE 410-*a* (e.g., downlink UPAP layer entities 415-*a* and 415-*b*). Similarly, network entity 405-*a* may establish a second set of uplink UPAP layer entities with UE 410-*a* (e.g., uplink UPAP layer entities 420-*a* and 420-*b*). The downlink UPAP layer entities may be used for downlink traffic and the uplink UPAP layer entities may be used for uplink traffic. In some examples, having separate UPAP layer entities for uplink and downlink may enable traffic from a UE 410-*a* to have shorter extension headers (e.g., shorter or fewer service headers) than traffic from network entity 405-*a* (e.g., in examples in which UE 410-*a* has less capability in its scheduler). By having shorter extension headers, the UE 410-*a* may dissipate less power and/or use fewer resources when transmitting uplink traffic. In some examples, network entity 405-*a* may be configured with uplink-only, downlink-only, or bidirectional UPAP layer entities.

In a second example, illustrated in wireless communications system 400-*b*, network entity 405-*b* (e.g., a DU, an eDU) may establish a first set of UPAP layer entities (e.g., UPAP layer entities 425-*a* and 425-*b*) with UE 410-*b* and may establish a second set of UPAP layer entities (e.g., UPAP layer entities 430-*a* and 430-*b*) with UE 410-*b*. In some examples, the first set of UPAP layer entities and the second set of UPAP layer entities may be associated with a multipath transmission control protocol (MPTCP). Additionally, the first set of UPAP layer entities may be associated with Frequency Range 1 (FR1) traffic and the second set of UPAP layer entities may be associated with Frequency Range 2 (FR2) traffic. By using separate packet pipelines on FR1 and FR2, network entity 405-*a* and/or UE 410-*b* may account for different radio link fluctuations associated with FR1 and FR2 (e.g., in cases such as FR1 and FR2 duplication).

Figure 5:
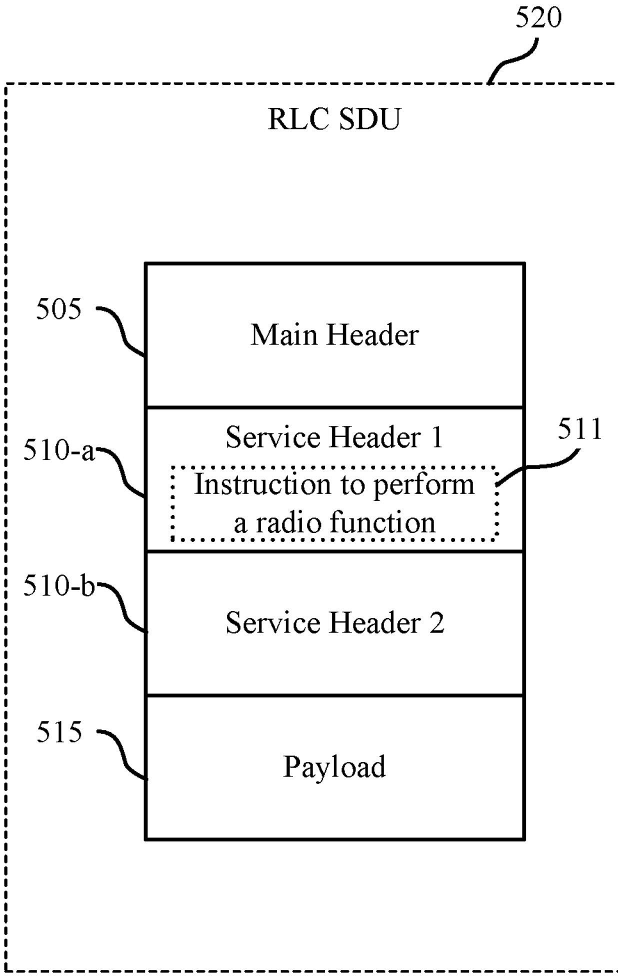
FIG. 5 shows an example of a User Plane Adaptation Protocol (UPAP) Protocol Data Unit (PDU) that supports user plane programmable layer for radio communications in accordance with one or more aspects of the present disclosure.

FIG. 5 shows an example of a UPAP PDU 500 that supports a user programmable layer for radio communications in accordance with one or more aspects of the present disclosure. In some examples, UPAP PDU 500 may be implemented by one or more aspects of FIGS. 1 through 4B. For instance, UPAP PDU 500 may be generated by a network entity 105 or a UE 115 as described with reference to FIG. 1; one or more of UPAP layer entities 210-*a* through 210-*e*, high UPAP layer entities 215-*a* and 215-*b*, low UPAP layer entities 220-*a* and 220-*b* as described with reference to FIGS. 2A through 2C; UPAP layer entities 335-*a* through 335-*d* as described with reference to FIGS. 3A and 3B; UPAP layer entities 415-*a*, 415-*b*, 420-*a*, 420-*b*, 425-*a*, 425-*b*, 430-*a*, 430-*b*, or any combination thereof as described with reference to FIGS. 4A and 4B; or any combination thereof.

In some examples, a UPAP layer entity may insert a main header 505 and one or more service headers (e.g., service headers 510-*a* and 510-*b*) onto a payload 515 (e.g., a payload containing a packet of network layer traffic, such as IP traffic). In such examples, the UPAP layer functionality may be divided into a main functionality and a service functionality reflected in the main header (e.g., main header 505) and the one or more service headers (e.g., service headers 510-*a* and 510-*b*), respectively. In some examples, the main header 505 may be common for multiple deployments (e.g., any deployment) and service headers (e.g., 510-*a* and 510-*b*) may be configured per data session (e.g., per PDU session). In some examples, multiple service headers may be sequentially attached or stacked to the local header depending on a configuration (e.g., service headers 510-*a* and 510-*b* may be sequentially stacked). In some examples, the service headers may act as extension headers.

In some examples, the main header 505 may include one or more parameters such as a data/control (D/C) flag, header length information, information about extension fields, a sequence number, or any combination thereof. The one or more service headers may be used to realize a QoS model, expose UPAP programmability to services and gateways, be adjusted for on-path header updates, or carry instructions (e.g., instructions to perform radio functions 511) and/or parameters used by on-path nodes. In some examples (e.g., IoT deployments), the main header 505 may be inserted, but the one or more service headers may not be present. In other examples, the service headers may be continuously extendible for various applications and deployments (e.g., artificial intelligence (AI) service headers, XR service headers, energy efficiency service headers, sidelink service headers, time-sensitive network (TSN) service headers). In some examples, the service headers and the associated service are based on a DU capability.

In some examples, the main header 505, the service headers (e.g., 510-*a* and 510-*b*), and the payload 515 may be an example of, or may be included in, an RLC service data unit (SDU) 520. For instance, an RLC entity of a wireless device (e.g., a network entity, a UE, a DU) may treat the main header 505, the service headers, and the payload 515 as an RLC SDU 520 and may attach an RLC header to the RLC SDU 520. In some examples, the resulting RLC SDU may be concatenated with another RLC SDU (e.g., containing another main header, another one or more service headers, and another payload) to form a larger RLC SDU that an RLC header is attached to. Alternatively, the resulting RLC SDU may be split into multiple segmented RLC SDUs that each have a respective RLC header inserted.

In some examples, the capability to remove or add service headers may result in decreased overhead and more simplified processing. Additionally, service headers may enable adaptation to application and transport layers and enable full programmability by a service interface with a UPAP layer entity.

Figure 6A:
FIGS. 6A, 6B, and 6C show examples of UPAP headers that supports user plane programmable layer for radio communications in accordance with one or more aspects of the present disclosure.
Figure 6B:
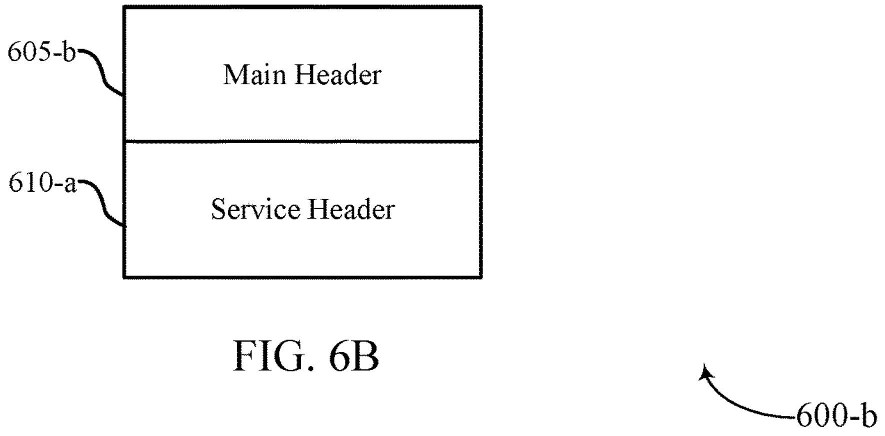
Figure 6C:
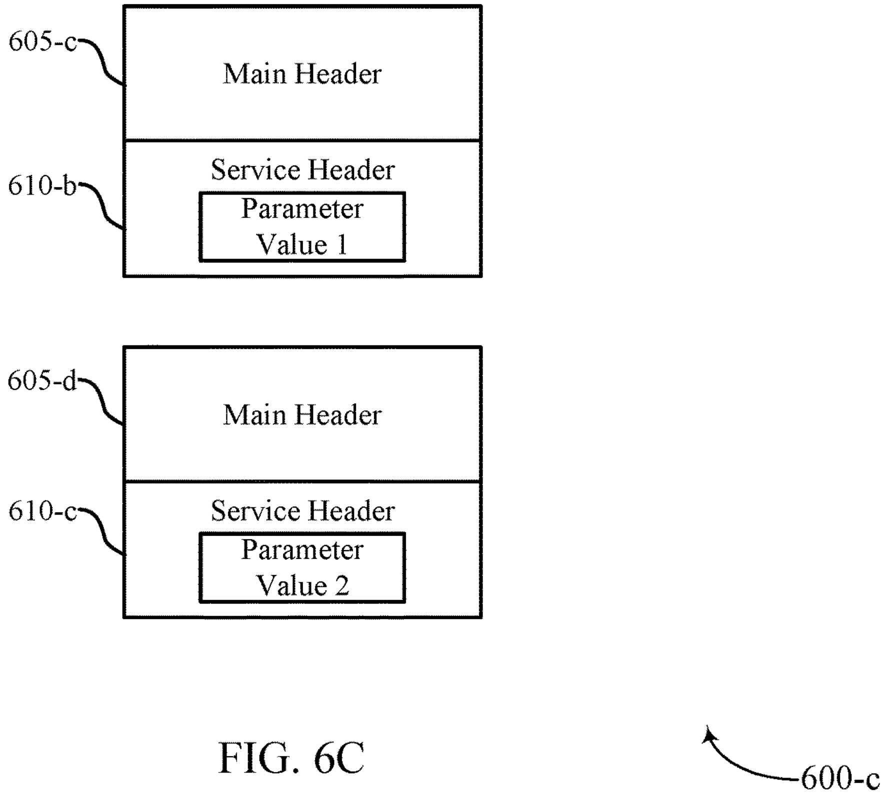
Figure 7A:
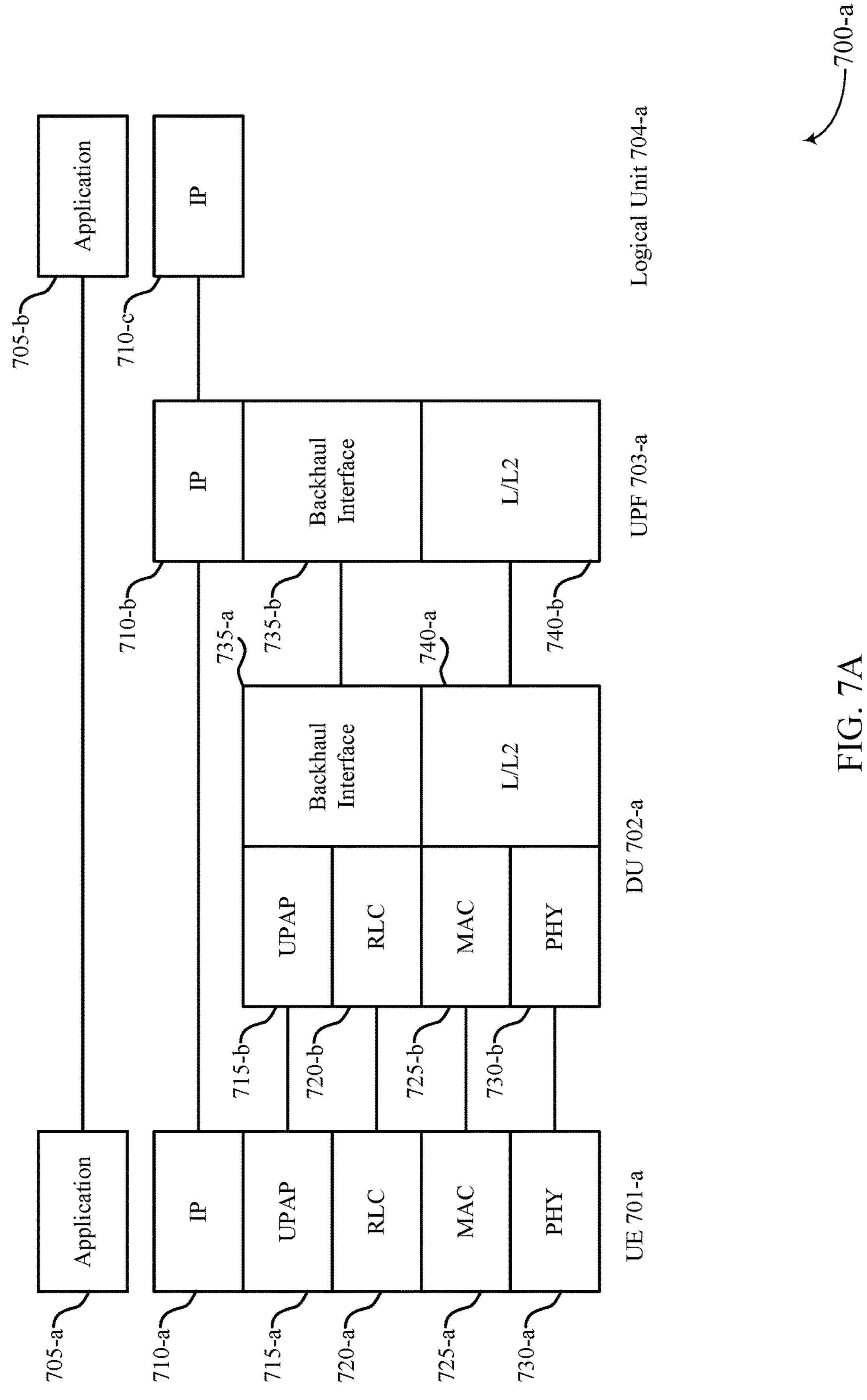
FIGS. 7A, 7B, 7C, and 7D show examples of layer architectures that support user plane programmable layer for radio communications in accordance with one or more aspects of the present disclosure.
Figure 7B:
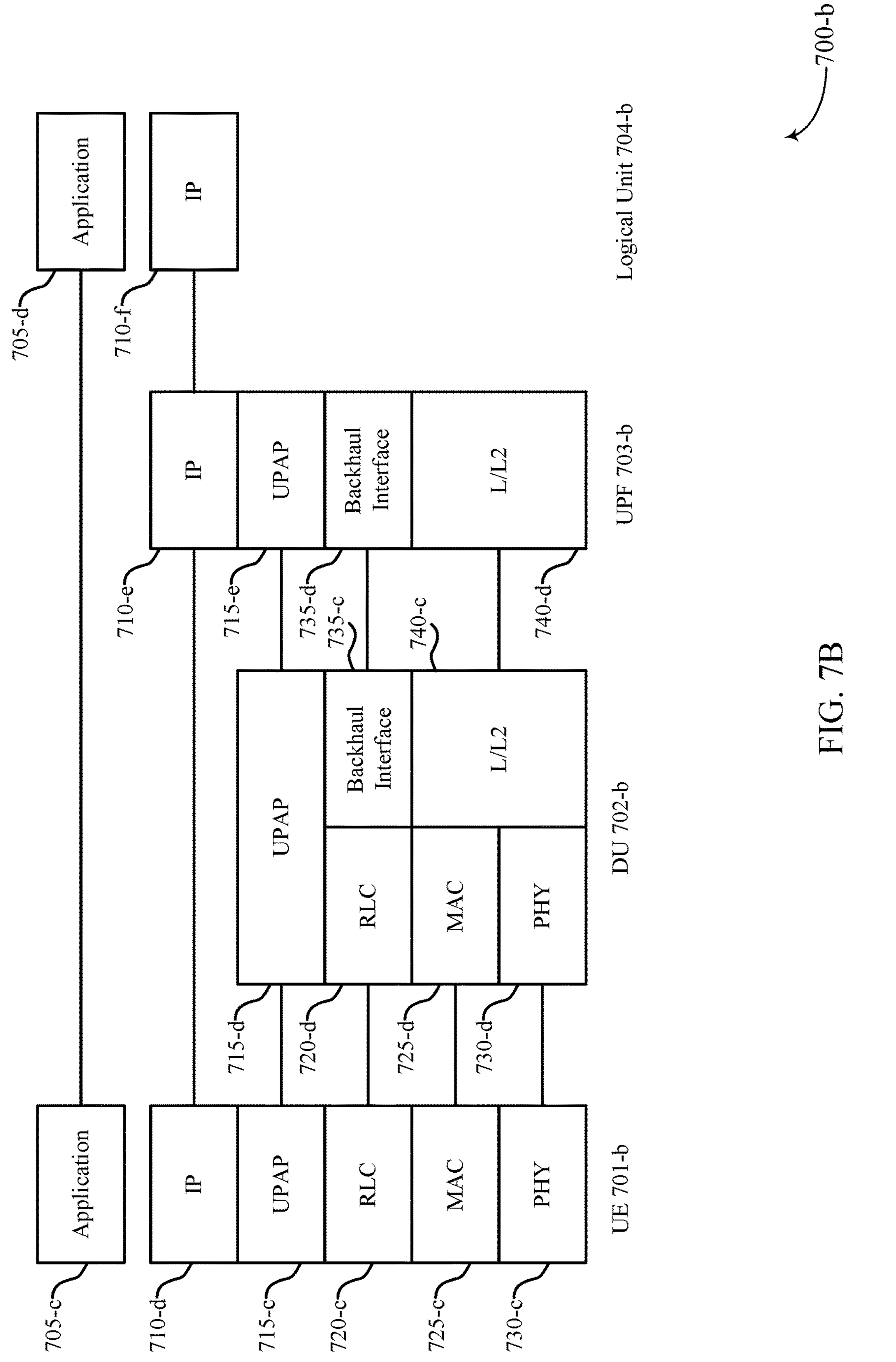
Figure 7C:
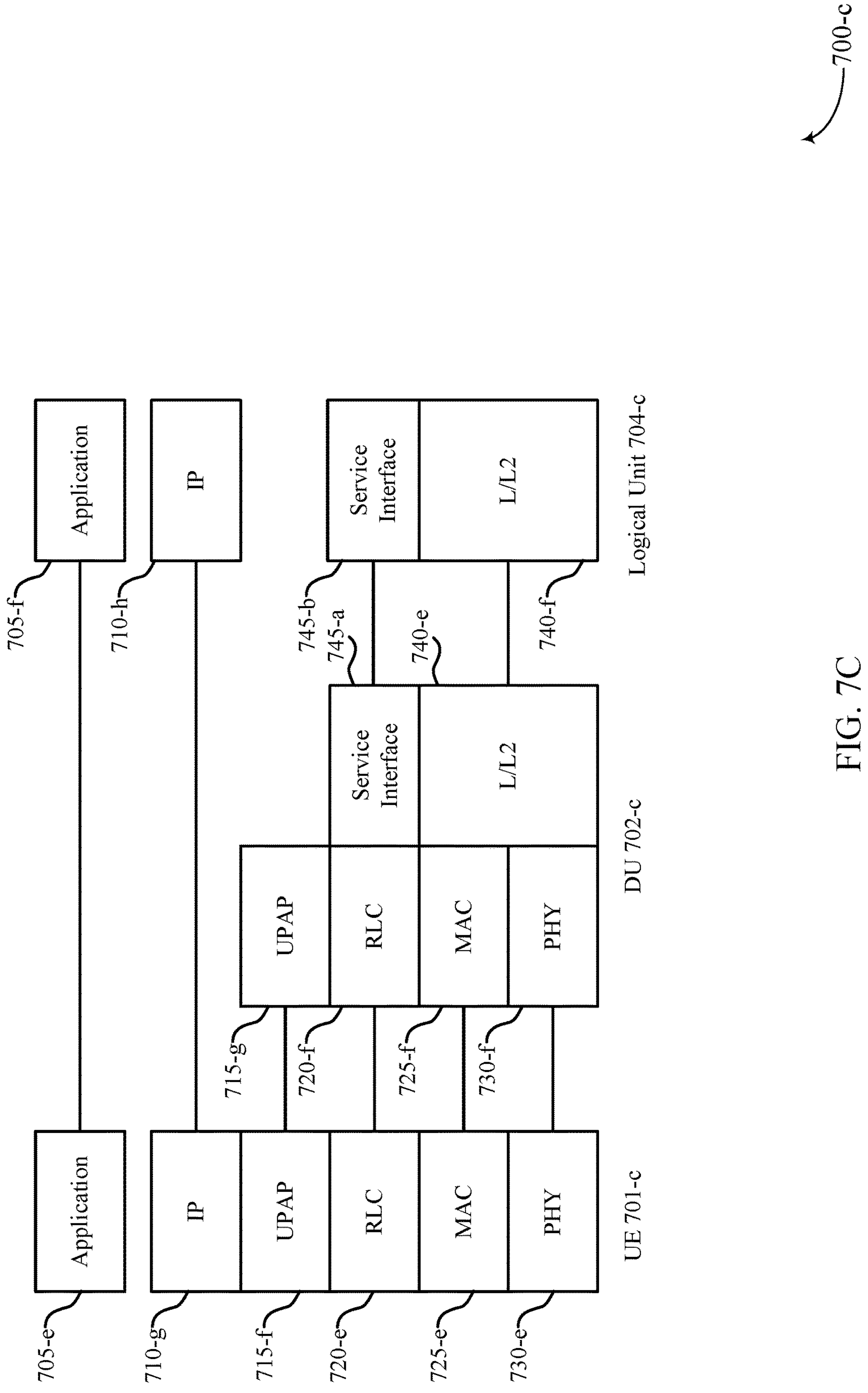
Figure 7D:
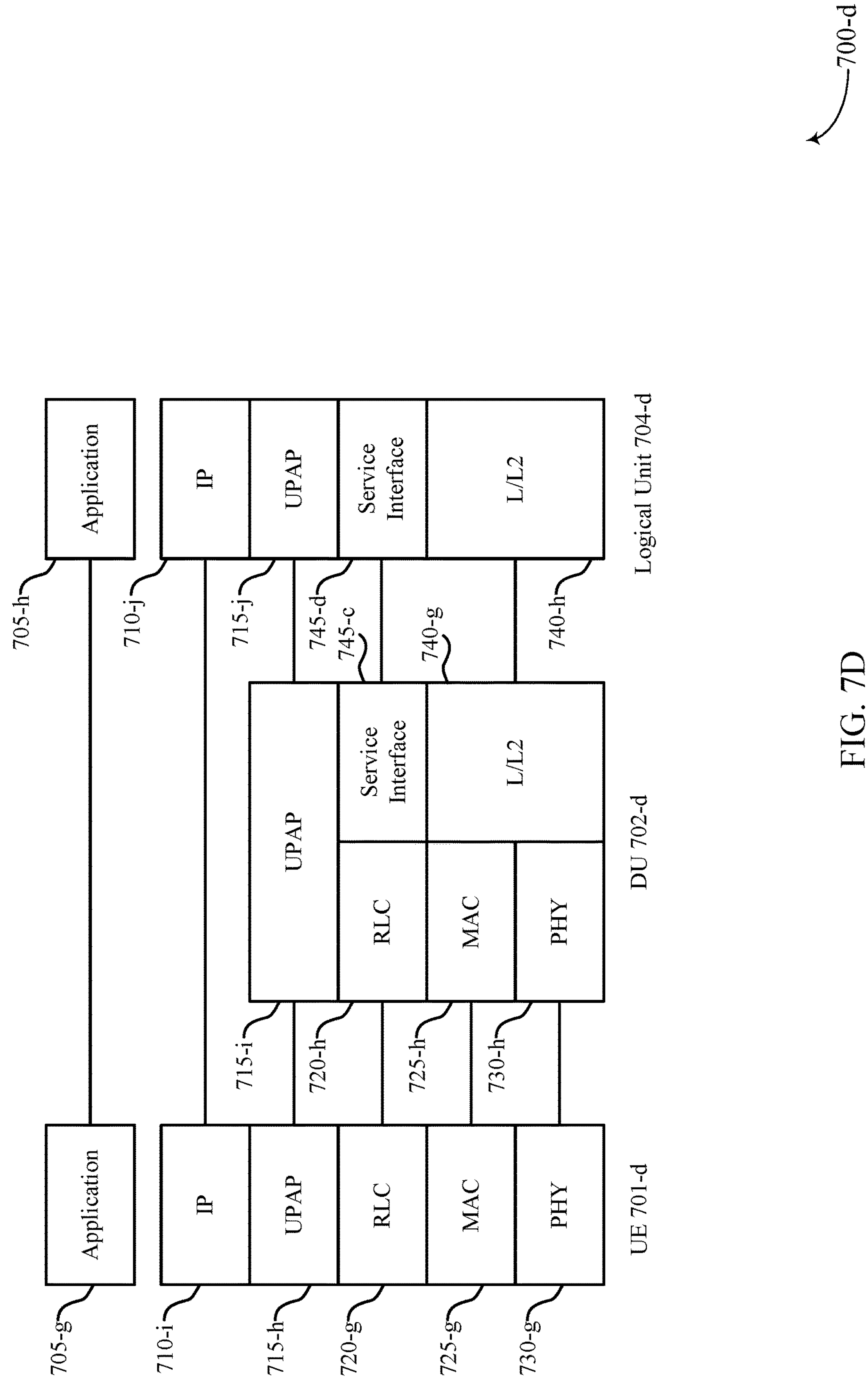

FIG. 6A through 6C may be examples of UPAP headers 600-*a*, 600-*b*, and 600-*c* that support a user programmable layer for radio communications in accordance with one or more aspects of the present disclosure. In some examples, UPAP headers 600-*a*, 600-*b*, and 600-*c* may be implemented by one or more aspects of FIGS. 1 through 5. For instance, UPAP headers 600-*a*, 600-*b*, 600-*c* may be generated by a network entity 105 or a UE 115 as described with reference to FIG. 1; one or more of UPAP layer entities 210-*a* through 210-*e*, high UPAP layer entities 215-*a* and 215-*b*, low UPAP layer entities 220-*a* and 220-*b* as described with reference to FIGS. 2A through 2C; UPAP layer entities 335-*a* through 335-*d* as described with reference to FIGS. 3A and 3B; UPAP layer entities 415-*a*, 415-*b*, 420-*a*, 420-*b*, 425-*a*, 425-*b*, 430-*a*, 430-*b*, or any combination thereof as described with reference to FIGS. 4A and 4B; or any combination thereof. Additionally or alternatively, main headers 605-*a*, 605-*b*, 605-*c*, and 605-*d* may each be an example of a main header 505 as described with reference to FIG. 5 and each of service headers 610-*a*, 610-*b*, and 610-*c* may each be an example of a service header 510-*a* or 510-*b* as described with reference to FIG. 5.

As described herein, QoS handling using service headers may be deployment-specific and/or packet-specific. For instance, a service may indicate to a network treatment of specific packets to a level of granularity as low as that of individual packets (e.g., depending on a capability of the DU). In some examples, header complexity (e.g., the length of a service header, the total number of service headers) may scale up with constraints (e.g., deployment constraints, service level agreement (SLA) constraints). Additionally, the packet header (e.g., the service headers) may match use-case.

In a first example, as illustrated in FIG. 6A, a main header 605-*a* may be inserted on a payload and no service headers may be inserted. In a second example, as illustrated in FIG. 6B, a main header 605-*b* and a service header 610-*a* may be inserted on a payload. In a third example, main header 605-*c* and service header 610-*b* may be inserted on a first payload and main header 605-*d* and service header 610-*c* may be inserted on a second payload. In some such examples, service header 610-*b* may include a field corresponding to a first value of a parameter (e.g., a first deadline $t_1$) and service header 610-*c* may include a field corresponding to a second value of the parameter (e.g., a second deadline $t_2$). In some examples, main header 605-*c* and 605-*d* may include the same values for each field.

In some examples, the first example with main header 605-*a* may have reduced overhead as compared to the second and third examples (e.g., for when the payload includes IoT information). However, the second example may enable information used for certain applications (e.g., if the payload includes XR information) to be conveyed. Additionally, the third example may enable a first payload to be treated differently than a second payload.

FIGS. 7A through 7D may be examples of layer architectures 700-*a*, 700-*b*, 700-*c*, and 700-*d* that support a user programmable layer for radio communications in accordance with one or more aspects of the present disclosure. In some examples, layer architectures 700-*a*, 700-*b*, 700-*c*, and 700-*d* may be implemented by one or more aspects of FIGS. 1 through 4B. For instance, UEs 701-*a*, 701-*b*, 701-*c*, and 701-*d* may each be an example of a UE 115 as described with reference to FIG. 1; UE 115-*a* as described with reference to FIG. 2A; UE 410-*a* or 410-*b* as described with reference to FIGS. 4A and 4B; or any combination thereof. Additionally, DUs 702-*a*, 702-*b*, 702-*c*, and 702-*d* may each be an example of a network entity 105 and/or DU 165 as described with reference to FIG. 1; network entity 105-*a* as described with reference to FIG. 2A; DUs 330-*a* or 330-*b* as described with reference to FIGS. 3A and 3B; network entities 405-*a* or 405-*b* as described with reference to FIGS. 4A and 4B; or any combination thereof. Additionally, UPFs 703-*a* and 703-*b* may each be an example of logical unit 205-*a* as described with reference to FIG. 2A; or UPF 320-*a* or 320-*b* as described with reference to FIGS. 3A and 3B. Additionally, logical units 704-*a*, 704-*b*, 704-*c*, and 704-*d* may each be an example of logical unit 205-*a* as described with reference to FIG. 2A; logical unit 310-*a*, logical unit 310-*b*, logical unit 310-*c*, logical unit 310-*d*, data network 305-*a*, or data network 305-*b* as described with reference to FIGS. 3A and 3B; or any combination thereof.

In layer architecture 700-*a*. UE 701-*a* may include an application layer entity 705-*a*, an IP layer entity 710-*a*, a UPAP layer entity 715-*a*, an RLC layer entity 720-*a*, a MAC layer entity 725-*a*, and a PHY layer entity 730-*a*. DU 702-*a* may include a UPAP layer entity 715-*b*, an RLC layer entity 720-*b*, a MAC layer entity 725-*b*, and a PHY layer entity 730-*b*. Additionally, DU 702-*a* may include a backhaul interface entity 735-*a* and a layer interface entity 740-*a*. UPF 703-*a* may include an IP layer entity 710-*b*, a backhaul interface entity 735-*b* and a layer interface entity 740-*b*. Logical unit 704-*a* may include an application layer entity 705-*b* and an IP layer entity 710-*c*. Application layer entity 705-*a* may interface with application layer entity 705-*b*; IP layer entity 710-*a* may interface with IP layer entity 710-*b*, which may interface with IP layer entity 710-*c*; UPAP layer entity 715-*a* may interface with UPAP layer entity 715-*b*; RLC layer entity 720-*a* may interface with RLC layer entity 720-*b*; MAC layer entity 725-*a* may interface with MAC layer entity 725-*b*; PHY layer entity 730-*a* may interface with PHY layer entity 730-*b*; backhaul interface entity 735-*a* may interface with backhaul interface entity 735-*b*, and layer interface entity 740-*a* may interface with layer interface entity 740-*b*. In some examples, logical unit 704-*a* may be associated with a data network and/or the first type of service as described herein.

In layer architecture 700-*b*, UE 701-*b* may include an application layer entity 705-*c*, an IP layer entity 710-*d*, a UPAP layer entity 715-*c*, an RLC layer entity 720-*c*, a MAC layer entity 725-*c*, and a PHY layer entity 730-*c*. DU 702-*b* may include a UPAP layer entity 715-*d*, an RLC layer entity 720-*d*, a MAC layer entity 725-*d*, and a PHY layer entity 730-*d*. DU 702-*b* may include a backhaul interface entity 735-*c* and a layer interface entity 740-*c*. UPF 703-*b* may include an IP layer entity 710-*e*, a UPAP layer entity 715-*c*, a backhaul interface entity 735-*d*, and a layer interface entity 740-*d*. Logical unit 704-*b* may include an application layer entity 705-*d* and an IP layer entity 710-*f*. Application layer entity 705-*c* may interface with application layer entity 705-*d*; IP layer entity 710-*d* may interface with IP layer entity 710-*e*, which may interface with IP layer entity 710-*f*; UPAP layer entity 715-*c* may interface with UPAP layer entity 715-*d*, which may interface with UPAP layer entity 715-*e*; RLC layer entity 720-*c* may interface with RLC layer entity 720-*d*; MAC layer entity 725-*c* may interface with MAC layer entity 725-*d*; PHY layer entity 730-*c* may interface with PHY layer entity 730-*d*; backhaul interface entity 735-*c* may interface with backhaul interface entity 735-*d*; and layer interface entity 740-*c* may interface with layer interface entity 740-*d*. In some examples, logical unit 704-*b* may be associated with a data network and/or the first type of service as described herein.

In layer architecture 700-*c*. UE 701-*c* may include an application layer entity 705-*c*, an IP layer entity 710-*g*, a UPAP layer entity 715-*f*, an RLC layer entity 720-*e*, a MAC layer entity 725-*e*, and a PHY layer entity 730-*e*. DU 702-*c* may include a UPAP layer entity 715-*g*, an RLC layer entity 720-*f*, a MAC layer entity 725-*f*, and a PHY layer entity 730-*f*. Additionally, DU 702-*c* may include a service interface entity 745-*a* and a layer interface entity 740-*e*. Logical unit 704-*c* may include an application layer entity 705-*f*, an IP layer entity 710-*h*, a service interface entity 745-*b*, and a layer interface entity 740-*f*. Application layer entity 705-*e* may interface with application layer entity 705-*f*; IP layer entity 710-*g* may interface with IP layer entity 710-*h*; UPAP layer entity 715-*f* may interface with UPAP layer entity 715-*g* over a radio protocol interface; RLC layer entity 720-*e* may interface with RLC layer entity 720-*f*; MAC layer entity 725-*e* may interface with MAC layer entity 725-*f*; PHY layer entity 730-*c* may interface with PHY layer entity 730-*f*; service interface entity 745-*a* may interface with service interface entity 745-*b*; and layer interface entity 740-*e* may interface with layer interface entity 740-*f*. The service interface may enable programmability. In some examples, logical unit 704-*c* may be associated with the second type of service as described herein.

In layer architecture 700-*d*, UE 701-*d* may include an application layer entity 705-*g*, an IP layer entity 710-*i*, a UPAP layer entity 715-*h*, an RLC layer entity 720-*g*, a MAC layer entity 725-*g*, and a PHY layer entity 730-*g*. DU 702-*d* may include a UPAP layer entity 715-*i*, an RLC layer entity 720-*h*, a MAC layer entity 725-*h*, and a PHY layer entity 730-*h*. Additionally, DU 702-*d* may include a service interface entity 745-*c* and a layer interface entity 740-*g*. Logical unit 704-*d* may include application layer entity 705-*h*, IP layer entity 710-*j*, UPAP layer entity 715-*j*, service interface entity 745-*d*, and layer interface entity 740-*h*. Application layer entity 705-*g* may interface with application layer entity 705-*h*; IP layer entity 710-*i* may interface with IP layer entity 710-*j*. UPAP layer entity 715-*h* may interface with UPAP layer entity 715-*i* via a radio protocol interface, which may interface with UPAP layer entity 715-*j*; RLC layer entity 720-*g* may interface with RLC layer entity 720-*h*; MAC layer entity 725-*g* may interface with MAC layer entity 725-*h*; PHY layer entity 730-*g* may interface with PHY layer entity 730-*h*; service interface entity 745-*c* may interface with service interface entity 745-*d*; and layer interface entity 740-*g* may interface with layer interface entity 740-*h*. The service interface may act as a direct header interface. It should be noted that a separate type of network protocol may replace the IP layer entities (e.g., ethernet layer entities) without deviating from the scope of the disclosure. In some examples, logical unit 704-*d* may be associated with the second type of service as described herein.

Figure 8:
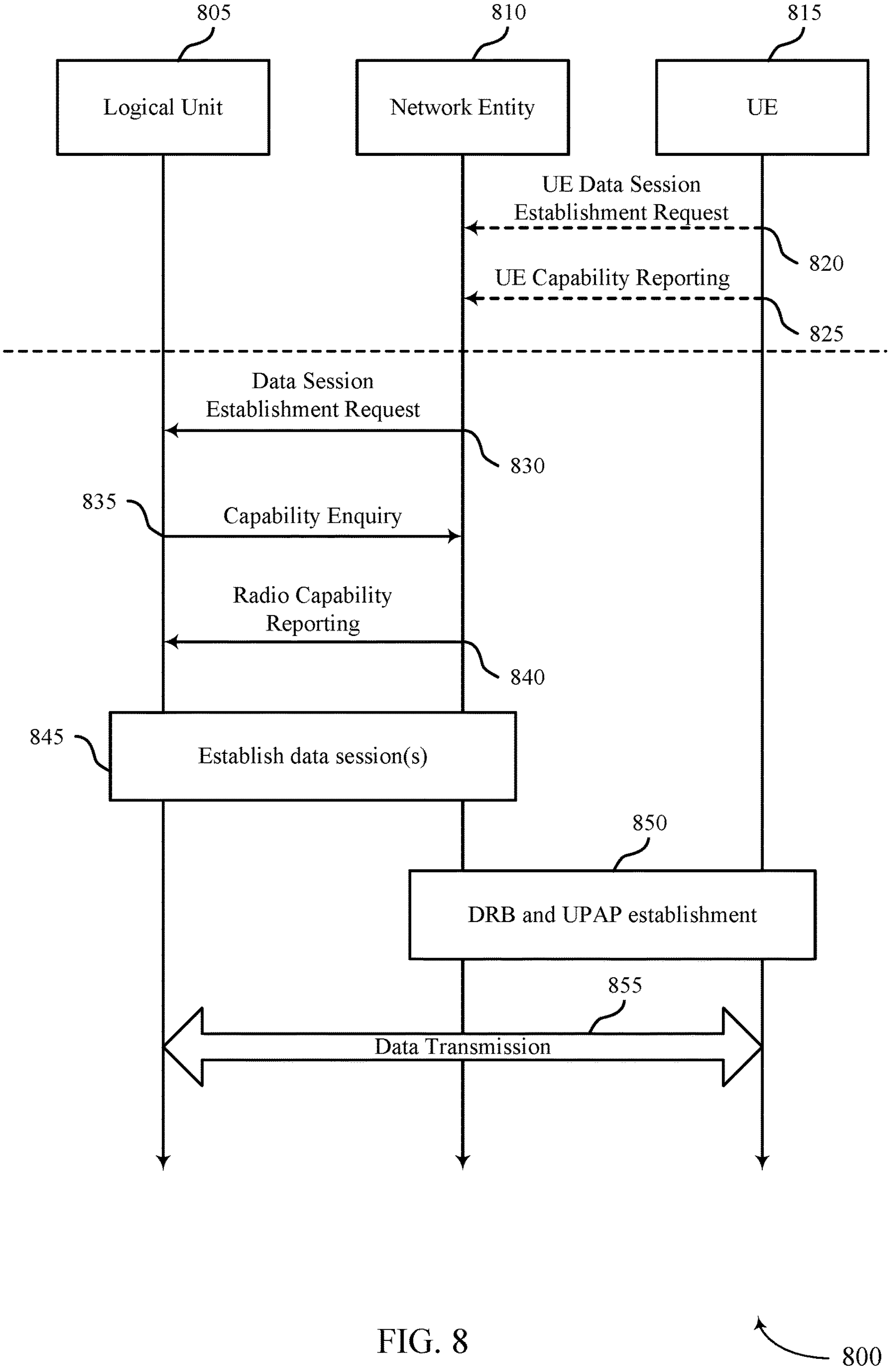
FIG. 8 shows an example of a process flow that supports user plane programmable layer for radio communications in accordance with one or more aspects of the present disclosure.

FIG. 8 shows an example of a process flow 800 that supports a user programmable layer for radio communications in accordance with one or more aspects of the present disclosure. In some examples, process flow 800 may be implemented by one or more aspects of FIGS. 1 through 7D. For instance, logical unit 805 may be an example of a network entity 105 and/or DU 165 as described with reference to FIG. 1; a logical unit 205-*a* or network entity 105-*a* as described with reference to FIG. 2A, a logical unit 310-*b*, a logical unit 310-*d*, a UPF 320-*a*, a UPF 320-*b*, a DU 330-*a*, or a DU 330-*b* as described with reference to FIGS. 3A and 3B; network entity 405-*a* or 405-*b* as described with reference to FIGS. 4A and 4B; UPF 703-*a*, UPF 703-*b*, logical unit 704-*c*, or logical unit 704-*d* as described with reference to FIGS. 7A through 7D; or any combination thereof. Network entity 810 may be an example of a network entity 105 as described with reference to FIG. 1; a network entity 105-*a* as described with reference to FIG. 2A; a DU 330-*a* or a DU 330-*b* as described with reference to FIGS. 3A and 3B; a network entity 405-*a* or 405-*b* as described with reference to FIGS. 4A and 4B; DU 702-*a*, DU 702-*b*, DU 702-*c*, or DU 702-*d* as described with reference to FIGS. 7A through 7D; or any combination thereof. UE 815 may be an example of a UE 115 as described with reference to FIG. 1; UE 115-*a* is described with reference to FIG. 2A; UE 410-*a* or 410-*b* as described with reference to FIGS. 4A and 4B;

UE 701-*a*, UE 701-*b*, UE 701-*c*, or UE 701-*d* as described with reference to FIGS. 7A through 7D or any combination thereof.

At 820, UE 815 may transmit a UE data session establishment request to network entity 810. At 825, UE 815 may transmit UE capability reporting to network entity 810. At 830, network entity 810 may transmit a data session establishment request to logical unit 805. At 835, logical unit 805 may transmit a capability enquiry to network entity 810. At 840, network entity 810 may transmit radio capability reporting to logical unit 805. At 845, logical unit 805 may establish one or more data sessions with network entity 810. At 850, network entity 810 may establish one or more DRBs and/or UPAP with UE 815. At 855, logical unit 805 may communicate data transmissions with UE 815 via network entity 810.

In some examples, UPAP may interface directly with a logical unit associated with the second type of service to expose radio capabilities (e.g., of network entity 810). In such examples, the logical unit associated with the second type of service may program the UPAP layer user plane functionality via APIs to obtain control over radio functions and/or packet forwarding behavior. For instance, at the data session establishment (e.g., the PDU session establishment), network entity 810 may communicate its capability and its programmable APIs (e.g., at 840). The logical unit 805 may accordingly establish the data session and the UPAP layer entity at the network entity 810 and/or UE 815 (e.g., at 845 and 850). Such establishment may include information associated with headers to be attached to packets; handling of different packet headers and metadata; and configuration of User plane on-path behavior and associated DRB properties (e.g., QoS). In some examples, supported capabilities by network entity 810 may include supported QoS models and/or an indication that the network entity 810 supports instructions for a service associated with a radio layer for wireless communication with the UE 815. In some examples, an indication of available radio APIs may include an indication of available headers that may be added by a UPAP layer and/or available actions to be programmed for on-path components.

Figure 9:
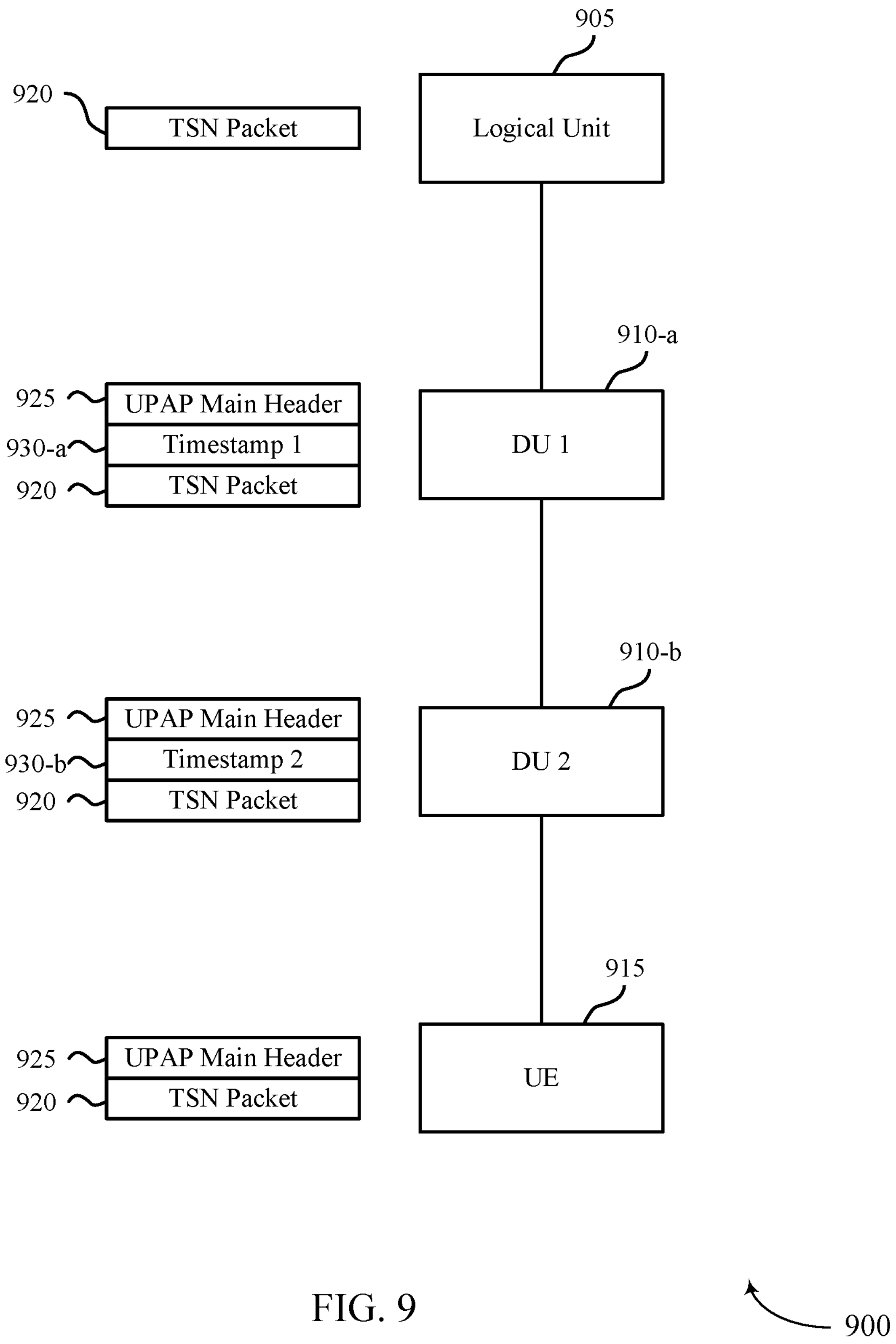
FIG. 9 shows an example of a service header timestamping scheme that supports user plane programmable layer for radio communications in accordance with one or more aspects of the present disclosure.

FIG. 9 shows an example of a service header timestamping scheme 900 that supports a user programmable layer for radio communications in accordance with one or more aspects of the present disclosure. In some examples, service header timestamping scheme 900 may be implemented of one or more aspects of FIGS. 1 through 8. For instance, logical unit 905 may be an example of a network entity 105 and/or DU 165 as described with reference to FIG. 1; a logical unit 205-*a* or network entity 105-*a* as described with reference to FIG. 2A, a logical unit 310-*b*, a logical unit 310-*d*, a UPF 320-*a*, a UPF 320-*b*, a DU 330-*a*, or a DU 330-*b* as described with reference to FIGS. 3A and 3B; network entity 405-*a* or 405-*b* as described with reference to FIGS. 4A and 4B; UPF 703-*a*, UPF 703-*b*, logical unit 704-*c*, or logical unit 704-*d* as described with reference to FIGS. 7A through 7D; a logical unit 805 as described with reference to FIG. 8; or any combination thereof. Additionally, DUs 910-*a* and 910-*b* may each be an example of be an example of a network entity 105 as described with reference to FIG. 1; a network entity 105-*a* as described with reference to FIG. 2A; a DU 330-*a* or a DU 330-*b* as described with reference to FIGS. 3A and 3B; a network entity 405-*a* or 405-*b* as described with reference to FIGS. 4A and 4B; DU 702-*a*. DU 702-*b*, DU 702-*c*, or DU 702-*d* as described with reference to FIGS. 7A through 7D; a network entity 810 as described with reference to FIG. 8; or any combination thereof. Additionally, UE 915 may be an example of a UE 115 as described with reference to FIG. 1; UE 115-*a* is described with reference to FIG. 2A; UE 410-*a* or 410-*b* as described with reference to FIGS. 4A and 4B; UE 701-*a*, UE 701-*b*, UE 701-*c*, or UE 701-*d* as described with reference to FIGS. 7A through 7D; a UE 815 as described with reference to FIG. 8; or any combination thereof.

In TSN networks, the precision time protocol (PTP) (e.g., generalized PTP (gPTP)) may involve each node calculating a latency to a next node and attaching a local timestamp in the packet header. The timestamp may be extracted and processed on a hop-by-hop basis to the destination node. The packet may include a payload (e.g., a payload conveying an instruction to execute) and a time-to-execute this instruction. Thus, maintaining more accurate timing for the packet may enable more accurate performance.

In order to implement the PTP protocol, a logical unit 905 (e.g., associated with a service for direct packet marking for TSN) may transmit a TSN packet 920 to a DU 910-*a*. DU 910-*a* may insert a main header 925 and a service header 930-*a* that includes a first value of the timestamp. Thus, DU 910-*a* may apply the timestamp to initiate the gPTP protocol. DU 910-*a* may then transmit main header 925, the service header 930-*a* and the TSN packet 920 to DU 910-*b*. The DU 910-*b* may extract the first value of the timestamp from service header 930-*a*, may apply the gPTP protocol to account for latency, and may modify the service header 930-*a* to account for residence time and apply a second value of the timestamp. For instance, the service header 930-*a* may be modified to create service header 930-*b* that may include the second value of the timestamp. DU 910-*b* may the transmit main header 925, service header 930-*b*, and the TSN packet to UE 915. UE 915 may extract the second value of the timestamp from service header 930-*b* and other gPTP header information and may calculate the clock sync and apply the TSN packet payload.

In this manner, the service layer (e.g., via service interface entities 745-*a* through 745-*d*) may program and/or configure the UPAP layer along the path to perform the PTP protocol by extracting the existing service header; process timing information; and attach a new service header with new timing information. Performing the procedure in this manner may maintain synchronization along a path (e.g., irrespective of a number of nodes or DUs).

Figure 10:
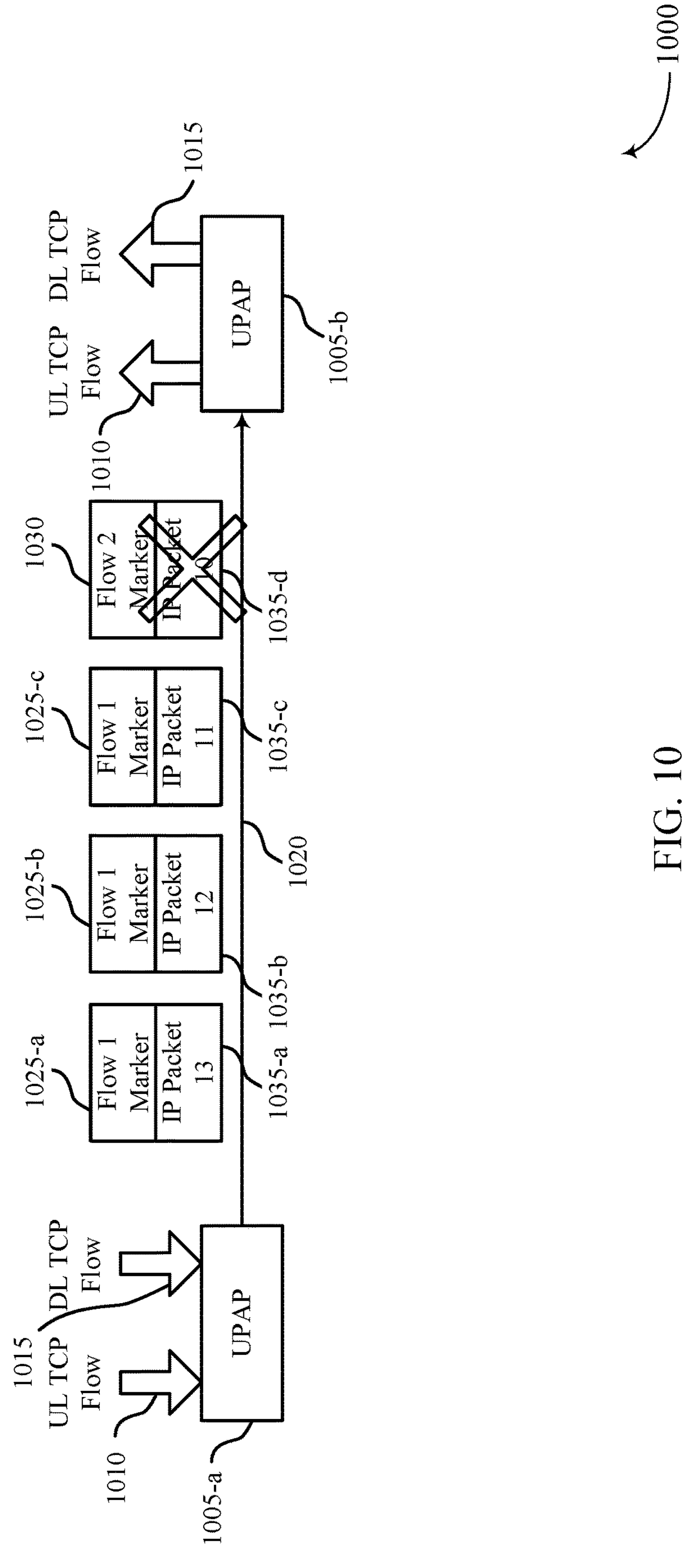
FIG. 10 shows an example of a reordering scheme that supports user plane programmable layer for radio communications in accordance with one or more aspects of the present disclosure.

FIG. 10 shows an example of a reordering scheme 1000 that supports a user programmable layer for radio communications in accordance with one or more aspects of the present disclosure. In some examples, reordering scheme 1000 may be implemented by one or more aspects of FIGS. 1 through 7D. For instance, UPAP layer entities 1005-*a* and 1005-*b* may each be an example of one or more of UPAP layer entities 210-*a* through 210-*e*, high UPAP layer entities 215-*a* and 215-*b*, and low UPAP layer entities 220-*a* and 220-*b* as described with reference to FIGS. 2A-2C; one or more of UPAP layer entities 335-*a* through 335-*d* of FIGS. 3A and 3B; one or more of UPAP layer entities 415-*a*, 415-*b*, 420-*a*, 420-*b*, 425, 425-*b*, 430-*a*, 430-*b* as described with reference to FIGS. 4A and 4B; one or more of UPAP layer entities 715-*a* through 715-*j* of FIGS. 7A through 7D; or any combination thereof.

In some examples, head-of-line (HOL) inter-flow blocking may occur when a PDCP is used. For instance, waiting for a lost or late packet at PDCP for reordering may block other already received packets from being forwarded. Additionally, heterogenous paths (a FR1 path and a FR2 dual connectivity path and/or a split bearer) may cause disparity between paths increasing a size of reordering buffers.

In order to avoid HOL inter-flow blocking or delays from heterogenous paths in DU-based duplication, UPAP layer entities (e.g., UPAP layer entities 1005-*a* and 1005-*b*) may be used to perform marking-based reordering. Using a service header and programmable packet marking at a UPAP, different flows may be marked differently and reordering may be configured on a packet marking basis. Along with the service headers being used for reordering marking, the service headers may also include a reordering timer and an instruction to drop or forward (e.g., to forward or drop a packet after time T if not successfully reordered) by examining or inferring from a reordering domain field, a reordering timer field, a field indicating whether to drop or forward when the reordering time expires, a field indicating whether to transmit an ACK or NACK for a specific packet; or any combination thereof. The programmable reordering may be performed in the DU or UE, based on whether uplink data or downlink data is being conveyed.

In the present example, UPAP layer entity 1005-*a* may represent a downlink UPAP layer entity for a network entity (e.g., a DU) or an uplink layer entity for a UE. In such examples, the uplink flow 1010 may carry ACK feedback and the downlink flow 1015 may carry data. Alternatively, UPAP layer entity 1005-*a* may represent an uplink UPAP layer entity for a UE or a downlink layer entity for a network entity (e.g., a DU). In such examples, uplink flow 1010 may carry data and downlink flow 1015 may carry ACK feedback.

In an example, UPAP layer entity 1005-*b* may be waiting to receive an IP packet 1035-*d* (e.g., IP packet 10) over a link 1020 and may have successfully received IP packets 1035-*a*, 1035-*b*, and 1035-*c* (e.g., IP packets 13, 12, and 11, respectively) over the link 1020. A service header 1030 associated with IP packet 1035-*d* may indicate that it is part of a second flow and service headers associated with IP packets 1035-*a*, 1035-*b*, and 1035-*c* (e.g., service headers 1025-*a*, 1025-*b*, and 1025-*c*, respectively) may indicate that they are part of a first flow. Even though the IP packets 1035-*a*. 1035-*b*, and 1035-*c* have indices higher than that of IP packet 1035-*d*, ACK feedback may be sent for them while UPAP layer entity 1005-*b* wait to receive IP packet 1035-*d* as IP packet 1035-*d* is associated with a different flow from IP packets 1035-*a*, 1035-*b*, and 1035-*c*.

Figure 11:
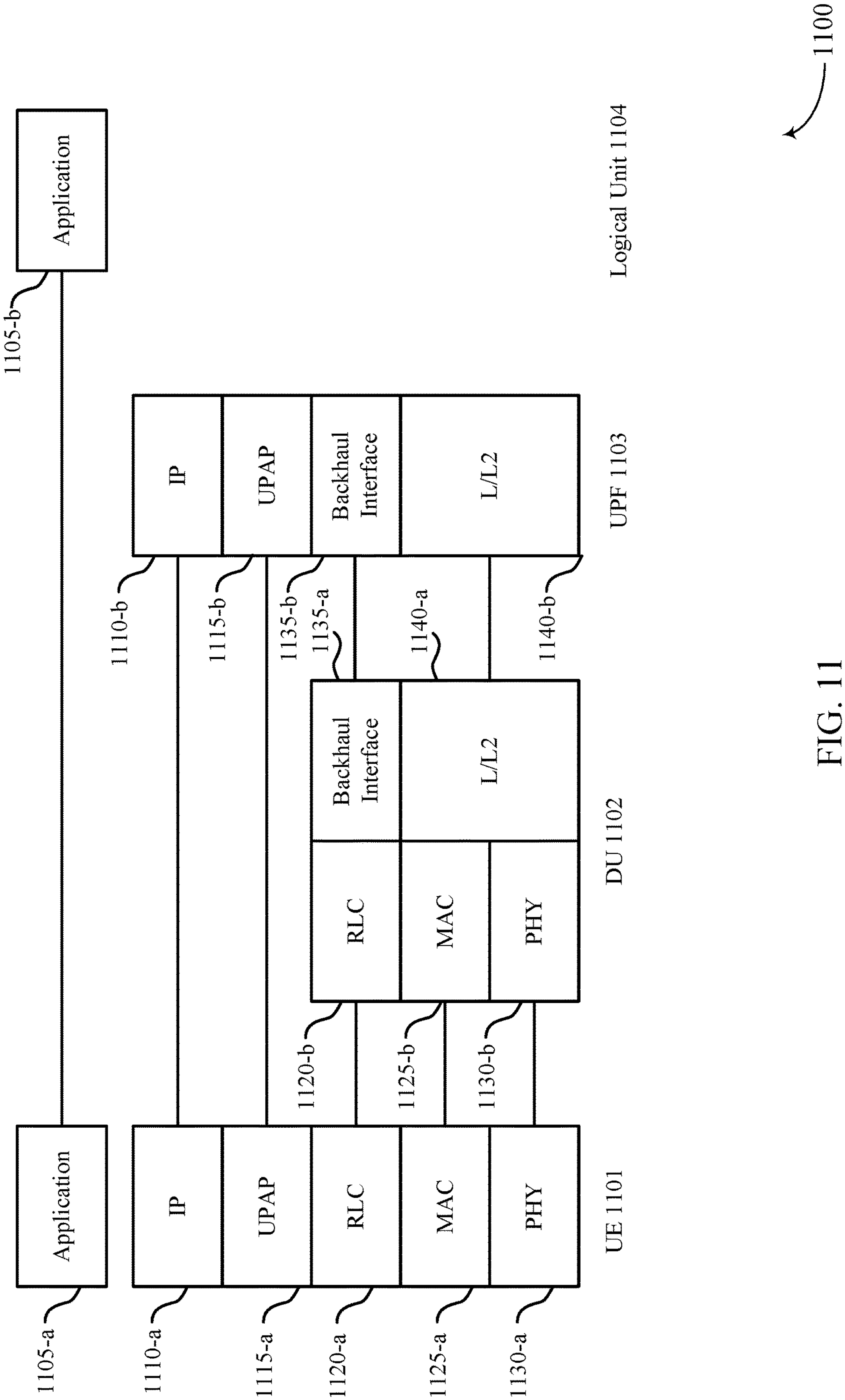
FIG. 11 shows an example of a layer architecture that supports user plane programmable layer for radio communications in accordance with one or more aspects of the present disclosure.

FIG. 11 shows an example of a layer architecture 1100 that supports a user programmable layer for radio communications in accordance with one or more aspects of the present disclosure. In some examples, layer architecture 1100 may implement one or more aspects of FIGS. 1 through 10. For instance, each component of FIG. 11 may implement some or each of the aspects of the correspondingly named components of FIGS. 1 through 10. Additionally, UPF 1103 may be an example of a logical unit 205-*b* as described with reference to FIG. 2B; DU 1102 may be an example of a network entity 105 and/or DU 165 as described with reference to FIG. 1 and/or a network entity 105-*b* as described with reference to FIG. 2B; UE 1101 may be an example of a UE 115-*b* as described with reference to FIG. 2B and/or a UE 115 as described with reference to FIG. 1; or any combination thereof.

In layer architecture 1100, UE 1101 may include an application layer entity 1105-*a*, an IP layer entity 1110-*a*, a UPAP layer entity 1115-*a*, an RLC layer entity 1120-*a*, a MAC layer entity 1125-*a*, a PHY layer entity 1130-*a*. DU 1102 may include an RLC layer entity 1120-*b*, a MAC layer entity 1125-*b*, and a PHY layer entity 1130-*b*. Additionally, DU 1102 may include a backhaul interface entity 1135-*a* and a layer interface entity 1140-*a*. UPF 1103 may include IP layer entity 1110-*b*, UPAP layer entity 1115-*b*, backhaul interface entity 1135-*b*, and layer interface entity 1140-*b*. Logical unit 1104 may include application layer entity 1105-*b*. Application layer entity 1105-*a* may interface with application layer entity 1105-*b*; IP layer entity 1110-*a* may interface with IP layer entity 1110-*b*; UPAP layer entity 1115-*a* may interface with UPAP layer entity 1115-*b*; RLC layer entity 1120-*a* may interface with RLC layer entity 1120-*b*; MAC layer entity 1125-*a* may interface with MAC layer entity 1125-*b*; PHY layer entity 1130-*a* may interface with PHY layer entity; backhaul interface entity 1135-*a* may interface with backhaul interface entity 1135-*b*; and layer interface entity 1140-*a* may interface with layer interface entity 1140-*b*. In the present example, the UPF 1103 (e.g., an eUPF) may establish the UPAP based on data session constraints. Additionally, UE 1101 and DU 1102 (e.g., an eDU) may have a DRB and/or RLC channel connection between them.

In some examples, layer architecture 1100 may be used to communicate messages between UE 1101 and logical unit 1104. For instance, UPF 1103 may establish corresponding UPAP layer entities (e.g., UPAP layer entities 1005-*a* and 1005-*b*) with UE 1101. When UPF 1103 receives an IP packet from logical unit 1104, UPF may use UPAP layer entity 1115-*b* to generate a main header and/or a service header and may provide the IP packet, main header, and service header to UE 1101 via DU 1102. Similarly, UE 1101 may generate an IP packet and may insert a main header and/or a service header onto the IP packet using UPAP layer entity 1115-*a*. If a scheduler can observe a UPAP service header, then layer architecture 1100 may enable the realization of a QoS model. For instance, the service header may include information (e.g., deadline information) that a scheduler (e.g., of DU 1102) may use for one or more operations, including information associated with the QoS flow. In some examples, different service header may be tailored to different QoS flows and may include parameter values used for communicating information associated with those QoS flows. In some examples, layer architecture 1100 may represent a more detailed view of wireless communications system 200-*b* as described with reference to FIG. 2B.

Figure 12:
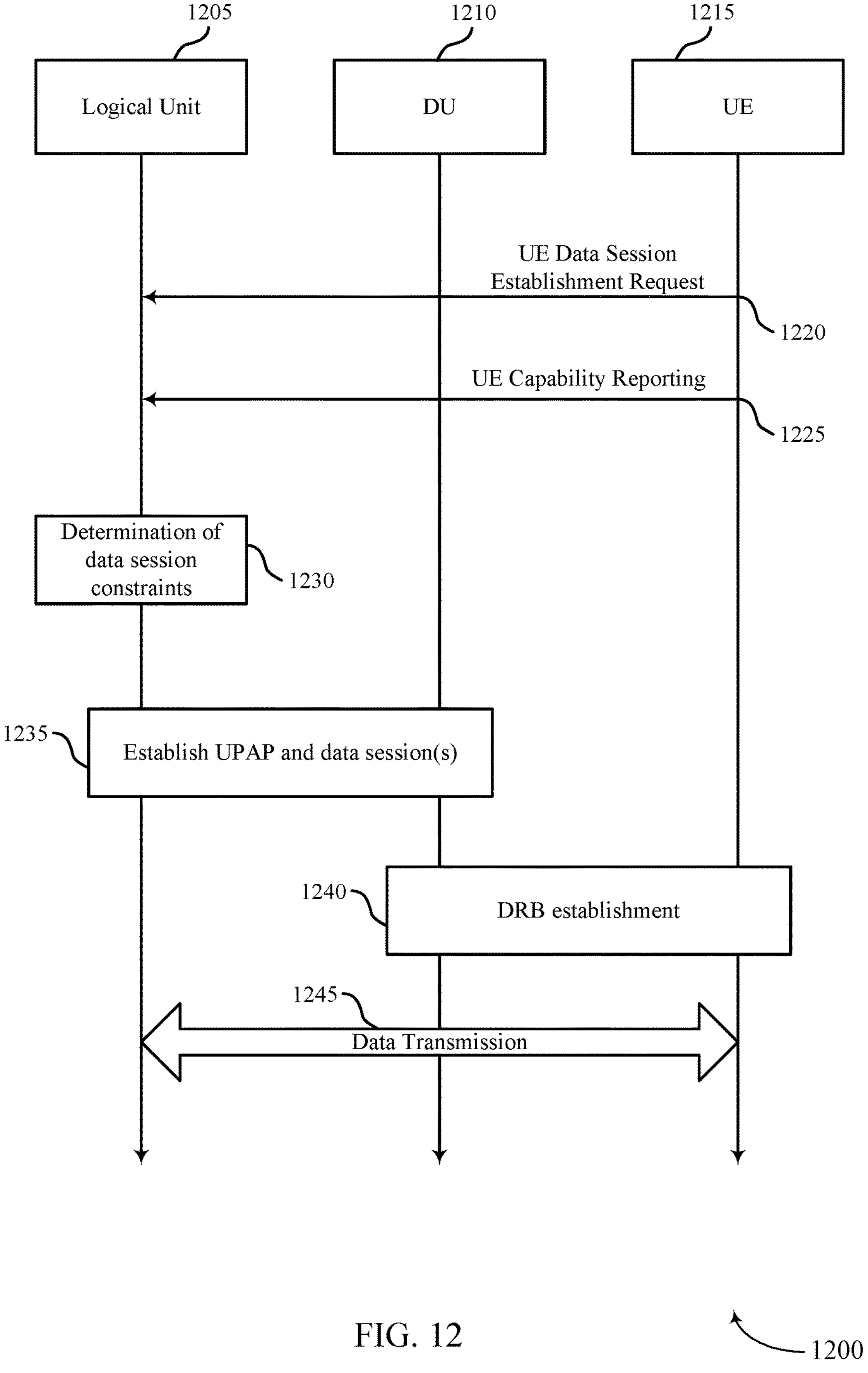
FIG. 12 shows an example of a process flow that supports user plane programmable layer for radio communications in accordance with one or more aspects of the present disclosure.

FIG. 12 shows an example of a process flow 1200 that supports a user programmable layer for radio communications in accordance with one or more aspects of the present disclosure. In some examples, process flow 1200 may implement one or more aspects of FIGS. 1 through 11. For instance, each component of FIG. 12 may implement some or each of the aspects of the correspondingly named components of FIGS. 1 through 11. Additionally, logical unit 1205 may be an example of a logical unit 205-*b* as described with reference to FIG. 2B; DU 1210 may be an example of a network entity 105 as described with reference to FIG. 1 and/or a network entity 105-*b* as described with reference to FIG. 2B; UE 1215 may be an example of a UE 115-*b* as described with reference to FIG. 2B and/or a UE 115 as described with reference to FIG. 1; or any combination thereof. In some examples, process flow 1200 may be used when layer architecture 1100 is employed and/or may represent a procedure performed by the devices of wireless communications system 200-*b*.

In some examples, process flow 1200 may be utilized in order to enable a UE 1215 and a logical unit 1205 to communicate messages including main headers and service headers, where the service headers may be used to realize a QoS model (e.g., different service headers may be tailored to different QoS flows and may include parameter values used for communicating information associated with those QoS flows), to carry instructions and/or parameters, or both. For instance, at 1220, UE 1215 may transmit a UE data session establishment request to logical unit 1205 (e.g., via DU 1210). At 1225, UE 1215 may transmit UE capability reporting to logical unit 1205 to logical unit 1205 (e.g., via DU 1210). At 1230, logical unit 1205 may perform a determination of data session constraints. At 1235, logical unit 1205 may establish one or more data sessions and corresponding UPAP layer entities with DU 1210. At 1240, DU 1210 may establish one or more DRBs with UE 1215.

At 1245, data transmission may occur between logical unit 1205 and UE 1215 (e.g., via DU 1210). For instance, logical unit 1205 may identify an IP packet (e.g., received from an external network) and may insert a main header and service header onto the IP packet using the established UPAP layer entity at logical unit 1205 (e.g., UPAP layer entity 1115-*b* as described in FIG. 11). Logical unit 1205 may provide a message including the main header, the service header, and the IP packet to DU 1210. DU 1210 may perform radio functions using an RLC layer entity, a MAC layer entity, and a PHY layer entity (e.g., RLC layer entity 1120-*b*, MAC layer entity 1125-*b*, and PHY layer entity 1130-*b* as described with reference to FIG. 11) and may generate a second message to transmit to the UE 1215 based on the message obtained from the logical unit 1205. The DU 1210 may transmit the second message to the UE 1215, which may use radio functions to identify the main header, the service header, and the IP packet.

Figure 13:
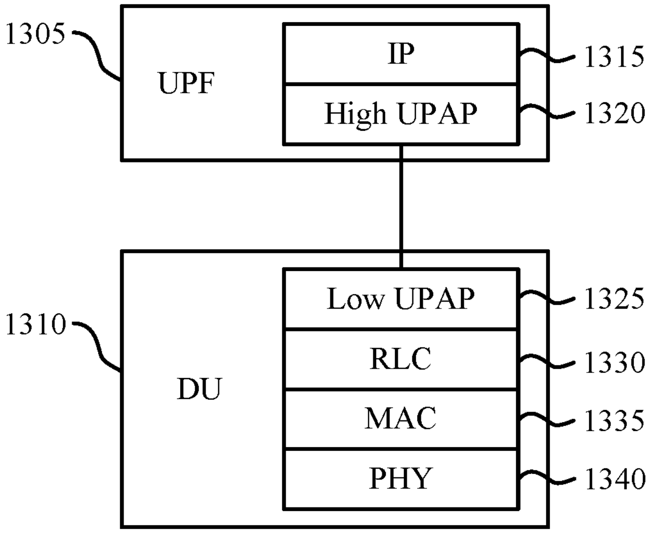
FIG. 13 shows an example of a user plane architecture that supports user plane programmable layer for radio communications in accordance with one or more aspects of the present disclosure.

FIG. 13 shows an example of an upper plane architecture 1300 that supports a user programmable layer for radio communications in accordance with one or more aspects of the present disclosure. In some examples, upper plane architecture may implement one or more aspects of FIGS. 1 through 12. For instance, each component of FIG. 13 may implement some or each of the aspects of the correspondingly named components of FIGS. 1 through 12. Additionally, UPF 1305 may be an example of a logical unit 205-*c* as described with reference to FIG. 2C and DU 1310 may be an example of a network entity 105 and/or DU 165 as described with reference to FIG. 1 and/or a network entity 105-*c* as described with reference to FIG. 2C.

In some examples, UPAP may be vertically split between UPF 1305 and DU 1310 via an internal UPAP interface between high UPAP layer entity 1320 and low UPAP layer entity 1325. For instance, UPF 1305 (e.g., an eUPF) may include IP layer entity 1315 and high UPAP layer entity 1320 and DU 1310 (e.g., an eDU) may include low UPAP layer entity 1325, RLC layer entity 1330, MAC layer entity 1335, and PHY layer entity 1340. In this setup, the UPAP configuration may distribute functionality between the low UPAP layer entity 1325 and the high UPAP layer entity 1320 in one or more ways. For instance, one or more tasks for the high UPAP layer entity 1320 may operate on an end-to-end basis not as a function of radio conditions (e.g., header compression, ciphering, reordering across paths). Additionally, one or more tasks for the low UPAP layer entity 1325 may be related to the operation of a single DU (e.g., DU 1310) and may, in some examples, depend on radio conditions. In some examples, the UPAP may adjust (e.g., optimize) the functionality placement depending on radio factors (e.g., FR1 and FR2 deployment and/or independent functionality scaling).

Figure 14:
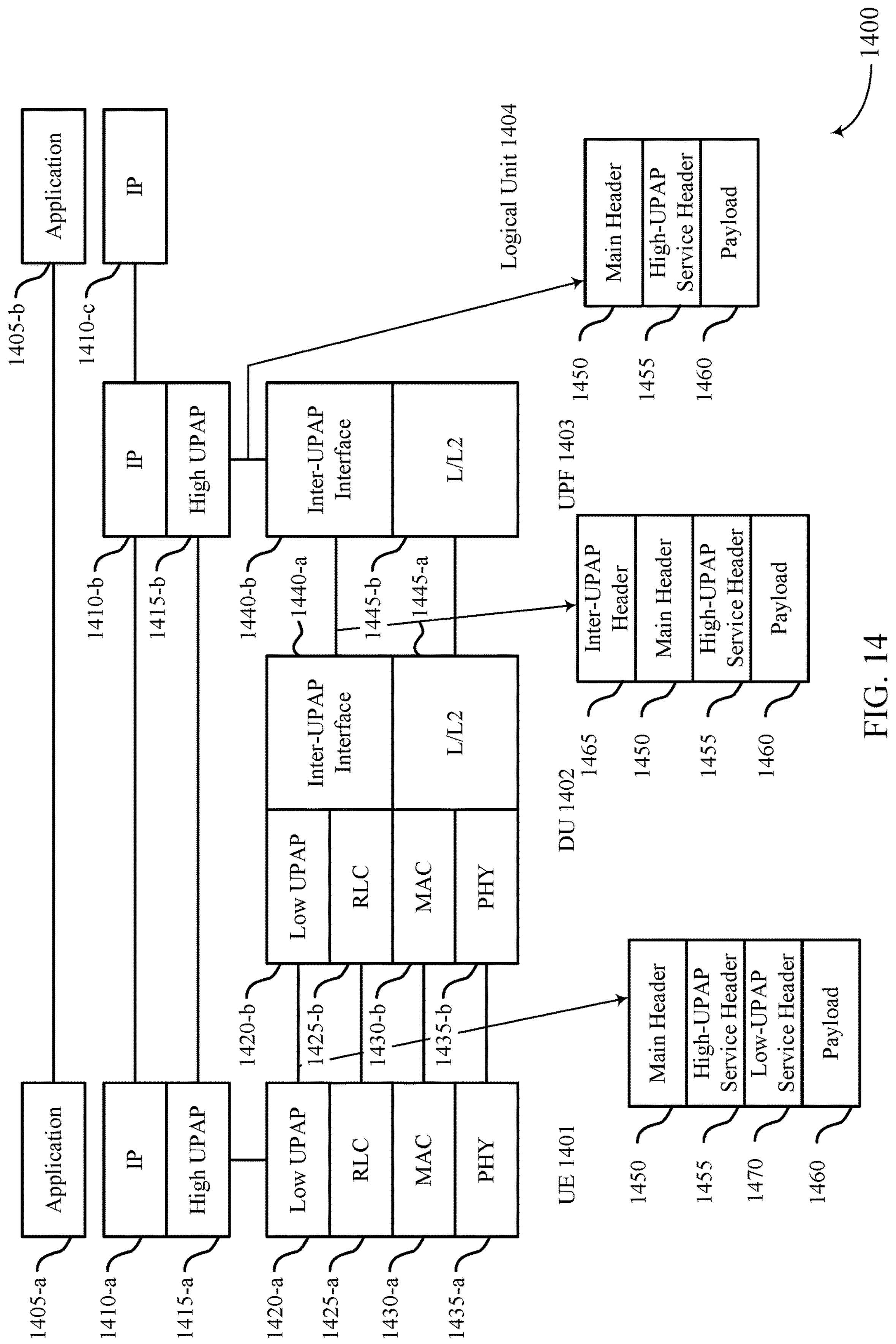
FIG. 14 shows an example of a layer architecture that supports user plane programmable layer for radio communications in accordance with one or more aspects of the present disclosure.

FIG. 14 shows an example of a layer architecture 1400 that supports a user programmable layer for radio communications in accordance with one or more aspects of the present disclosure. In some examples, layer architecture 1400 may implement one or more aspects of FIGS. 1 through 13. For instance, each component of FIG. 14 may implement some or each of the aspects of the correspondingly named components of FIGS. 1 through 13. Additionally, UPF 1403 may be an example of a logical unit 205-*c* as described with reference to FIG. 2C; DU 1402 may be an example of a network entity 105 and/or DU 165 as described with reference to FIG. 1 and/or a network entity 105-*c* as described with reference to FIG. 2C; UE 1401 may be an example of a UE 115-*c* as described with reference to FIG. 2C and/or a UE 115 as described with reference to FIG. 1; or any combination thereof.

In layer architecture 1400, UE 1401 may include an application layer entity 1405-*a*, an IP layer entity 1410-*a*, a high UPAP layer entity 1415-*a*, a low UPAP layer entity 1420-*a*, an RLC layer entity 1425-*a*, a MAC layer entity 1430-*a*, and a PHY layer entity 1435-*a*. DU 1402 may include low UPAP layer entity 1420-*b*, RLC layer entity 1425-*b*, MAC layer entity 1430-*b*, and PHY layer entity 1435-*b*. Additionally, DU 1402 may include inter-UPAP interface entity 1440-*a* and layer interface entity 1445-*a*. UPF 1403 may include IP layer entity 1410-*b*, high UPAP layer entity 1415-*b*, inter-UPAP interface entity 1440-*b*, and layer interface entity 1445-*b*. Logical unit 1404 may include application layer entity 1405-*b* and IP layer entity 1410-*c*. Application layer entity 1405-*a* may interface with application layer entity 1405-*b*; IP layer entity 1410-*a* may interface with IP layer entity 1410-*b*, which may interface with IP layer entity 1410-*c*; high UPAP layer entity 1415-*a* may interface with high UPAP layer entity 1415-*b*; low UPAP layer entity 1420-*a* may interface with low UPAP layer entity 1420-*b*; RLC layer entity 1425-*a* may interface with RLC layer entity 1425-*b*; MAC layer entity 1430-*a* may interface with MAC layer entity 1430-*b*; PHY layer entity 1435-*a* may interface with PHY layer entity 1435-*b*; inter-UPAP interface entity 1440-*a* may interface inter-UPAP interface entity 1440-*b*; and layer interface entity 1445-*a* may interface with layer interface entity 1445-*b*. In some examples, high UPAP layer entity 1415-*b* may interface with inter-UPAP interface entity 1440-*b* and low UPAP layer entity 1420-*a* may interface with high UPAP layer entity 1415-*a*.

In some examples, an inter-UPAP interface may be employed for communication between a high UPAP and a low UPAP in UPF 1403 and DU 1402, respectively (or between two DUs). The inter-UPAP interface may carry a main UPAP header and/or one or more service headers. In some examples, the low UPAP may be programmed through the interface to parse the high UPAP headers and amend, modify, or remove headers. Additionally or alternatively, the low UPAP may be programmed to parse the headers and perform operations on them (e.g., prioritization or scheduling). In some examples, the high UPAP may be used to perform end to end tasks and the low UPAP may be used to perform tasks over a specific radio interface.

In an example, high UPAP layer entity 1415-*b* may provide, to inter-UPAP interface entity 1440-*b*, a message that includes a main header 1450, a high-UPAP service header 1455, and a payload 1460. Inter-UPAP interface entity 1440-*b*, upon receiving the message, may insert an inter-UPAP header 1465 onto the message and may provide the message with the inter-UPAP header 1465 to inter-UPAP interface entity 1440-*a*. Inter-UPAP interface entity 1440-*a* may extract the inter-UPAP header 1465 and may provide the message to low UPAP layer entity 1420-*b*, which may insert a low-UPAP service header 1470 into the message.

Low UPAP layer entity 1420-*b* may provide the message with the low-UPAP service header 1470 to low UPAP layer entity 1420-*a*.

In some examples, inter-UPAP header 1465 may include a node ID to enable the UPF 1403 and/or DUs along the path to find DU 1402. Additionally or alternatively, inter-UPAP header 1465 may encode instructions and/or measurements to and/or from DU 1402. In some examples, inter-UPAP header 1465 may carry UPAP PDUs that have already been processed by the high UPAP and that flow through the inter-UPAP interface. The inter-UPAP interface may deliver PDUs between the high UPAP and a low UPAP or between two low UPAPs.

Figure 15:
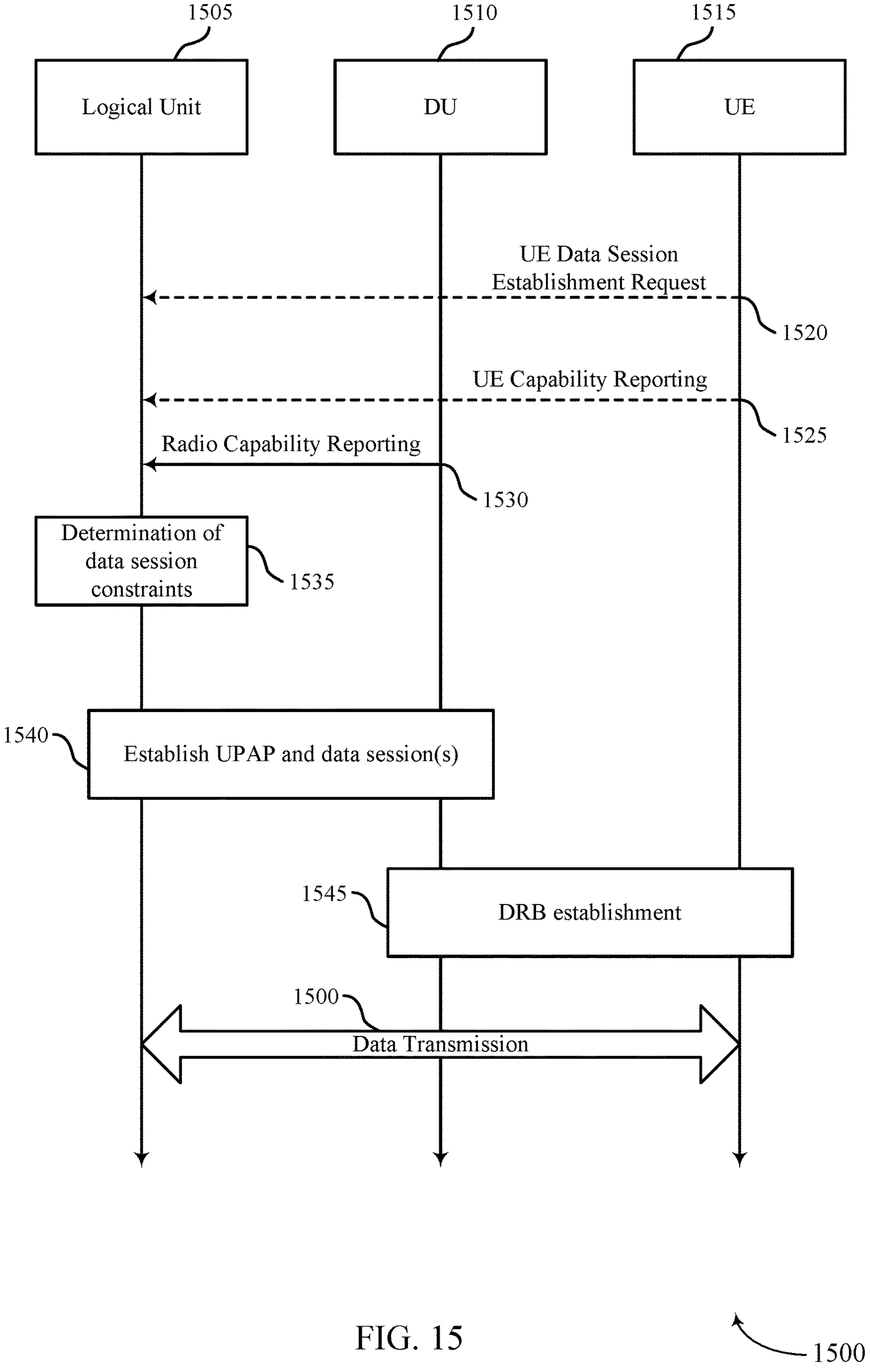
FIG. 15 shows an example of a process flow that supports user plane programmable layer for radio communications in accordance with one or more aspects of the present disclosure.

FIG. 15 shows an example of a process flow 1500 that supports a user programmable layer for radio communications in accordance with one or more aspects of the present disclosure. In some examples, process flow 1500 may implement one or more aspects of the present disclosure. In some examples, process flow 1500 may implement one or more aspects of FIGS. 1 through 14. For instance, each component of FIG. 15 may implement some or each of the aspects of the correspondingly named components of FIGS. 1 through 14. Additionally, logical unit 1505 may be an example of a logical unit 205-*c* as described with reference to FIG. 2C; DU 1510 may be an example of a network entity 105 and/or DU 165 as described with reference to FIG. 1 and/or a network entity 105-*c* as described with reference to FIG. 2C; UE 1515 may be an example of a UE 115-*c* as described with reference to FIG. 2C and/or a UE 115 as described with reference to FIG. 1; or any combination thereof. In some examples, process flow 1500 may be used when layer architecture 1400 is employed and/or may represent a procedure performed by the devices of wireless communications system 200-*c*.

In some examples, process flow 1500 may be utilized in order to enable a UE 1515 and a logical unit 1505 to communicate messages including main headers and service headers (e.g., low UPAP service headers and high UPAP service headers), where the service headers may be used to realize a QoS model (e.g., different service headers may be tailored to different QoS flows and may include parameter values used for communicating information associated with those QoS flows), to carry instructions and/or parameters, or both. For instance, at 1520, UE 1515 may transmit UE data session establishment request to logical unit 1505 (e.g., via DU 1510). At 1525, UE 1515 may transmit UE capability reporting to logical unit 1505. At 1530, DU 1530 may transmit radio capability reporting to logical unit 1505. In some examples, radio capability reporting may provide an indication of a capability of DU 1510 as well as its programmable APIs. At 1535, logical unit 1505 may perform a determination of data session constraints. At 1540, logical unit 1505 may establish one or more data sessions and UPAP with DU 1510. At 1545, DU 1510 may establish one or more DRBs with UE 1515.

At 1550, data transmission may occur between logical unit 1505 and UE 1515 (e.g., via DU 1510). For instance, logical unit 1505 may identify an IP packet (e.g., received from an external network) and may insert a main header and a high UPAP service header onto the IP packet using the established high UPAP layer entity at logical unit 1505 (e.g., high UPAP layer entity 1415-*b* as described in FIG. 14). Logical unit 1505 may provide a message including the main header, the high UPAP service header, and the IP packet to DU 1510 (e.g., via an inter-UPAP interface as described herein). DU 1510 may perform radio functions using a low UPAP layer entity, an RLC layer entity, a MAC layer entity, and a PHY layer entity (e.g., low UPAP layer entity 1420-*b*, RLC layer entity 1425-*b*, MAC layer entity 1430-*b*, and PHY layer entity 1435-*b* as described with reference to FIG. 14) and may generate a second message to transmit to the UE 1515 based on the message obtained from the logical unit 1505. The DU 1510 may transmit the second message to the UE 1515, which may use radio functions to identify the main header, the service header, and the IP packet.

Figure 16:
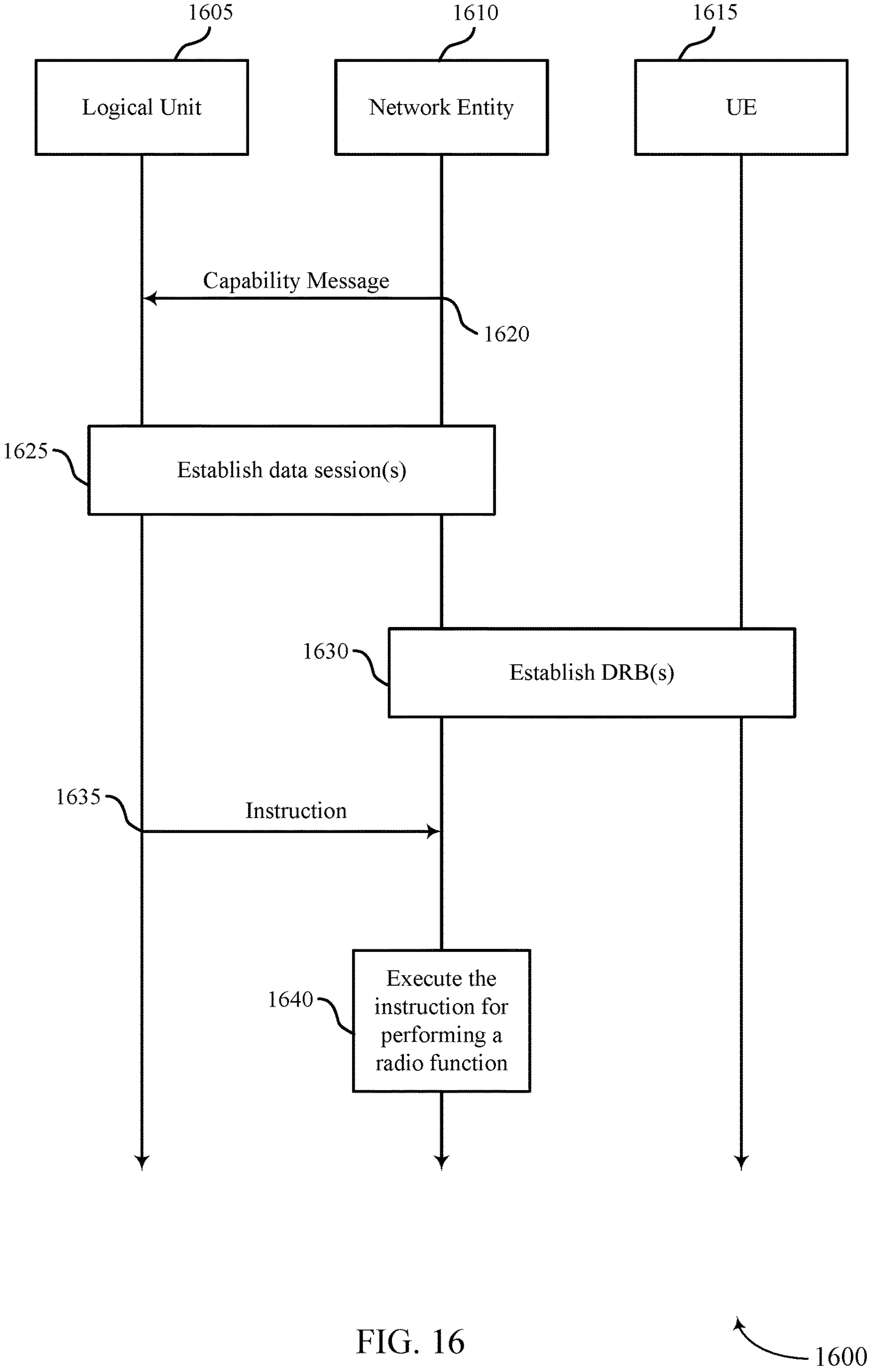
FIG. 16 shows an example of a process flow that supports user plane programmable layer for radio communications in accordance with one or more aspects of the present disclosure.

FIG. 16 shows an example of a process flow 1600 that supports a user programmable layer for radio communications in accordance with one or more aspects of the present disclosure. In some examples, process flow 1600 may implement one or more aspects of the present disclosure. In some examples, process flow 1600 may implement one or more aspects of FIGS. 1 through 15. For instance, each component of FIG. 16 may implement some or each of the aspects of the correspondingly named components of FIGS. 1 through 15. Additionally, logical unit 1605 may be an example of a logical unit 205-*a*, 205-*b*, or 205-*c* as described with reference to FIGS. 2A-2C; network entity 1610 may be an example of a network entity 105 and/or DU 165 as described with reference to FIG. 1 and/or a network entity 105-*a*, a network entity 105-*b*, or a network entity 105-*c* as described with reference to FIGS. 2A-2C; UE 1615 may be an example of a UE 115-*a*, a UE 115-*b*, or a UE 115-*c* as described with reference to FIGS. 2A-2C and/or a UE 115 as described with reference to FIG. 1; or any combination thereof.

At 1620, network entity 1610 may transmit, to logical unit 1605, a capability message that indicates that network entity 1610 supports instructions for a service associated with a radio layer for wireless communication with one or more UEs (e.g., UE 1615). In some examples, the logical unit 1605 is a second network entity.

At 1625, network entity 1610 may establish, with logical unit 1605, a data session associated with a UE of the one or more UEs (e.g., UE 1615) based on transmitting the capability message.

At 1630, network entity 1610 may establish, with UE 1615, a data radio bearer based on the data session.

At 1635, logical unit 1605 may transmit, to network entity 1610, an instruction for performing a radio function associated with the service with the UE based on the data session.

At 1640, network entity 1610 may execute the instruction for performing the radio function at the radio layer.

In some examples, network entity 1610 may receive a first message (e.g., from logical unit 1605) including the instruction, a packet, and a header. The network entity 1610 may transmit a second message including a first radio link control service data unit based on establishing the data radio bearer with the UE 1615. In some such examples, the second radio link control service data unit may include the header and a response for the packet. The network entity 1610 may receive a third message (e.g., from UE 1615) including a second radio link control service data unit based on the second message, where the second radio link control service data unit includes the header and a response for the packet. The network entity 1610 may embed a header in a fourth message, where the fourth message includes a response for the packet and may transmit a fourth message based on the instruction (e.g., to logical unit 1605). In some examples, the instruction may be executed after receiving the third message (e.g., and before transmitting the fourth message). In some examples, the fourth message includes a service header associated with a flow between the UE 1615 and the logical unit 1605. In some such examples, the service header may include a parameter based on the instruction.

In some examples, network entity 1610 may receive a first message (e.g., from logical unit 1605) including the instruction and a packet. In some such examples, network entity 1610 may transmit a second message (e.g., to UE 1615) including the packet based on establishing the data radio bearer with the UE and the instruction. Additionally, the instruction may be executed before transmitting the second message.

Figure 17:
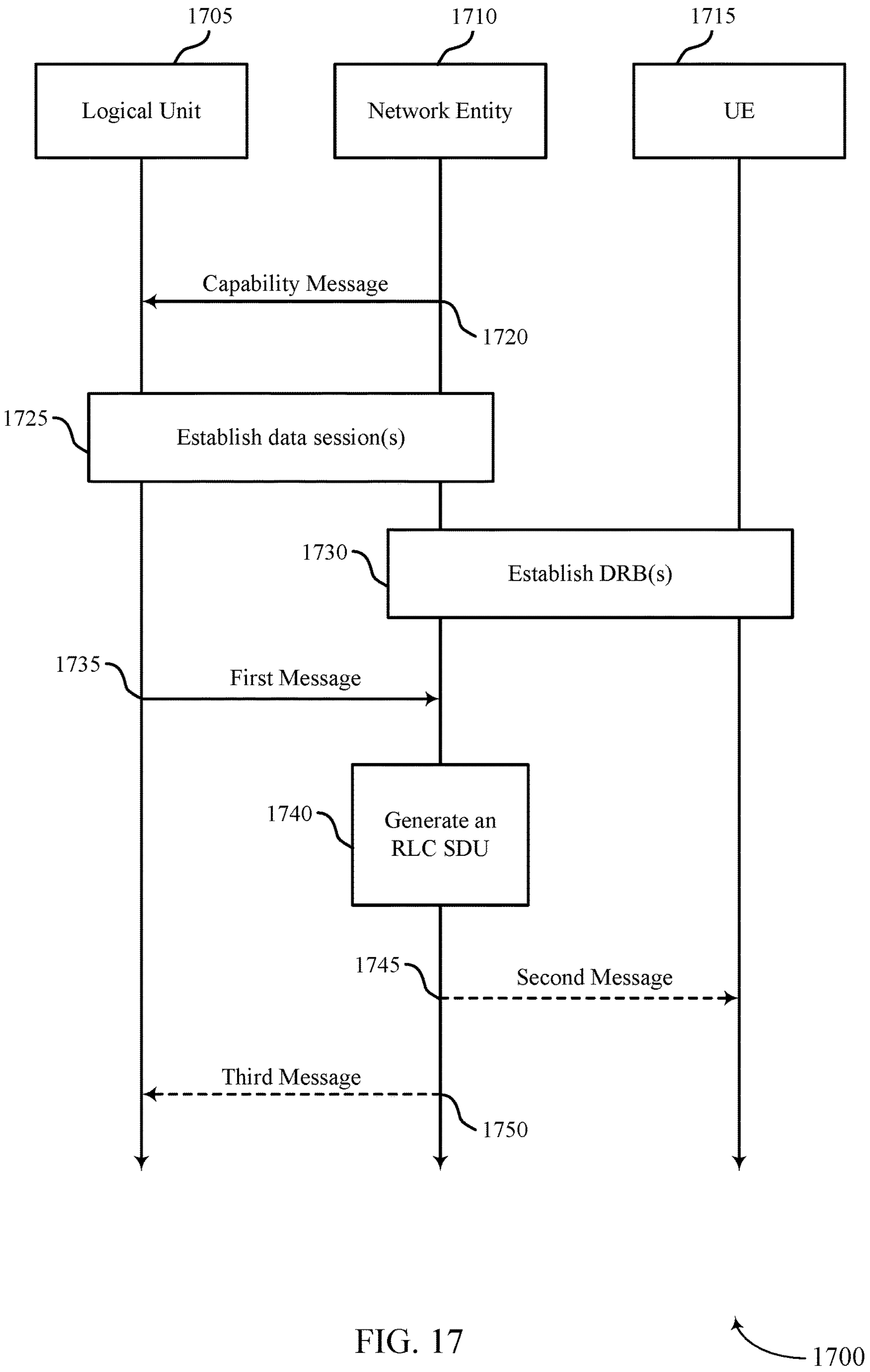
FIG. 17 shows an example of a process flow that supports user plane programmable layer for radio communications in accordance with one or more aspects of the present disclosure.

FIG. 17 shows an example of a process flow 1700 that supports a user programmable layer for radio communications in accordance with one or more aspects of the present disclosure. In some examples, process flow 1700 may implement one or more aspects of the present disclosure. In some examples, process flow 1700 may implement one or more aspects of FIGS. 1 through 16. For instance, each component of FIG. 17 may implement some or each of the aspects of the correspondingly named components of FIGS. 1 through 16. Additionally, logical unit 1705 may be an example of a logical unit 205-*a*, 205-*b*, or 205-*c* as described with reference to FIGS. 2A-2C; network entity 1710 may be an example of a network entity 105 and/or DU 165 as described with reference to FIG. 1 and/or a network entity 105-*a*, a network entity 105-*b*, or a network entity 105-*c* as described with reference to FIGS. 2A-2C; UE 1715 may be an example of a UE 115-*a*, a UE 115-*b*, or a UE 115-*c* as described with reference to FIGS. 2A-2C and/or a UE 115 as described with reference to FIG. 1; or any combination thereof.

At 1720, network entity 1710 may transmit, to logical unit 1705, a capability message that indicates a service that network entity 1710 supports.

At 1725, network entity 1710 may establish, with logical unit 1705, a data session associated with a flow between the logical unit 1705 and UE 1715 based on transmitting the capability message.

At 1730, network entity 1710 may establish, with UE 1715, a data radio bearer associated with the flow based on the data session.

At 1735, logical unit 1705 may transmit a first message associated with the flow to network entity 1710. In some examples, the first message may include a first header associated with a first layer based on the data session with the logical unit. In some examples, the first header may include an indication that the first message is to be processed by the network entity 1710 prior to generating the radio link control service data unit, where the second header is based on the indication that the first message is to be processed by the network entity 1710. In some examples, the first header may include an identifier of the network entity 1710, an instruction, a measurement, information about the data session (e.g., an indication of a strategy or a set of rules for performing energy saving), or any combination thereof. In some examples, the logical unit 1705 is a second network entity, a UPF, or both.

In some examples, the first message may include a main header and a first service header associated with a service. In some such examples, the second message may include the main header, the first service header, and a second service header associated with a radio function of the network entity. In some such examples, logical unit 1705 may transmit, to network entity 1710, multiple messages that includes the first message, where each of the multiple messages includes a service header associated with the service. The network entity 1710 may perform prioritization on the multiple messages based on the respective service headers, where transmitting the second message is based on the prioritization. Additionally or alternatively, the network entity 1710 may modify the first service header based on an instruction received from a second logical unit, where transmitting the second message is based on the modified first service header. Additionally or alternatively, the network entity 1710 may add a third service header to the second message based on an instruction received from a second logical unit. In some examples, the first message includes a set of service headers including the first service header and the second message includes a subset of the set of service headers including the first service header, where the subset of the set of service headers excludes at least one service header of the set of service headers (e.g., a service header may be removed).

In some examples, the first message may include a main header, a service header associated with the first layer, an indication that the service header is to be processed by network entity 1710, an instruction for performing a radio function associated with the service with UE 1715, or any combination thereof. In some examples, the indication that the service header is to be processed by the network entity 1710 includes an indication to perform the processing prior to generating a service data unit associated with a radio link control layer, an indication to insert the service header in to the first message, or both. In some examples, the service header may include an identifier of the network entity 1710, a second instruction, a measurement, or any combination thereof.

At 1740, network entity 1710 may generate an RLC SDU that includes a second header associated with the first layer based on the first header and one or more radio functions of the network entity.

At 1745, the network entity 1710 may transmit, via the data radio bearer, a second message including the radio link control service data unit. In some examples the second message may include the main header based on the first message.

At 1750, the network entity 1710 may transmit a third message to logical unit 1705.

Figure 18:
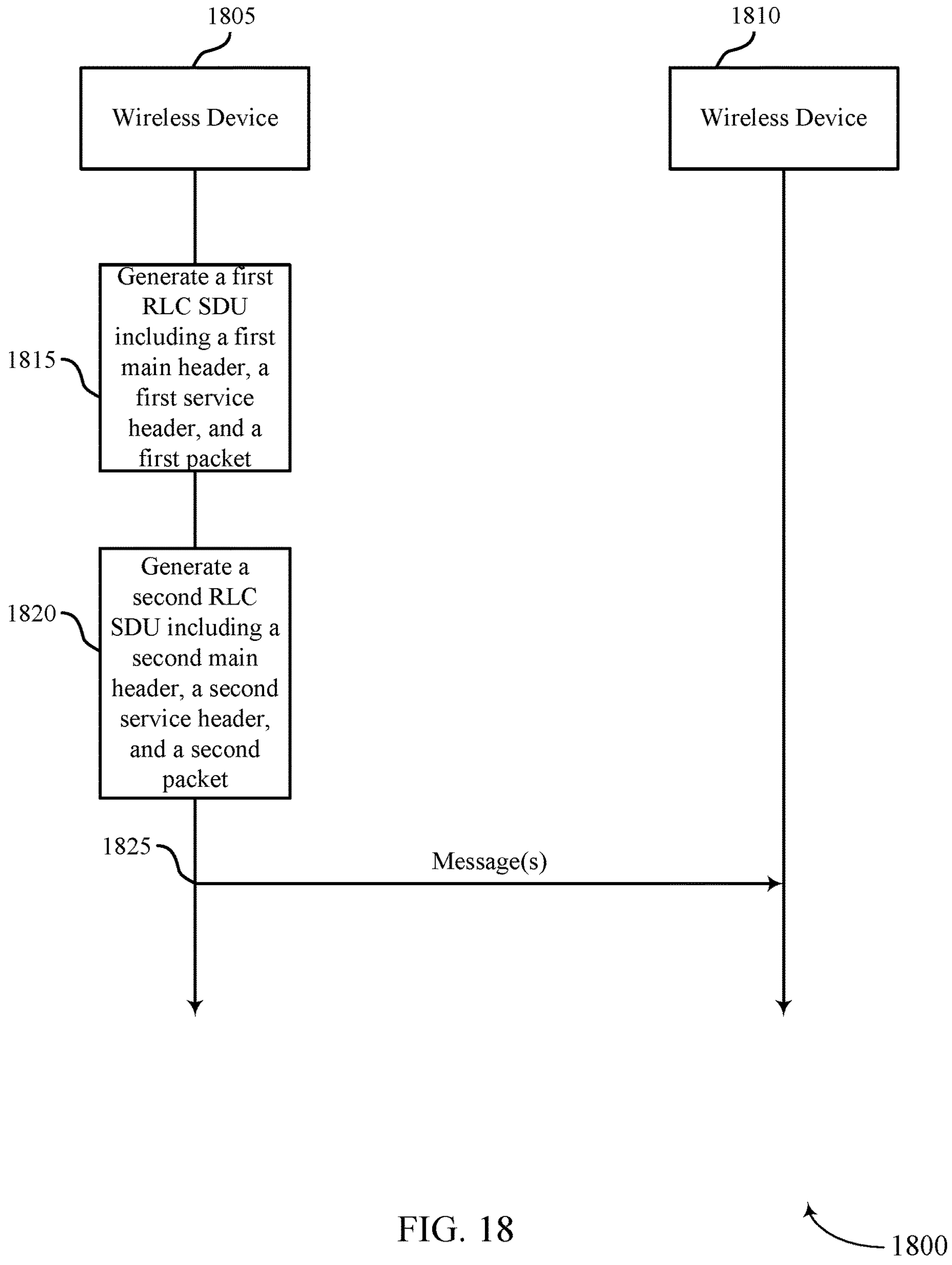
FIG. 18 shows an example of a process flow that supports user plane programmable layer for radio communications in accordance with one or more aspects of the present disclosure.

FIG. 18 shows an example of a process flow 1800 that supports user plane programmable layer for radio communications in accordance with one or more aspects of the present disclosure. In some examples, process flow 1800 may implement one or more aspects of the present disclosure. In some examples, process flow 1800 may implement one or more aspects of FIGS. 1 through 17. For instance, each component of FIG. 18 may implement some or each of the aspects of the correspondingly named components of FIGS. 1 through 17. Additionally, wireless devices 1805 and 1810 may each be an example of a logical unit 205-*a*, 205-*b*, or 205-*c* as described with reference to FIGS. 2A-2C; a network entity 105 and/or DU 165 as described with reference to FIG. 1 and/or a network entity 105-*a*, a network entity 105-*b*, or a network entity 105-*c* as described with reference to FIGS. 2A-2C; a UE 115-*a*, a UE 115-*b*, or a UE 115-*c* as described with reference to FIGS. 2A-2C and/or a UE 115 as described with reference to FIG. 1; or any combination thereof.

At 1815, wireless device 1805 may generate a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE.

At 1820, wireless device 1805 may generate a second service data unit associated with the radio link control layer, the second service data unit including a second packet, a second main header associated with the first layer, and a second service header for the second packet associated with the service. In some examples, each of the second main header and the second service header are associated with the flow between the logical unit and the UE. In some such examples, the first service header and the second service header are distinct from each other.

At 1825, wireless device 1805 may output one or more messages including the first service data unit and the second service data unit.

In examples in which the wireless device 1805 is a network entity and the wireless device 1810 is a UE, the wireless device 1805 may establish, with the wireless device 1810, a data radio bearer. In some such examples, the one or more messages are output by the network entity and are based on establishing the data radio bearer with the wireless device 1810. In examples in which the wireless device 1805 is a UE and the wireless device 1810 is a network entity, the wireless device 1810 may establish a data radio bearer with the wireless device 1805. In some such examples, the one or more messages are output by the UE and are based on wireless device 1810 establishing the data radio bearer with the wireless device 1805.

In some examples, the wireless device 1805 may obtain a first message including the first packet, the first main header, and the first service header (e.g., from a logical unit) and may modify the first service header based on the first message, where the first service data unit is generated based on the modified first header. In some examples, modifying the first service header may include updating a timestamp (e.g., a timestamp contained by the first service header). In some examples, the wireless device 1805 may obtain a first message including the first packet, the first main header, the first service header, and a third service header associated with a second service. In such examples, the wireless device 1805 may remove the third service header when generating the first service data unit such that the first service data unit excludes the third service header. In some examples, the wireless device 1805 may obtain a first message including the first packet, the first main header, and the first service header. In such examples, the wireless device 1805 may add a third service header when generating the first service data unit such that the first service data unit includes the third service header, where the first message excludes the third service header.

In some examples, the first service header, the second service header, or both may include an instruction. In some such examples, the instruction may indicate than acknowledgement (e.g., ACK feedback) is to be sent upon receipt of the one or more messages, that packets associated with the one or more messages are to be reordered according to an arrangement indicated by the instruction, that the packets associated with the one or more messages are to be dropped after a threshold time, that the packets associated with the one or more messages are to be timestamped, or any combination thereof.

In some examples, the first service header includes a reordering timer, a reordering domain, an indication to drop the first packet after the reordering timer expires, an indication to transmit acknowledgement feedback for the first packet, or any combination thereof. In some examples, the first main header and the second main header each include a data control flag, a header length, a sequence number, information associated with extension fields, or any combination thereof.

Figure 19:
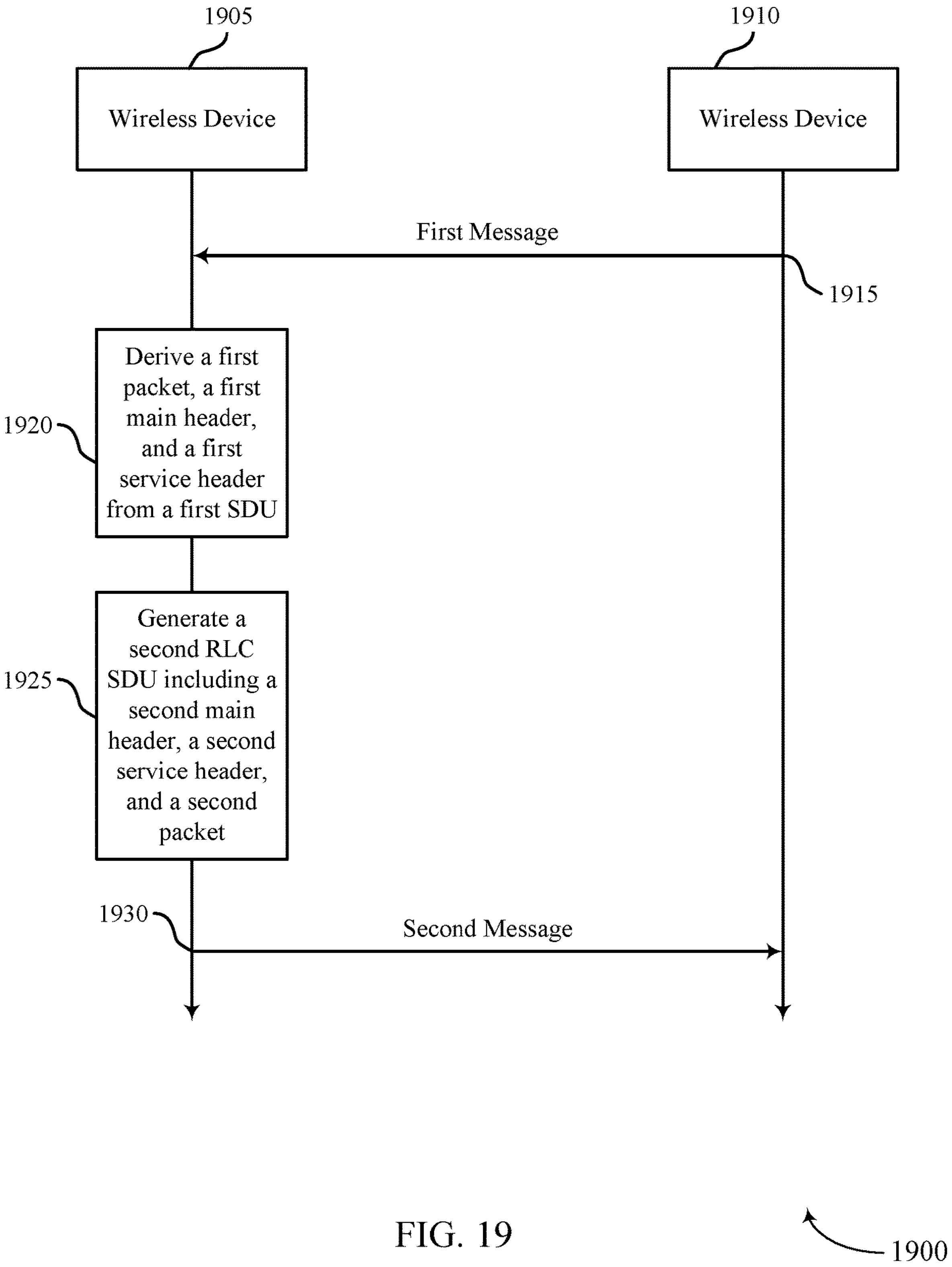
FIG. 19 shows an example of a process flow that supports user plane programmable layer for radio communications in accordance with one or more aspects of the present disclosure.

FIG. 19 shows an example of a process flow 1900 that supports user plane programmable layer for radio communications in accordance with one or more aspects of the present disclosure. In some examples, process flow 1900 may implement one or more aspects of the present disclosure. In some examples, process flow 1900 may implement one or more aspects of FIGS. 1 through 18. For instance, each component of FIG. 19 may implement some or each of the aspects of the correspondingly named components of FIGS. 1 through 18. Additionally, wireless devices 1905 and 1910 may each be an example of a logical unit 205-*a*, 205-*b*, or 205-*c* as described with reference to FIGS. 2A-2C; a network entity 105 and/or DU 165 as described with reference to FIG. 1 and/or a network entity 105-*a*, a network entity 105-*b*, or a network entity 105-*c* as described with reference to FIGS. 2A-2C; a UE 115-*a*, a UE 115-*b*, or a UE 115-*c* as described with reference to FIGS. 2A-2C and/or a UE 115 as described with reference to FIG. 1; or any combination thereof.

At 1915, wireless device 1910 may communicate, with wireless device 1905, a first service data unit associated with a radio link control layer.

At 1920, wireless device 1905 may derive, from the first service data unit, a first packet, a first main header for the first packet associated with a first layer above the radio link control layer, and a first service header for the first packet associated with a service provided by one or more network entities in a network. In some such examples, each of the first main header and the first service header are associated with a flow between a logical unit and a UE.

At 1925, wireless device 1905 may generate a second service data unit associated with the radio link control layer and including a second packet, a second main header, and a second service header associated with the service, where each of the second main header and the second service header are associated with the flow between the logical unit and the UE. In some such examples, the second service header may be based on the first service header and the second service header distinct from the first service header.

At 1930, wireless device 1905 may communicate, with wireless device 1910, a second message that includes the second service data unit.

In examples in which the wireless device 1905 is a network entity and the wireless device 1910 is a UE, the wireless device 1905 may establish, with the wireless device 1910, a data radio bearer. In some such examples, the one or more messages are output by the network entity and are based on establishing the data radio bearer with the wireless device 1910. In examples in which the wireless device 1905 is a UE and the wireless device 1910 is a network entity, the wireless device 1910 may establish a data radio bearer with the wireless device 1905. In some such examples, the one or more messages are output by the UE and are based on wireless device 1910 establishing the data radio bearer with the wireless device 1905.

In some examples, the first service header includes information about the first packet, a reordering timer, a reordering domain, an indication to drop the first packet after the reordering timer expires, an indication to transmit acknowledgement feedback for the first packet, or any combination thereof. In some examples, the first main header and the second main header may each include a data control flag, a header length, a sequence number, information associated with extension fields, or any combination thereof.

Figure 20:
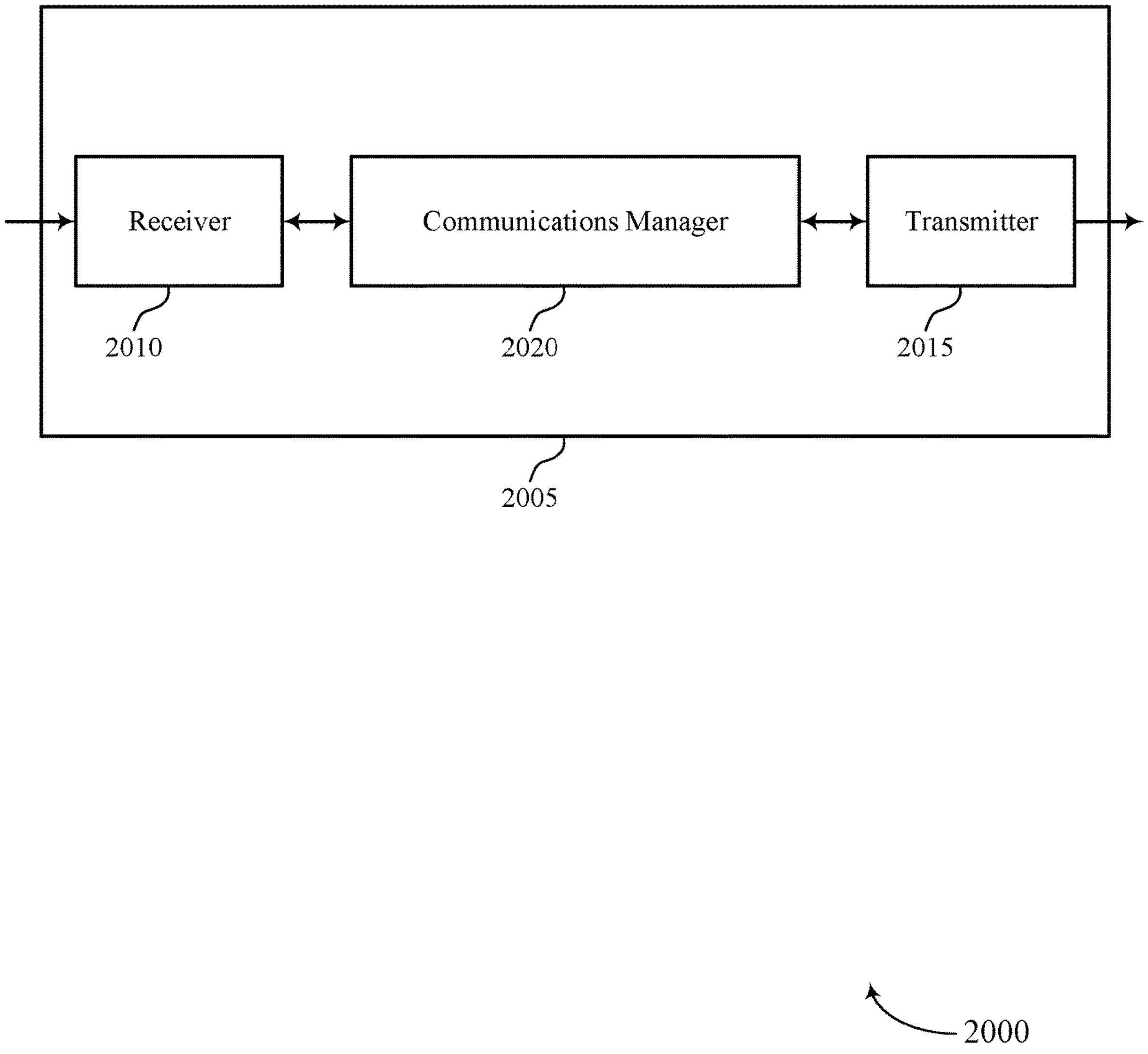
FIGS. 20 and 21 show block diagrams of devices that support user plane programmable layer for radio communications in accordance with one or more aspects of the present disclosure.

FIG. 20 shows a block diagram 2000 of a device 2005 that supports user plane programmable layer for radio communications in accordance with one or more aspects of the present disclosure. The device 2005 may be an example of aspects of a wireless device as described herein. The device 2005 may include a receiver 2010, a transmitter 2015, and a communications manager 2020. The device 2005 may also include one or more processors. Each of these components may be in communication with one another (e.g., via one or more buses).

The receiver 2010 may provide a means for obtaining (e.g., receiving, determining, identifying) information such as user data, control information, or any combination thereof (e.g., in-phase and quadrature (I/Q) samples, symbols, packets, protocol data units, service data units) associated with various channels (e.g., control channels, data channels, information channels, channels associated with a protocol stack). Information may be passed on to other components of the device 2005. In some examples, the receiver 2010 may support obtaining information by receiving signals via one or more antennas. Additionally, or alternatively, the receiver 2010 may support obtaining information by receiving signals via one or more wired (e.g., electrical, fiber optic) interfaces, wireless interfaces, or any combination thereof.

The transmitter 2015 may provide a means for outputting (e.g., transmitting, providing, conveying, sending) information generated by other components of the device 2005. For example, the transmitter 2015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 2015 may support outputting information by transmitting signals via one or more antennas. Additionally, or alternatively, the transmitter 2015 may support outputting information by transmitting signals via one or more wired (e.g., electrical, fiber optic) interfaces, wireless interfaces, or any combination thereof. In some examples, the transmitter 2015 and the receiver 2010 may be co-located in a transceiver, which may include or be coupled with a modem.

The communications manager 2020, the receiver 2010, the transmitter 2015, or various combinations thereof or various components thereof may be examples of means for performing various aspects of user plane programmable layer for radio communications as described herein. For example, the communications manager 2020, the receiver 2010, the transmitter 2015, or various combinations or components thereof may support a method for performing one or more of the functions described herein.

In some examples, the communications manager 2020, the receiver 2010, the transmitter 2015, or various combinations or components thereof may be implemented in hardware (e.g., in communications management circuitry). The hardware may include one or more processors, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, one or more processors and memory coupled with the one or more processors may be configured to perform one or more of the functions described herein (e.g., by executing, by the one or more processors, instructions stored in the memory).

Additionally, or alternatively, in some examples, the communications manager 2020, the receiver 2010, the transmitter 2015, or various combinations or components thereof may be implemented in code (e.g., as communications management software or firmware) executed by one or more processors. If implemented in code executed by one or more processors, the functions of the communications manager 2020, the receiver 2010, the transmitter 2015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 2020 may be configured to perform various operations (e.g., receiving, obtaining, monitoring, outputting, transmitting) using or otherwise in cooperation with the receiver 2010, the transmitter 2015, or both. For example, the communications manager 2020 may receive information from the receiver 2010, send information to the transmitter 2015, or be integrated in combination with the receiver 2010, the transmitter 2015, or both to obtain information, output information, or perform various other operations as described herein.

The communications manager 2020 may support wireless communications at a network entity in accordance with examples as disclosed herein. For example, the communications manager 2020 is capable of, configured to, or operable to support a means for transmitting, from the network entity to a logical unit, a capability message that indicates that the network entity supports instructions for a service associated with a radio layer for wireless communication with one or more UEs. The communications manager 2020 is capable of, configured to, or operable to support a means for establishing, with the logical unit, a data session associated with a UE of the one or more UEs based on transmitting the capability message. The communications manager 2020 is capable of, configured to, or operable to support a means for receiving, from the logical unit, an instruction for performing a radio function associated with the service with the UE based on the data session. The communications manager 2020 is capable of, configured to, or operable to support a means for executing the instruction for performing the radio function at the radio layer.

Additionally, or alternatively, the communications manager 2020 may support wireless communications at a network entity in accordance with examples as disclosed herein. For example, the communications manager 2020 is capable of, configured to, or operable to support a means for transmitting, to a logical unit, a capability message that indicates a service that the network entity supports. The communications manager 2020 is capable of, configured to, or operable to support a means for establishing, with the logical unit, a data session associated with a flow between the logical unit and a UE based on transmitting the capability message. The communications manager 2020 is capable of, configured to, or operable to support a means for establishing, with the UE, a data radio bearer associated with the flow based on the data session. The communications manager 2020 is capable of, configured to, or operable to support a means for receiving, from the logical unit, a first message associated with the flow including a first header associated with a first layer based on the data session with the logical unit. The communications manager 2020 is capable of, configured to, or operable to support a means for generating a radio link control service data unit that includes a second header associated with the first layer based on the first header and one or more radio functions of the network entity. The communications manager 2020 is capable of, configured to, or operable to support a means for transmitting, via the data radio bearer, a second message including the radio link control service data unit.

Additionally, or alternatively, the communications manager 2020 may support wireless communications at a logical unit in accordance with examples as disclosed herein. For example, the communications manager 2020 is capable of, configured to, or operable to support a means for receiving a capability message indicating that a network entity supports instructions for a service associated with a radio layer for wireless communication with a UE. The communications manager 2020 is capable of, configured to, or operable to support a means for establishing a data session associated with a flow between the logical unit and the UE based on the capability message. The communications manager 2020 is capable of, configured to, or operable to support a means for transmitting a first message associated with the flow and including a main header, a service header associated with a first layer, an indication that the service header is to be processed by the network entity, and an instruction for performing a radio function associated with the service with the UE. The communications manager 2020 is capable of, configured to, or operable to support a means for receiving a second message associated with the flow and including the main header based on the first message.

By including or configuring the communications manager 2020 in accordance with examples as described herein, the device 2005 (e.g., one or more processors controlling or otherwise coupled with the receiver 2010, the transmitter 2015, the communications manager 2020, or a combination thereof) may support techniques for increased programmability and service adaptation as well as decreased overhead for at least some deployments.

Figure 21:
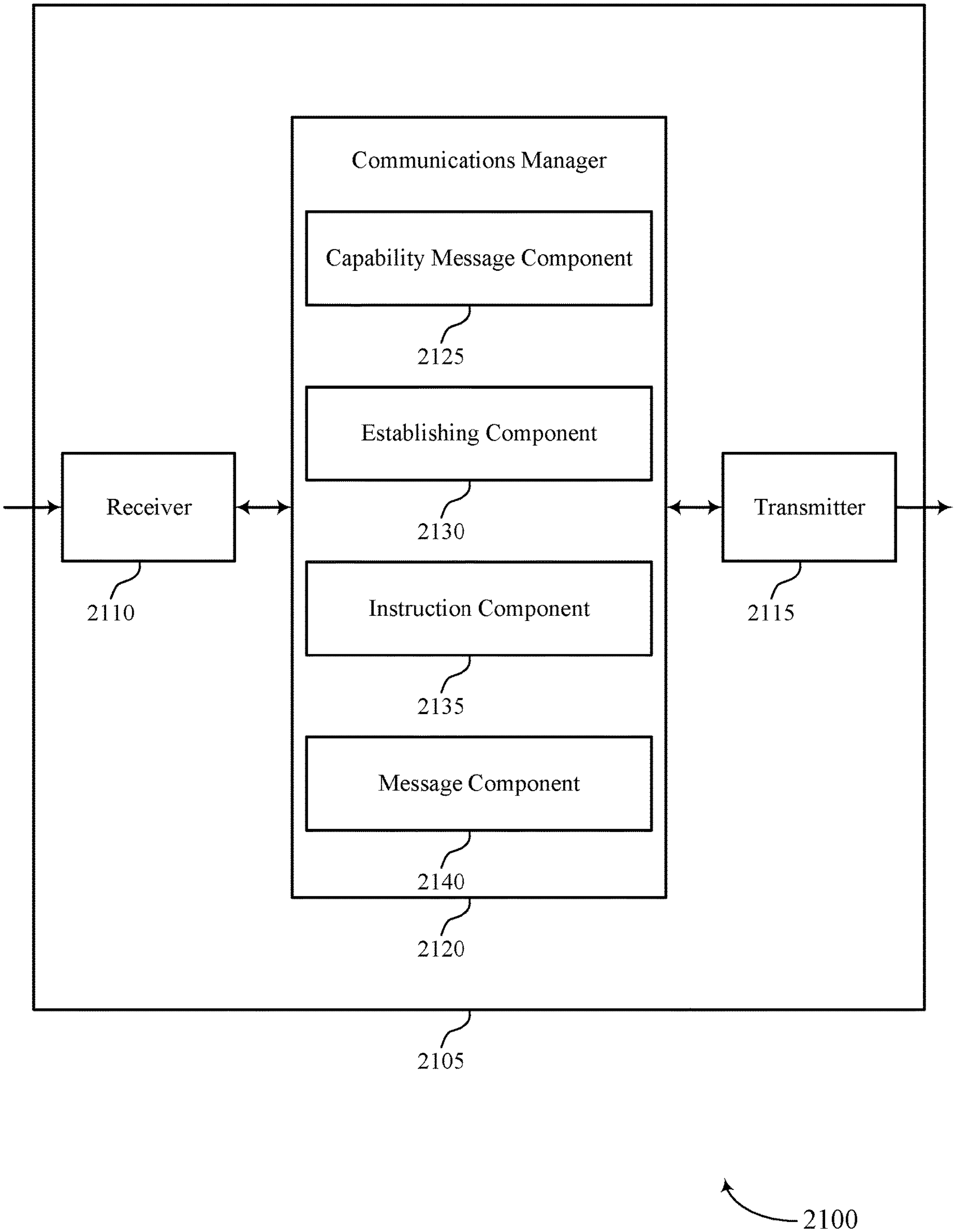

FIG. 21 shows a block diagram 2100 of a device 2105 that supports user plane programmable layer for radio communications in accordance with one or more aspects of the present disclosure. The device 2105 may be an example of aspects of a device 2005 or a wireless device as described herein. The device 2105 may include a receiver 2110, a transmitter 2115, and a communications manager 2120. The device 2105 may also include one or more processors. Each of these components may be in communication with one another (e.g., via one or more buses).

The receiver 2110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 2105. In some examples, the receiver 2110 may support obtaining information by receiving signals via one or more antennas. Additionally, or alternatively, the receiver 2110 may support obtaining information by receiving signals via one or more wired (e.g., electrical, fiber optic) interfaces, wireless interfaces, or any combination thereof.

The transmitter 2115 may provide a means for outputting (e.g., transmitting, providing, conveying, sending) information generated by other components of the device 2105. For example, the transmitter 2115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 2115 may support outputting information by transmitting signals via one or more antennas. Additionally, or alternatively, the transmitter 2115 may support outputting information by transmitting signals via one or more wired (e.g., electrical, fiber optic) interfaces, wireless interfaces, or any combination thereof. In some examples, the transmitter 2115 and the receiver 2110 may be co-located in a transceiver, which may include or be coupled with a modem.

The device 2105, or various components thereof, may be an example of means for performing various aspects of user plane programmable layer for radio communications as described herein. For example, the communications manager 2120 may include a capability message component 2125, an establishing component 2130, an instruction component 2135, a message component 2140, or any combination thereof. The communications manager 2120 may be an example of aspects of a communications manager 2020 as described herein. In some examples, the communications manager 2120, or various components thereof, may be configured to perform various operations (e.g., receiving, obtaining, monitoring, outputting, transmitting) using or otherwise in cooperation with the receiver 2110, the transmitter 2115, or both. For example, the communications manager 2120 may receive information from the receiver 2110, send information to the transmitter 2115, or be integrated in combination with the receiver 2110, the transmitter 2115, or both to obtain information, output information, or perform various other operations as described herein.

The communications manager 2120 may support wireless communications at a network entity in accordance with examples as disclosed herein. The capability message component 2125 is capable of, configured to, or operable to support a means for transmitting, from the network entity to a logical unit, a capability message that indicates that the network entity supports instructions for a service associated with a radio layer for wireless communication with one or more UEs. The establishing component 2130 is capable of, configured to, or operable to support a means for establishing, with the logical unit, a data session associated with a UE of the one or more UEs based on transmitting the capability message. The instruction component 2135 is capable of, configured to, or operable to support a means for receiving, from the logical unit, an instruction for performing a radio function associated with the service with the UE based on the data session. The instruction component 2135 is capable of, configured to, or operable to support a means for executing the instruction for performing the radio function at the radio layer.

Additionally, or alternatively, the communications manager 2120 may support wireless communications at a network entity in accordance with examples as disclosed herein. The capability message component 2125 is capable of, configured to, or operable to support a means for transmitting, to a logical unit, a capability message that indicates a service that the network entity supports. The establishing component 2130 is capable of, configured to, or operable to support a means for establishing, with the logical unit, a data session associated with a flow between the logical unit and a UE based on transmitting the capability message. The establishing component 2130 is capable of, configured to, or operable to support a means for establishing, with the UE, a data radio bearer associated with the flow based on the data session. The message component 2140 is capable of, configured to, or operable to support a means for receiving, from the logical unit, a first message associated with the flow including a first header associated with a first layer based on the data session with the logical unit. The message component 2140 is capable of, configured to, or operable to support a means for generating a radio link control service data unit that includes a second header associated with the first layer based on the first header and one or more radio functions of the network entity. The message component 2140 is capable of, configured to, or operable to support a means for transmitting, via the data radio bearer, a second message including the radio link control service data unit.

Additionally, or alternatively, the communications manager 2120 may support wireless communications at a logical unit in accordance with examples as disclosed herein. The capability message component 2125 is capable of, configured to, or operable to support a means for receiving a capability message indicating that a network entity supports instructions for a service associated with a radio layer for wireless communication with a UE. The establishing component 2130 is capable of, configured to, or operable to support a means for establishing a data session associated with a flow between the logical unit and the UE based on the capability message. The message component 2140 is capable of, configured to, or operable to support a means for transmitting a first message associated with the flow and including a main header, a service header associated with a first layer, an indication that the service header is to be processed by the network entity, and an instruction for performing a radio function associated with the service with the UE. The message component 2140 is capable of, configured to, or operable to support a means for receiving a second message associated with the flow and including the main header based on the first message.

Figure 22:
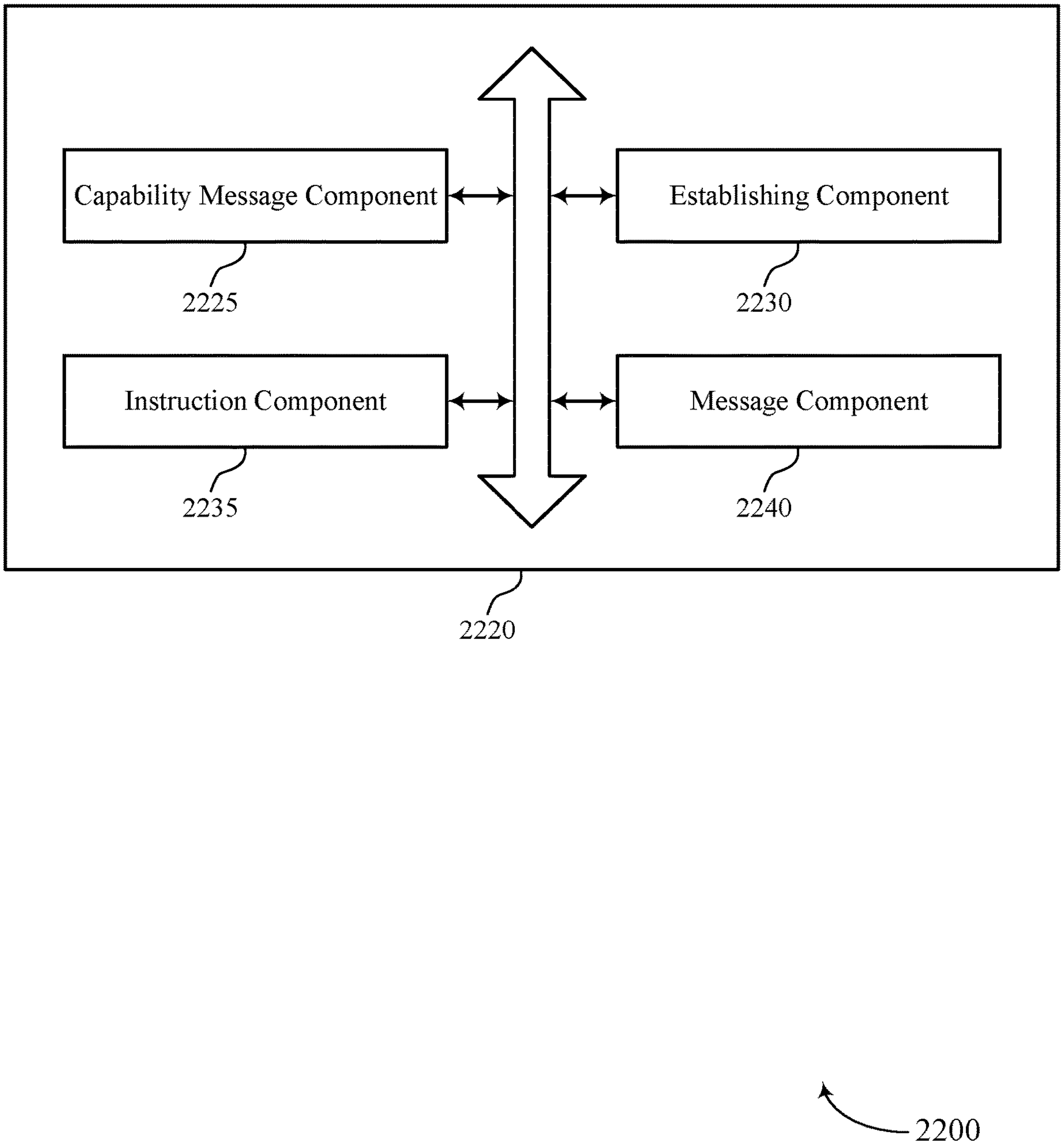
FIG. 22 shows a block diagram of a communications manager that supports user plane programmable layer for radio communications in accordance with one or more aspects of the present disclosure.

FIG. 22 shows a block diagram 2200 of a communications manager 2220 that supports user plane programmable layer for radio communications in accordance with one or more aspects of the present disclosure. The communications manager 2220 may be an example of aspects of a communications manager 2020, a communications manager 2120, or both, as described herein. The communications manager 2220, or various components thereof, may be an example of means for performing various aspects of user plane programmable layer for radio communications as described herein. For example, the communications manager 2220 may include a capability message component 2225, an establishing component 2230, an instruction component 2235, a message component 2240, or any combination thereof. Each of these components may communicate, directly or indirectly, with one another (e.g., via one or more buses).

The communications manager 2220 may support wireless communications at a network entity in accordance with examples as disclosed herein. The capability message component 2225 is capable of, configured to, or operable to support a means for transmitting, from the network entity to a logical unit, a capability message that indicates that the network entity supports instructions for a service associated with a radio layer for wireless communication with one or more UEs. The establishing component 2230 is capable of, configured to, or operable to support a means for establishing, with the logical unit, a data session associated with a UE of the one or more UEs based on transmitting the capability message. The instruction component 2235 is capable of, configured to, or operable to support a means for receiving, from the logical unit, an instruction for performing a radio function associated with the service with the UE based on the data session. In some examples, the instruction component 2235 is capable of, configured to, or operable to support a means for executing the instruction for performing the radio function at the radio layer.

In some examples, the message component 2240 is capable of, configured to, or operable to support a means for receiving a first message including the instruction, a packet, and a header. In some examples, the establishing component 2230 is capable of, configured to, or operable to support a means for establishing, with the UE, a data radio bearer based on the data session. In some examples, the message component 2240 is capable of, configured to, or operable to support a means for transmitting a second message including a first radio link control service data unit based on establishing the data radio bearer with the UE, where the first radio link control service data unit includes the packet and the header. In some examples, the message component 2240 is capable of, configured to, or operable to support a means for receiving a third message including a second radio link control service data unit based on the second message, where the second radio link control service data unit includes the header and a response for the packet. In some examples, the message component 2240 is capable of, configured to, or operable to support a means for embedding a header in a fourth message, where the fourth message includes a response for the packet. In some examples, the message component 2240 is capable of, configured to, or operable to support a means for transmitting a fourth message based on the instruction, and where the instruction is executed after receiving the third message.

In some examples, the fourth message includes a service header associated with a flow between the UE and the logical unit. In some examples, the service header includes a parameter based on the instruction.

In some examples, the message component 2240 is capable of, configured to, or operable to support a means for receiving a first message including the instruction and a packet, where executing the instruction is based on the first message. In some examples, the establishing component 2230 is capable of, configured to, or operable to support a means for establishing, with the UE, a data radio bearer based on the data session. In some examples, the message component 2240 is capable of, configured to, or operable to support a means for transmitting a second message including the packet based on establishing the data radio bearer with the UE and the instruction, where the instruction is executed before transmitting the second message.

In some examples, the logical unit includes a second network entity.

Additionally, or alternatively, the communications manager 2220 may support wireless communications at a network entity in accordance with examples as disclosed herein. In some examples, the capability message component 2225 is capable of, configured to, or operable to support a means for transmitting, to a logical unit, a capability message that indicates a service that the network entity supports. In some examples, the establishing component 2230 is capable of, configured to, or operable to support a means for establishing, with the logical unit, a data session associated with a flow between the logical unit and a UE based on transmitting the capability message. In some examples, the establishing component 2230 is capable of, configured to, or operable to support a means for establishing, with the UE, a data radio bearer associated with the flow based on the data session. The message component 2240 is capable of, configured to, or operable to support a means for receiving, from the logical unit, a first message associated with the flow including a first header associated with a first layer based on the data session with the logical unit. In some examples, the message component 2240 is capable of, configured to, or operable to support a means for generating a radio link control service data unit that includes a second header associated with the first layer based on the first header and one or more radio functions of the network entity. In some examples, the message component 2240 is capable of, configured to, or operable to support a means for transmitting, via the data radio bearer, a second message including the radio link control service data unit.

In some examples, the first message includes a main header and a first service header associated with a service. In some examples, the second message includes the main header, the first service header, and a second service header associated with a radio function of the network entity.

In some examples, the message component 2240 is capable of, configured to, or operable to support a means for receiving, from the logical unit, a set of multiple messages including the first message, each of the set of multiple messages including a service header associated with the service. In some examples, the message component 2240 is capable of, configured to, or operable to support a means for performing prioritization on the set of multiple messages based on the respective service headers, where transmitting the second message is based on the prioritization.

In some examples, the message component 2240 is capable of, configured to, or operable to support a means for modifying the first service header based on an instruction received from a second logical unit, where transmitting the second message is based on the modified first service header.

In some examples, the first message includes a set of service headers including the first service header, and the message component 2240 is capable of, configured to, or operable to support a means for adding a third service header to the second message based on an instruction received from a second logical unit.

In some examples, the first message includes a set of service headers including the first service header. In some examples, the second message includes a subset of the set of service headers including the first service header. In some examples, the subset of the set of service headers excludes at least one service header of the set of service headers.

In some examples, the first header includes an indication that the first message is to be processed by the network entity prior to generating the radio link control service data unit. In some examples, the second header is based on the indication that the first message is to be processed by the network entity.

In some examples, the first header includes an identifier of the network entity, an instruction, a measurement, information about the data session, or any combination thereof.

In some examples, the logical unit includes a second network entity, a User Plane Function, or both.

Additionally, or alternatively, the communications manager 2220 may support wireless communications at a logical unit in accordance with examples as disclosed herein. In some examples, the capability message component 2225 is capable of, configured to, or operable to support a means for receiving a capability message indicating that a network entity supports instructions for a service associated with a radio layer for wireless communication with a UE. In some examples, the establishing component 2230 is capable of, configured to, or operable to support a means for establishing a data session associated with a flow between the logical unit and the UE based on the capability message. In some examples, the message component 2240 is capable of, configured to, or operable to support a means for transmitting a first message associated with the flow and including a main header, a service header associated with a first layer, an indication that the service header is to be processed by the network entity, and an instruction for performing a radio function associated with the service with the UE. In some examples, the message component 2240 is capable of, configured to, or operable to support a means for receiving a second message associated with the flow and including the main header based on the first message.

In some examples, the indication that the service header is to be processed by the network entity includes an indication to perform the processing prior to generating a service data unit associated with a radio link control layer, an indication to insert the service header into the first message, or both.

In some examples, the service header includes an identifier of the network entity, a second instruction, a measurement, or any combination thereof.

In some examples, the logical unit includes a second network entity, a User Plane Function, or both.

Figure 23:
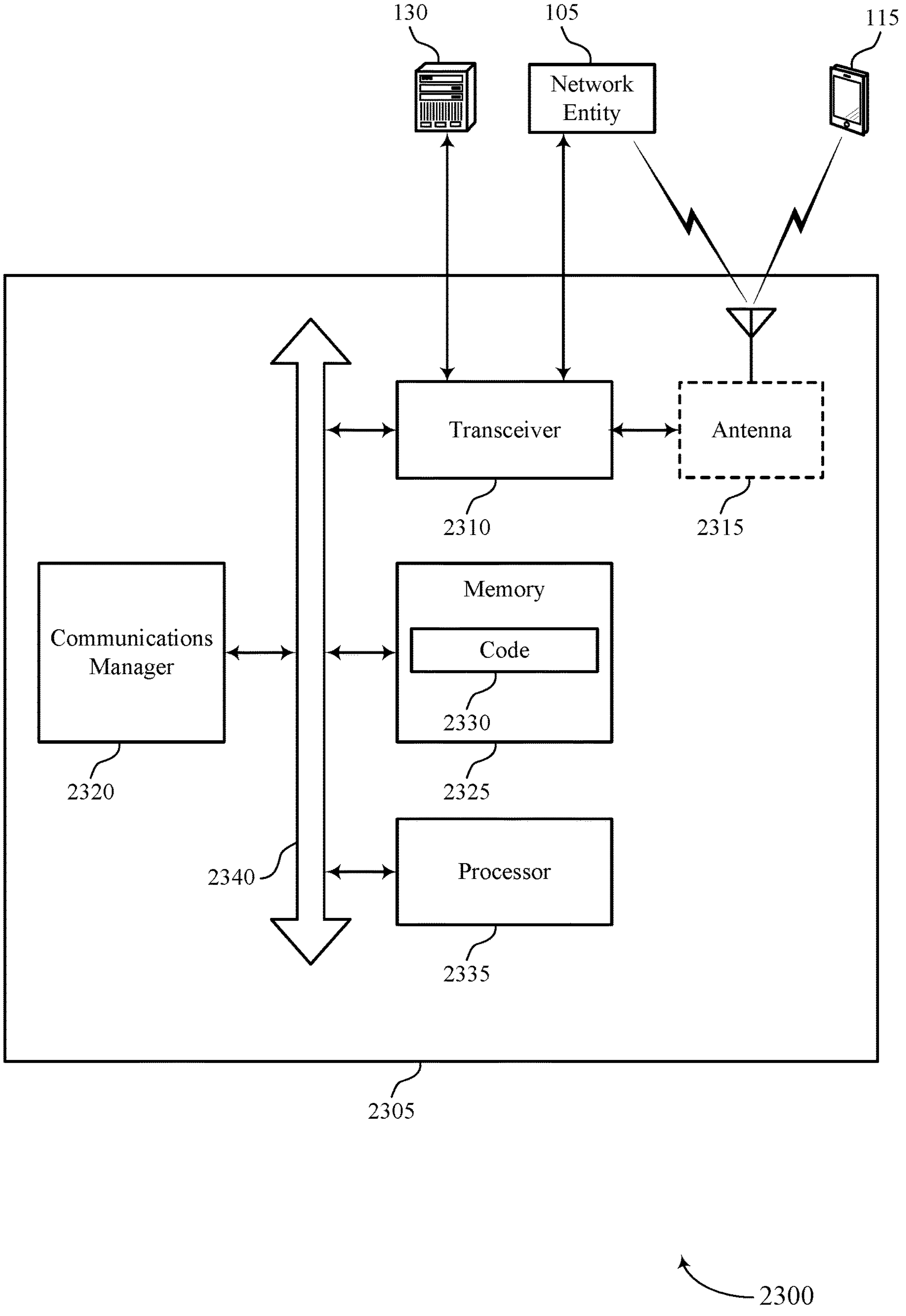
FIG. 23 shows a diagram of a system including a device that supports user plane programmable layer for radio communications in accordance with one or more aspects of the present disclosure.

FIG. 23 shows a diagram of a system 2300 including a device 2305 that supports user plane programmable layer for radio communications in accordance with one or more aspects of the present disclosure. The device 2305 may be an example of or include the components of a device 2005, a device 2105, or a wireless device as described herein. The device 2305 may include components for bi-directional voice and data communications including components for transmitting and receiving communications, such as a communications manager 2320, a transceiver 2310, an antenna 2315, a memory 2325, code 2330, and a processor 2335. These components may be in electronic communication or otherwise coupled (e.g., operatively, communicatively, functionally, electronically, electrically) via one or more buses (e.g., a bus 2340).

The transceiver 2310 may support bi-directional communications via wired links, wireless links, or both as described herein. In some examples, the transceiver 2310 may include a wired transceiver and may communicate bi-directionally with another wired transceiver. Additionally, or alternatively, in some examples, the transceiver 2310 may include a wireless transceiver and may communicate bi-directionally with another wireless transceiver. In some examples, the device 2305 may include one or more antennas 2315, which may be capable of transmitting or receiving wireless transmissions (e.g., concurrently). The transceiver 2310 may also include a modem to modulate signals, to provide the modulated signals for transmission (e.g., by one or more antennas 2315, by a wired transmitter), to receive modulated signals (e.g., from one or more antennas 2315, from a wired receiver), and to demodulate signals. In some implementations, the transceiver 2310 may include one or more interfaces, such as one or more interfaces coupled with the one or more antennas 2315 that are configured to support various receiving or obtaining operations, or one or more interfaces coupled with the one or more antennas 2315 that are configured to support various transmitting or outputting operations, or a combination thereof. In some implementations, the transceiver 2310 may include or be configured for coupling with one or more processors or memory components that are operable to perform or support operations based on received or obtained information or signals, or to generate information or other signals for transmission or other outputting, or any combination thereof. In some implementations, the transceiver 2310, or the transceiver 2310 and the one or more antennas 2315, or the transceiver 2310 and the one or more antennas 2315 and one or more processors or memory components (for example, the processor 2335, or the memory 2325, or both), may be included in a chip or chip assembly that is installed in the device 2305. In some examples, the transceiver may be operable to support communications via one or more communications links (e.g., a communication link 125, a backhaul communication link 120, a midhaul communication link 162, a fronthaul communication link 168).

The memory 2325 may include RAM and ROM. The memory 2325 may store computer-readable, computer-executable code 2330 including instructions that, when executed by the processor 2335, cause the device 2305 to perform various functions described herein. The code 2330 may be stored in a non-transitory computer-readable medium such as system memory or another type of memory. In some cases, the code 2330 may not be directly executable by the processor 2335 but may cause a computer (e.g., when compiled and executed) to perform functions described herein. In some cases, the memory 2325 may contain, among other things, a BIOS which may control basic hardware or software operation such as the interaction with peripheral components or devices.

The processor 2335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 2335 may be configured to operate a memory array using a memory controller. In some other cases, a memory controller may be integrated into the processor 2335. The processor 2335 may be configured to execute computer-readable instructions stored in a memory (e.g., the memory 2325) to cause the device 2305 to perform various functions (e.g., functions or tasks supporting user plane programmable layer for radio communications). For example, the device 2305 or a component of the device 2305 may include a processor 2335 and memory 2325 coupled with the processor 2335, the processor 2335 and memory 2325 configured to perform various functions described herein. The processor 2335 may be an example of a cloud-computing platform (e.g., one or more physical nodes and supporting software such as operating systems, virtual machines, or container instances) that may host the functions (e.g., by executing code 2330) to perform the functions of the device 2305. The processor 2335 may be any one or more suitable processors capable of executing scripts or instructions of one or more software programs stored in the device 2305 (such as within the memory 2325). In some implementations, the processor 2335 may be a component of a processing system. A processing system may refer to a system or series of machines or components that receives inputs and processes the inputs to produce a set of outputs (which may be passed to other systems or components of, for example, the device 2305). For example, a processing system of the device 2305 may refer to a system including the various other components or subcomponents of the device 2305, such as the processor 2335, or the transceiver 2310, or the communications manager 2320, or other components or combinations of components of the device 2305. The processing system of the device 2305 may interface with other components of the device 2305, and may process information received from other components (such as inputs or signals) or output information to other components. For example, a chip or modem of the device 2305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 2305 may transmit information output from the chip or modem. Additionally, or alternatively, in some implementations, the one or more interfaces may refer to an interface between the processing system of the chip or modem and a receiver, such that the device 2305 may obtain information or signal inputs, and the information may be passed to the processing system. A person having ordinary skill in the art will readily recognize that a first interface also may obtain information or signal inputs, and a second interface also may output information or signal outputs.

In some examples, a bus 2340 may support communications of (e.g., within) a protocol layer of a protocol stack. In some examples, a bus 2340 may support communications associated with a logical channel of a protocol stack (e.g., between protocol layers of a protocol stack), which may include communications performed within a component of the device 2305, or between different components of the device 2305 that may be co-located or located in different locations (e.g., where the device 2305 may refer to a system in which one or more of the communications manager 2320, the transceiver 2310, the memory 2325, the code 2330, and the processor 2335 may be located in one of the different components or divided between different components).

In some examples, the communications manager 2320 may manage aspects of communications with a core network 130 (e.g., via one or more wired or wireless backhaul links). For example, the communications manager 2320 may manage the transfer of data communications for client devices, such as one or more UEs 115. In some examples, the communications manager 2320 may manage communications with other network entities 105, and may include a controller or scheduler for controlling communications with UEs 115 in cooperation with other network entities 105. In some examples, the communications manager 2320 may support an X2 interface within an LTE/LTE-A wireless communications network technology to provide communication between network entities 105.

The communications manager 2320 may support wireless communications at a network entity in accordance with examples as disclosed herein. For example, the communications manager 2320 is capable of, configured to, or operable to support a means for transmitting, from the network entity to a logical unit, a capability message that indicates that the network entity supports instructions for a service associated with a radio layer for wireless communication with one or more UEs. The communications manager 2320 is capable of, configured to, or operable to support a means for establishing, with the logical unit, a data session associated with a UE of the one or more UEs based on transmitting the capability message. The communications manager 2320 is capable of, configured to, or operable to support a means for receiving, from the logical unit, an instruction for performing a radio function associated with the service with the UE based on the data session. The communications manager 2320 is capable of, configured to, or operable to support a means for executing the instruction for performing the radio function at the radio layer.

Additionally, or alternatively, the communications manager 2320 may support wireless communications at a network entity in accordance with examples as disclosed herein. For example, the communications manager 2320 is capable of, configured to, or operable to support a means for transmitting, to a logical unit, a capability message that indicates a service that the network entity supports. The communications manager 2320 is capable of, configured to, or operable to support a means for establishing, with the logical unit, a data session associated with a flow between the logical unit and a UE based on transmitting the capability message. The communications manager 2320 is capable of, configured to, or operable to support a means for establishing, with the UE, a data radio bearer associated with the flow based on the data session. The communications manager 2320 is capable of, configured to, or operable to support a means for receiving, from the logical unit, a first message associated with the flow including a first header associated with a first layer based on the data session with the logical unit. The communications manager 2320 is capable of, configured to, or operable to support a means for generating a radio link control service data unit that includes a second header associated with the first layer based on the first header and one or more radio functions of the network entity. The communications manager 2320 is capable of, configured to, or operable to support a means for transmitting, via the data radio bearer, a second message including the radio link control service data unit.

Additionally, or alternatively, the communications manager 2320 may support wireless communications at a logical unit in accordance with examples as disclosed herein. For example, the communications manager 2320 is capable of, configured to, or operable to support a means for receiving a capability message indicating that a network entity supports instructions for a service associated with a radio layer for wireless communication with a UE. The communications manager 2320 is capable of, configured to, or operable to support a means for establishing a data session associated with a flow between the logical unit and the UE based on the capability message. The communications manager 2320 is capable of, configured to, or operable to support a means for transmitting a first message associated with the flow and including a main header, a service header associated with a first layer, an indication that the service header is to be processed by the network entity, and an instruction for performing a radio function associated with the service with the UE. The communications manager 2320 is capable of, configured to, or operable to support a means for receiving a second message associated with the flow and including the main header based on the first message.

By including or configuring the communications manager 2320 in accordance with examples as described herein, the device 2305 may support techniques for increased programmability and service adaptation as well as decreased overhead for at least some deployments.

In some examples, the communications manager 2320 may be configured to perform various operations (e.g., receiving, obtaining, monitoring, outputting, transmitting) using or otherwise in cooperation with the transceiver 2310, the one or more antennas 2315 (e.g., where applicable), or any combination thereof. Although the communications manager 2320 is illustrated as a separate component, in some examples, one or more functions described with reference to the communications manager 2320 may be supported by or performed by the transceiver 2310, the processor 2335, the memory 2325, the code 2330, or any combination thereof. For example, the code 2330 may include instructions executable by the processor 2335 to cause the device 2305 to perform various aspects of user plane programmable layer for radio communications as described herein, or the processor 2335 and the memory 2325 may be otherwise configured to perform or support such operations.

Figure 24:
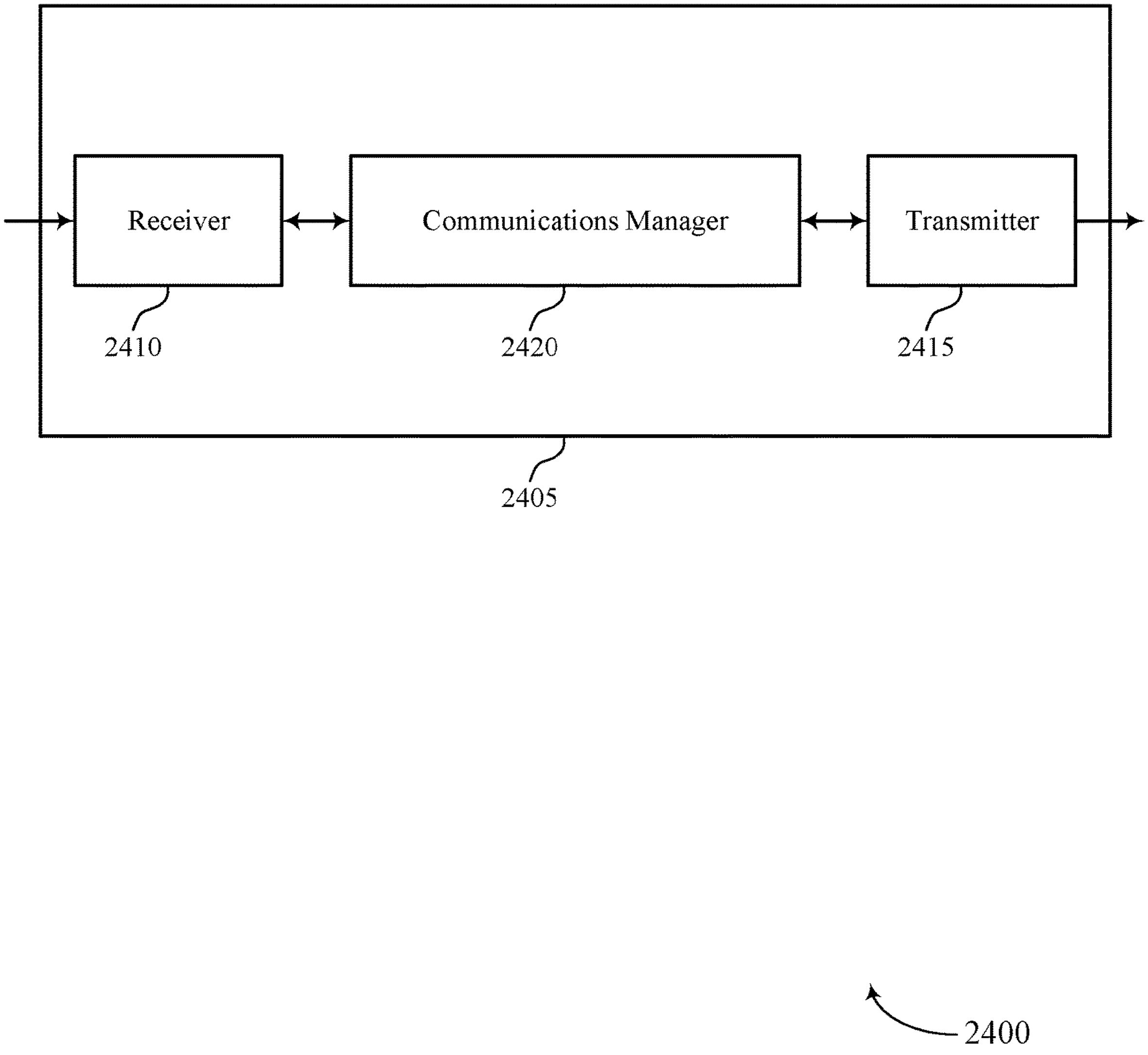
FIGS. 24 and 25 show block diagrams of devices that support user plane programmable layer for radio communications in accordance with one or more aspects of the present disclosure.

FIG. 24 shows a block diagram 2400 of a device 2405 that supports user plane programmable layer for radio communications in accordance with one or more aspects of the present disclosure. The device 2405 may be an example of aspects of a wireless device as described herein. The device 2405 may include a receiver 2410, a transmitter 2415, and a communications manager 2420. The device 2405 may also include one or more processors. Each of these components may be in communication with one another (e.g., via one or more buses).

The receiver 2410 may provide a means for receiving information such as packets, user data, control information, or any combination thereof associated with various information channels (e.g., control channels, data channels, information channels related to user plane programmable layer for radio communications). Information may be passed on to other components of the device 2405. The receiver 2410 may utilize a single antenna or a set of multiple antennas.

The transmitter 2415 may provide a means for transmitting signals generated by other components of the device 2405. For example, the transmitter 2415 may transmit information such as packets, user data, control information, or any combination thereof associated with various information channels (e.g., control channels, data channels, information channels related to user plane programmable layer for radio communications). In some examples, the transmitter 2415 may be co-located with a receiver 2410 in a transceiver module. The transmitter 2415 may utilize a single antenna or a set of multiple antennas.

The communications manager 2420, the receiver 2410, the transmitter 2415, or various combinations thereof or various components thereof may be examples of means for performing various aspects of user plane programmable layer for radio communications as described herein. For example, the communications manager 2420, the receiver 2410, the transmitter 2415, or various combinations or components thereof may support a method for performing one or more of the functions described herein.

In some examples, the communications manager 2420, the receiver 2410, the transmitter 2415, or various combinations or components thereof may be implemented in hardware (e.g., in communications management circuitry). The hardware may include one or more processors, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, one or more processors and memory coupled with the one or more processors may be configured to perform one or more of the functions described herein (e.g., by executing, by the one or more processors, instructions stored in the memory).

Additionally, or alternatively, in some examples, the communications manager 2420, the receiver 2410, the transmitter 2415, or various combinations or components thereof may be implemented in code (e.g., as communications management software or firmware) executed by one or more processors. If implemented in code executed by one or more processors, the functions of the communications manager 2420, the receiver 2410, the transmitter 2415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 2420 may be configured to perform various operations (e.g., receiving, obtaining, monitoring, outputting, transmitting) using or otherwise in cooperation with the receiver 2410, the transmitter 2415, or both. For example, the communications manager 2420 may receive information from the receiver 2410, send information to the transmitter 2415, or be integrated in combination with the receiver 2410, the transmitter 2415, or both to obtain information, output information, or perform various other operations as described herein.

The communications manager 2420 may support wireless communications in accordance with examples as disclosed herein. For example, the communications manager 2420 is capable of, configured to, or operable to support a means for generating a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE. The communications manager 2420 is capable of, configured to, or operable to support a means for generating a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other. The communications manager 2420 is capable of, configured to, or operable to support a means for outputting one or more messages including the first service data unit and the second service data unit.

Additionally, or alternatively, the communications manager 2420 may support wireless communications in accordance with examples as disclosed herein. For example, the communications manager 2420 is capable of, configured to, or operable to support a means for communicating a first message that includes a first service data unit associated with a radio link control layer. The communications manager 2420 is capable of, configured to, or operable to support a means for deriving, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE. The communications manager 2420 is capable of, configured to, or operable to support a means for generating a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header. The communications manager 2420 is capable of, configured to, or operable to support a means for communicating a second message that includes the second service data unit.

By including or configuring the communications manager 2420 in accordance with examples as described herein, the device 2405 (e.g., one or more processors controlling or otherwise coupled with the receiver 2410, the transmitter 2415, the communications manager 2420, or a combination thereof) may support techniques for increased programmability and service adaptation as well as decreased overhead for at least some deployments.

Figure 25:
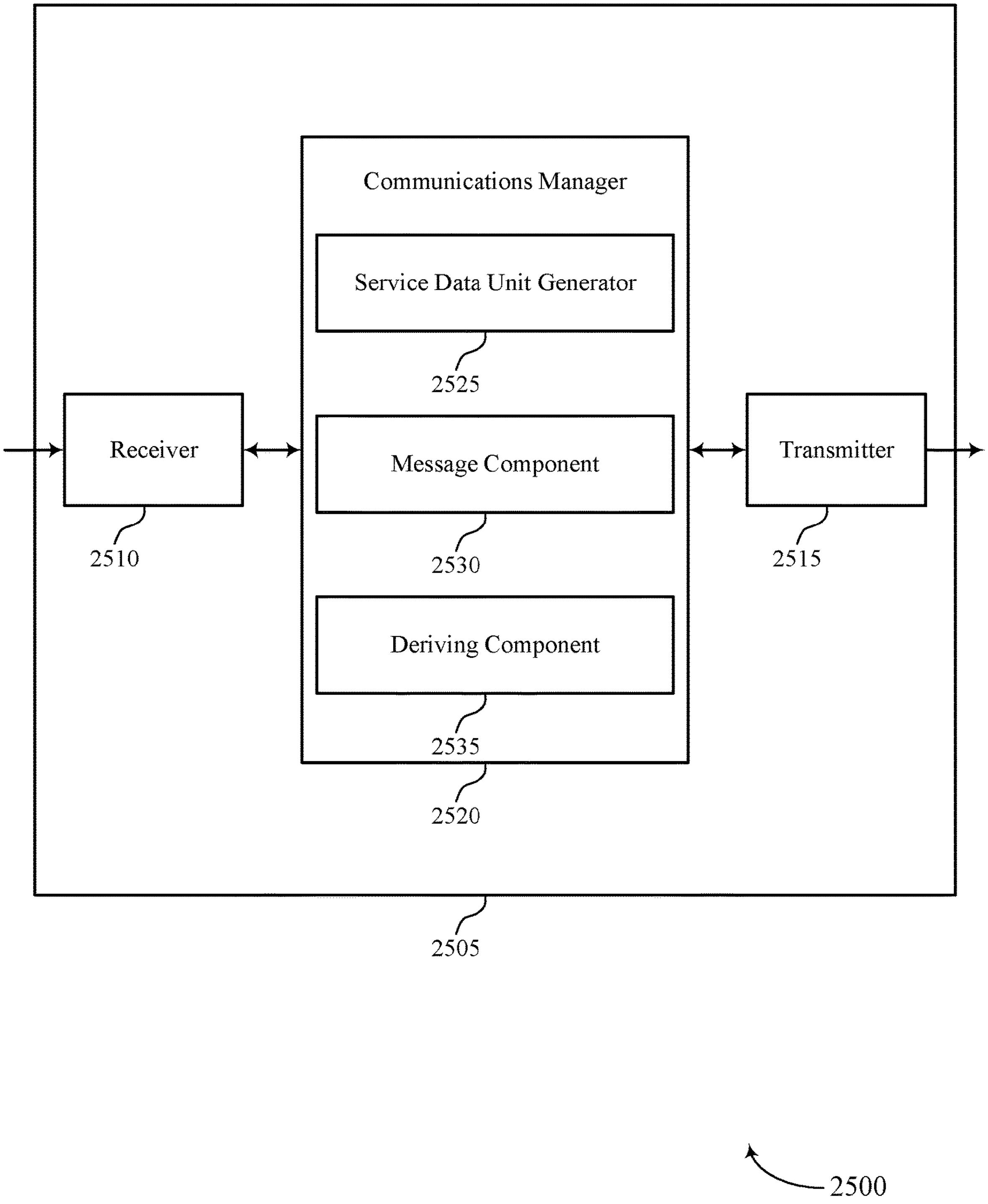

FIG. 25 shows a block diagram 2500 of a device 2505 that supports user plane programmable layer for radio communications in accordance with one or more aspects of the present disclosure. The device 2505 may be an example of aspects of a device 2405 or a wireless device as described herein. The device 2505 may include a receiver 2510, a transmitter 2515, and a communications manager 2520. The device 2505 may also include one or more processors. Each of these components may be in communication with one another (e.g., via one or more buses).

The receiver 2510 may provide a means for receiving information such as packets, user data, control information, or any combination thereof associated with various information channels (e.g., control channels, data channels, information channels related to user plane programmable layer for radio communications). Information may be passed on to other components of the device 2505. The receiver 2510 may utilize a single antenna or a set of multiple antennas.

The transmitter 2515 may provide a means for transmitting signals generated by other components of the device 2505. For example, the transmitter 2515 may transmit information such as packets, user data, control information, or any combination thereof associated with various information channels (e.g., control channels, data channels, information channels related to user plane programmable layer for radio communications). In some examples, the transmitter 2515 may be co-located with a receiver 2510 in a transceiver module. The transmitter 2515 may utilize a single antenna or a set of multiple antennas.

The device 2505, or various components thereof, may be an example of means for performing various aspects of user plane programmable layer for radio communications as described herein. For example, the communications manager 2520 may include a service data unit generator 2525, a message component 2530, a deriving component 2535, or any combination thereof. The communications manager 2520 may be an example of aspects of a communications manager 2420 as described herein. In some examples, the communications manager 2520, or various components thereof, may be configured to perform various operations (e.g., receiving, obtaining, monitoring, outputting, transmitting) using or otherwise in cooperation with the receiver 2510, the transmitter 2515, or both. For example, the communications manager 2520 may receive information from the receiver 2510, send information to the transmitter 2515, or be integrated in combination with the receiver 2510, the transmitter 2515, or both to obtain information, output information, or perform various other operations as described herein.

The communications manager 2520 may support wireless communications in accordance with examples as disclosed herein. The service data unit generator 2525 is capable of, configured to, or operable to support a means for generating a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE. The service data unit generator 2525 is capable of, configured to, or operable to support a means for generating a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other. The message component 2530 is capable of, configured to, or operable to support a means for outputting one or more messages including the first service data unit and the second service data unit.

Additionally, or alternatively, the communications manager 2520 may support wireless communications in accordance with examples as disclosed herein. The message component 2530 is capable of, configured to, or operable to support a means for communicating a first message that includes a first service data unit associated with a radio link control layer. The deriving component 2535 is capable of, configured to, or operable to support a means for deriving, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE. The service data unit generator 2525 is capable of, configured to, or operable to support a means for generating a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header. The message component 2530 is capable of, configured to, or operable to support a means for communicating a second message that includes the second service data unit.

Figure 26:
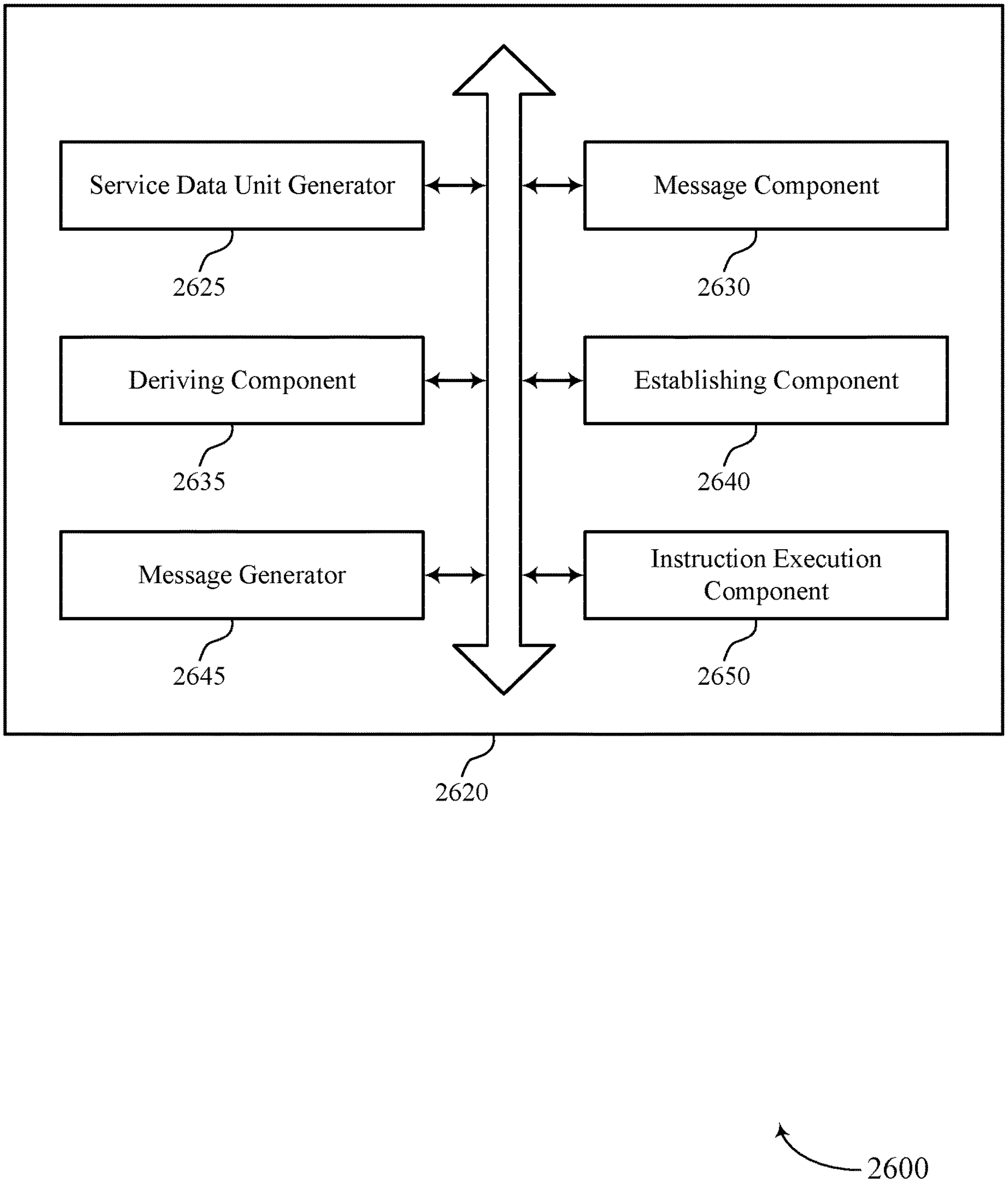
FIG. 26 shows a block diagram of a communications manager that supports user plane programmable layer for radio communications in accordance with one or more aspects of the present disclosure.

FIG. 26 shows a block diagram 2600 of a communications manager 2620 that supports user plane programmable layer for radio communications in accordance with one or more aspects of the present disclosure. The communications manager 2620 may be an example of aspects of a communications manager 2420, a communications manager 2520, or both, as described herein. The communications manager 2620, or various components thereof, may be an example of means for performing various aspects of user plane programmable layer for radio communications as described herein. For example, the communications manager 2620 may include a service data unit generator 2625, a message component 2630, a deriving component 2635, an establishing component 2640, a message generator 2645, an instruction execution component 2650, or any combination thereof. Each of these components may communicate, directly or indirectly, with one another (e.g., via one or more buses).

The communications manager 2620 may support wireless communications in accordance with examples as disclosed herein. The service data unit generator 2625 is capable of, configured to, or operable to support a means for generating a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE. In some examples, the service data unit generator 2625 is capable of, configured to, or operable to support a means for generating a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other. The message component 2630 is capable of, configured to, or operable to support a means for outputting one or more messages including the first service data unit and the second service data unit.

In some examples, the establishing component 2640 is capable of, configured to, or operable to support a means for establishing, with the UE, a data radio bearer, where the one or more messages are output by a network entity and are based on establishing the data radio bearer with the UE.

In some examples, the establishing component 2640 is capable of, configured to, or operable to support a means for establishing, with a network entity, a data radio bearer, where the one or more messages are output by the UE and is based on establishing the data radio bearer with the network entity.

In some examples, the message component 2630 is capable of, configured to, or operable to support a means for obtaining a first message including the first packet, the first main header, and the first service header. In some examples, the message generator 2645 is capable of, configured to, or operable to support a means for modifying the first service header based on the first message, where the first service data unit is generated based on the modified first service header.

In some examples, modifying the first service header includes updating a timestamp.

In some examples, the message component 2630 is capable of, configured to, or operable to support a means for obtaining a first message including the first packet, the first main header, the first service header, and a third service header associated with a second service. In some examples, the message generator 2645 is capable of, configured to, or operable to support a means for removing the third service header when generating the first service data unit such that the first service data unit excludes the third service header.

In some examples, the message component 2630 is capable of, configured to, or operable to support a means for obtaining a first message including the first packet, the first main header, and the first service header. In some examples, the message generator 2645 is capable of, configured to, or operable to support a means for adding a third service header when generating the first service data unit such that the first service data unit includes the third service header, where the first message excludes the third service header.

In some examples, the first service header, the second service header, or both include an instruction.

In some examples, the instruction indicates that an acknowledgement is to be sent upon receipt of the one or more messages, that packets associated with the one or more messages are to be reordered according to an arrangement indicated by the instruction, that the packets associated with the one or more messages are to be dropped after a threshold time, that the packets associated with the one or more messages are to be timestamped, or any combination thereof.

In some examples, the first service header includes a reordering timer, a reordering domain, an indication to drop the first packet after the reordering timer expires, an indication to transmit acknowledgement feedback for the first packet, or any combination thereof.

In some examples, the first main header and the second main header each include a data control flag, a header length, a sequence number, information associated with extension fields, or any combination thereof.

Additionally, or alternatively, the communications manager 2620 may support wireless communications in accordance with examples as disclosed herein. In some examples, the message component 2630 is capable of, configured to, or operable to support a means for communicating a first message that includes a first service data unit associated with a radio link control layer. The deriving component 2635 is capable of, configured to, or operable to support a means for deriving, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE. In some examples, the service data unit generator 2625 is capable of, configured to, or operable to support a means for generating a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header. In some examples, the message component 2630 is capable of, configured to, or operable to support a means for communicating a second message that includes the second service data unit.

In some examples, the establishing component 2640 is capable of, configured to, or operable to support a means for establishing, with the UE, a data radio bearer, where the first message is communicated, and the second message is output, by a network entity and is based on establishing the data radio bearer with the UE.

In some examples, the establishing component 2640 is capable of, configured to, or operable to support a means for establishing, with a network entity, a data radio bearer, where the first message is communicated, and the second message is output, by the UE and is based on establishing the data radio bearer with the network entity.

In some examples, the first service header includes an instruction, and the instruction execution component 2650 is capable of, configured to, or operable to support a means for executing the instruction, where generating the second service data unit is based on the instruction.

In some examples, the first service header includes information about the first packet, a reordering timer, a reordering domain, an indication to drop the first packet after the reordering timer expires, an indication to transmit acknowledgement feedback for the first packet, or any combination thereof.

Figure 27:
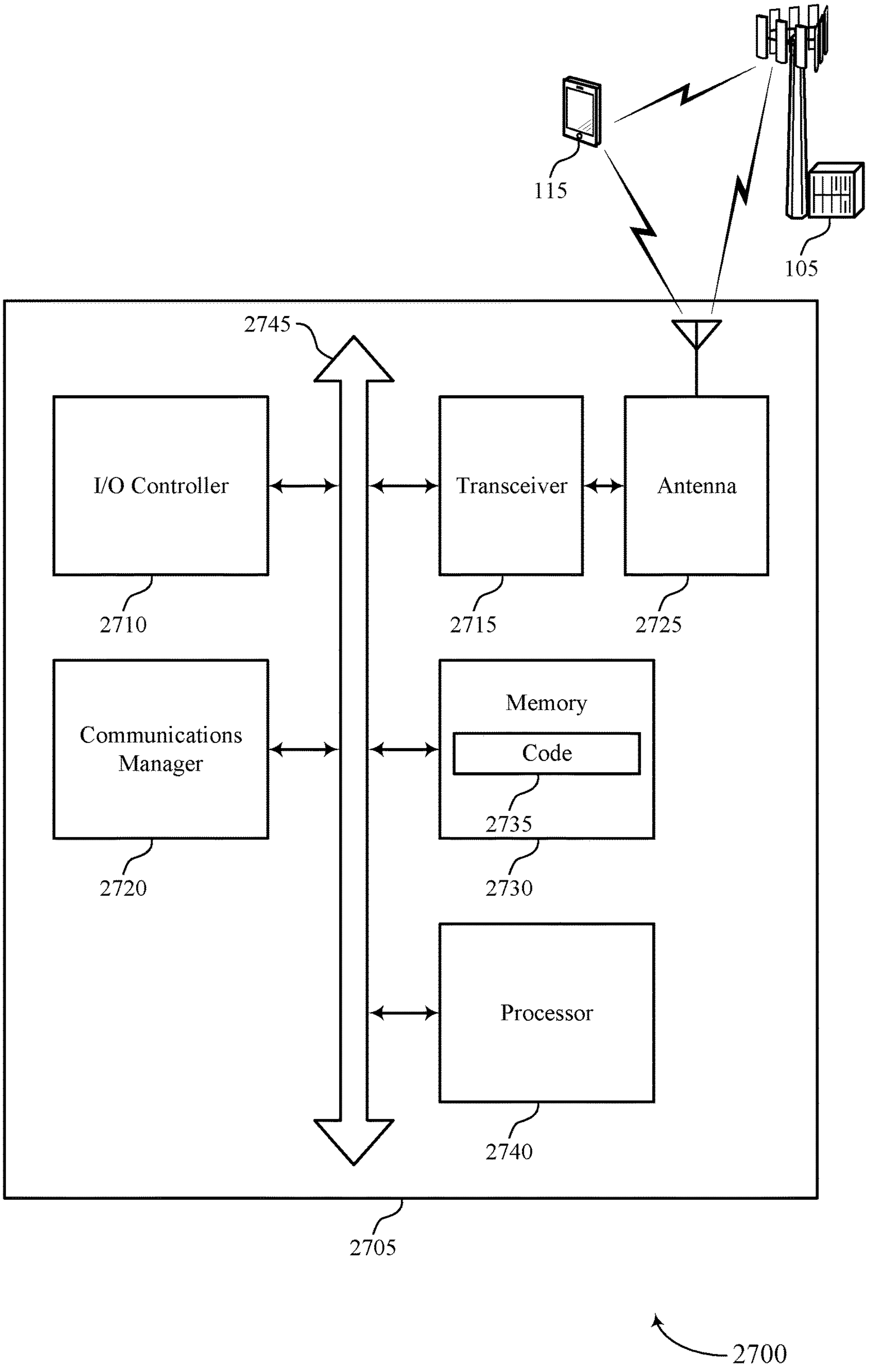
FIG. 27 shows a diagram of a system including a device that supports user plane programmable layer for radio communications in accordance with one or more aspects of the present disclosure.

FIG. 27 shows a diagram of a system 2700 including a device 2705 that supports user plane programmable layer for radio communications in accordance with one or more aspects of the present disclosure. The device 2705 may be an example of or include the components of a device 2405, a device 2505, or a wireless device as described herein. The device 2705 may include components for bi-directional voice and data communications including components for transmitting and receiving communications, such as a communications manager 2720, an I/O controller 2710, a transceiver 2715, an antenna 2725, a memory 2730, code 2735, and a processor 2740. These components may be in electronic communication or otherwise coupled (e.g., operatively, communicatively, functionally, electronically, electrically) via one or more buses (e.g., a bus 2745).

The I/O controller 2710 may manage input and output signals for the device 2705. The I/O controller 2710 may also manage peripherals not integrated into the device 2705. In some cases, the I/O controller 2710 may represent a physical connection or port to an external peripheral. In some cases, the I/O controller 2710 may utilize an operating system such as iOS®, ANDROID®, MS-DOS®, MS-WINDOWS®, OS/2®, UNIX®, LINUX®, or another known operating system. Additionally or alternatively, the I/O controller 2710 may represent or interact with a modem, a keyboard, a mouse, a touchscreen, or a similar device. In some cases, the I/O controller 2710 may be implemented as part of a processor, such as the processor 2740. In some cases, a user may interact with the device 2705 via the I/O controller 2710 or via hardware components controlled by the I/O controller 2710.

In some cases, the device 2705 may include a single antenna 2725. However, in some other cases, the device 2705 may have more than one antenna 2725, which may be capable of concurrently transmitting or receiving multiple wireless transmissions. The transceiver 2715 may communicate bi-directionally, via the one or more antennas 2725, wired, or wireless links as described herein. For example, the transceiver 2715 may represent a wireless transceiver and may communicate bi-directionally with another wireless transceiver. The transceiver 2715 may also include a modem to modulate the packets, to provide the modulated packets to one or more antennas 2725 for transmission, and to demodulate packets received from the one or more antennas 2725. The transceiver 2715, or the transceiver 2715 and one or more antennas 2725, may be an example of a transmitter 2415, a transmitter 2515, a receiver 2410, a receiver 2510, or any combination thereof or component thereof, as described herein.

The memory 2730 may include RAM and ROM. The memory 2730 may store computer-readable, computer-executable code 2735 including instructions that, when executed by the processor 2740, cause the device 2705 to perform various functions described herein. The code 2735 may be stored in a non-transitory computer-readable medium such as system memory or another type of memory. In some cases, the code 2735 may not be directly executable by the processor 2740 but may cause a computer (e.g., when compiled and executed) to perform functions described herein. In some cases, the memory 2730 may contain, among other things, a BIOS which may control basic hardware or software operation such as the interaction with peripheral components or devices.

The processor 2740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2740 may be configured to operate a memory array using a memory controller. In some other cases, a memory controller may be integrated into the processor 2740. The processor 2740 may be configured to execute computer-readable instructions stored in a memory (e.g., the memory 2730) to cause the device 2705 to perform various functions (e.g., functions or tasks supporting user plane programmable layer for radio communications). For example, the device 2705 or a component of the device 2705 may include a processor 2740 and memory 2730 coupled with or to the processor 2740, the processor 2740 and memory 2730 configured to perform various functions described herein.

The communications manager 2720 may support wireless communications in accordance with examples as disclosed herein. For example, the communications manager 2720 is capable of, configured to, or operable to support a means for generating a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE. The communications manager 2720 is capable of, configured to, or operable to support a means for generating a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other. The communications manager 2720 is capable of, configured to, or operable to support a means for outputting one or more messages including the first service data unit and the second service data unit.

Additionally, or alternatively, the communications manager 2720 may support wireless communications in accordance with examples as disclosed herein. For example, the communications manager 2720 is capable of, configured to, or operable to support a means for communicating a first message that includes a first service data unit associated with a radio link control layer. The communications manager 2720 is capable of, configured to, or operable to support a means for deriving, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE. The communications manager 2720 is capable of, configured to, or operable to support a means for generating a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header. The communications manager 2720 is capable of, configured to, or operable to support a means for communicating a second message that includes the second service data unit.

By including or configuring the communications manager 2720 in accordance with examples as described herein, the device 2705 may support techniques for increased programmability and service adaptation as well as decreased overhead for at least some deployments.

In some examples, the communications manager 2720 may be configured to perform various operations (e.g., receiving, monitoring, transmitting) using or otherwise in cooperation with the transceiver 2715, the one or more antennas 2725, or any combination thereof. Although the communications manager 2720 is illustrated as a separate component, in some examples, one or more functions described with reference to the communications manager 2720 may be supported by or performed by the processor 2740, the memory 2730, the code 2735, or any combination thereof. For example, the code 2735 may include instructions executable by the processor 2740 to cause the device 2705 to perform various aspects of user plane programmable layer for radio communications as described herein, or the processor 2740 and the memory 2730 may be otherwise configured to perform or support such operations.

Figure 28:
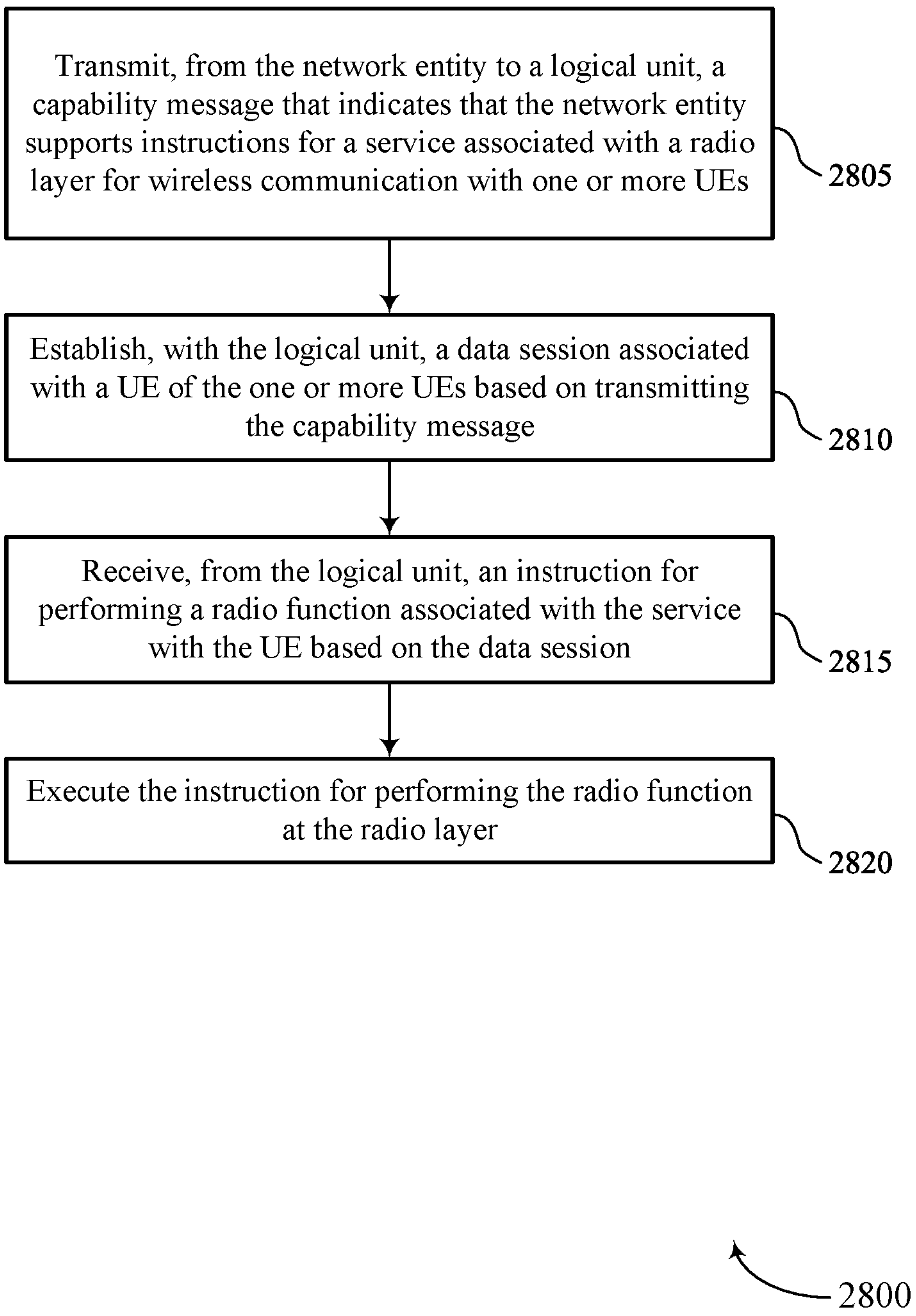
FIGS. 28 through 32 show flowcharts illustrating methods that support user plane programmable layer for radio communications in accordance with one or more aspects of the present disclosure.

FIG. 28 shows a flowchart illustrating a method 2800 that supports user plane programmable layer for radio communications in accordance with aspects of the present disclosure. The operations of the method 2800 may be implemented by a wireless device or its components as described herein. For example, the operations of the method 2800 may be performed by a wireless device as described with reference to FIGS. 1 through 23. In some examples, a wireless device may execute a set of instructions to control the functional elements of the wireless device to perform the described functions. Additionally, or alternatively, the wireless device may perform aspects of the described functions using special-purpose hardware.

At 2805, the method may include transmitting, from the network entity to a logical unit, a capability message that indicates that the network entity supports instructions for a service associated with a radio layer for wireless communication with one or more UEs. The operations of 2805 may be performed in accordance with examples as disclosed herein. In some examples, aspects of the operations of 2805 may be performed by a capability message component 2225 as described with reference to FIG. 22.

At 2810, the method may include establishing, with the logical unit, a data session associated with a UE of the one or more UEs based on transmitting the capability message. The operations of 2810 may be performed in accordance with examples as disclosed herein. In some examples, aspects of the operations of 2810 may be performed by an establishing component 2230 as described with reference to FIG. 22.

At 2815, the method may include receiving, from the logical unit, an instruction for performing a radio function associated with the service with the UE based on the data session. The operations of 2815 may be performed in accordance with examples as disclosed herein. In some examples, aspects of the operations of 2815 may be performed by an instruction component 2235 as described with reference to FIG. 22.

At 2820, the method may include executing the instruction for performing the radio function at the radio layer. The operations of 2820 may be performed in accordance with examples as disclosed herein. In some examples, aspects of the operations of 2820 may be performed by an instruction component 2235 as described with reference to FIG. 22.

Figure 29:
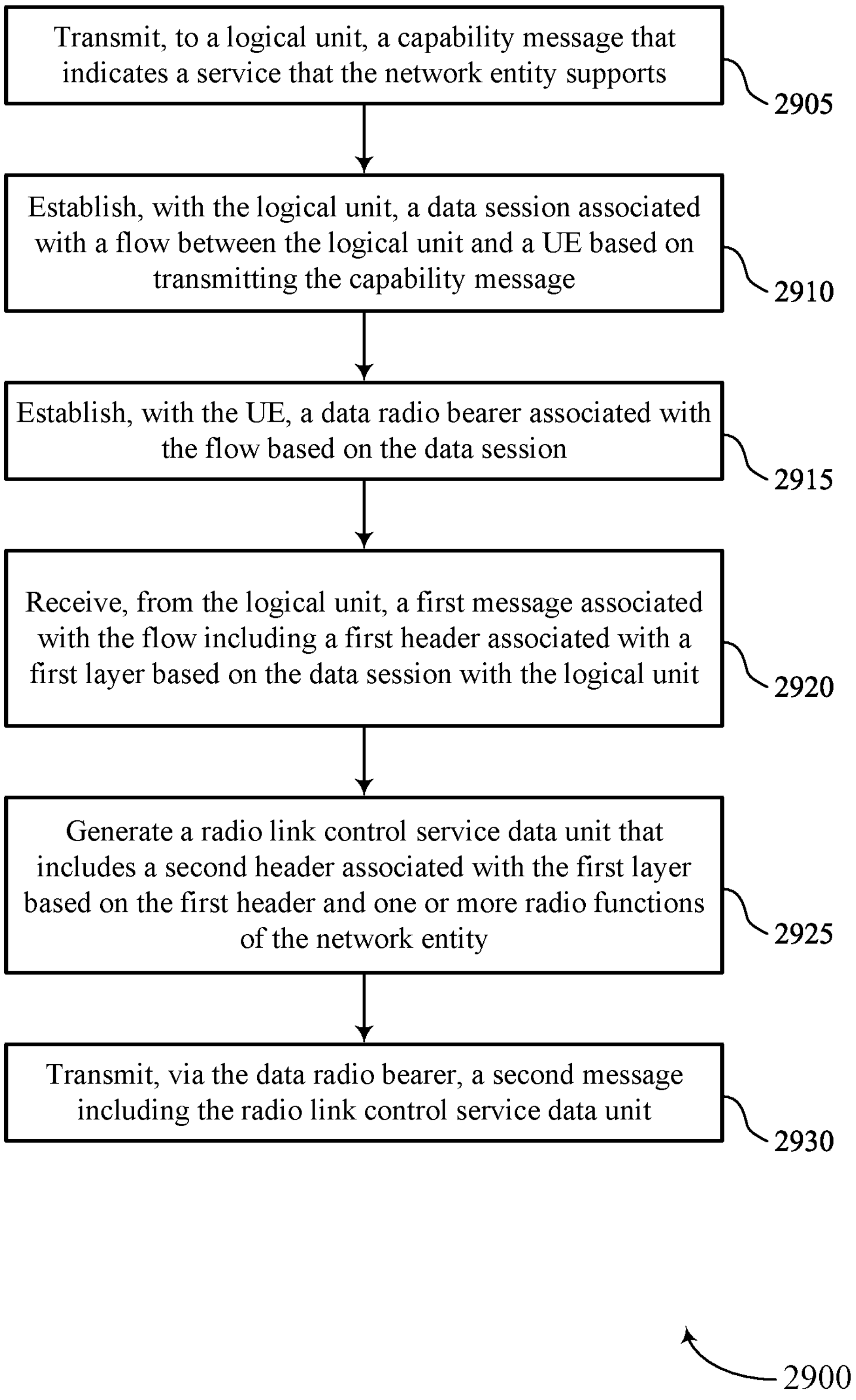

FIG. 29 shows a flowchart illustrating a method 2900 that supports user plane programmable layer for radio communications in accordance with aspects of the present disclosure. The operations of the method 2900 may be implemented by a wireless device or its components as described herein. For example, the operations of the method 2900 may be performed by a wireless device as described with reference to FIGS. 1 through 23. In some examples, a wireless device may execute a set of instructions to control the functional elements of the wireless device to perform the described functions. Additionally, or alternatively, the wireless device may perform aspects of the described functions using special-purpose hardware.

At 2905, the method may include transmitting, to a logical unit, a capability message that indicates a service that the network entity supports. The operations of 2905 may be performed in accordance with examples as disclosed herein. In some examples, aspects of the operations of 2905 may be performed by a capability message component 2225 as described with reference to FIG. 22.

At 2910, the method may include establishing, with the logical unit, a data session associated with a flow between the logical unit and a UE based on transmitting the capability message. The operations of 2910 may be performed in accordance with examples as disclosed herein. In some examples, aspects of the operations of 2910 may be performed by an establishing component 2230 as described with reference to FIG. 22.

At 2915, the method may include establishing, with the UE, a data radio bearer associated with the flow based on the data session. The operations of 2915 may be performed in accordance with examples as disclosed herein. In some examples, aspects of the operations of 2915 may be performed by an establishing component 2230 as described with reference to FIG. 22.

At 2920, the method may include receiving, from the logical unit, a first message associated with the flow including a first header associated with a first layer based on the data session with the logical unit. The operations of 2920 may be performed in accordance with examples as disclosed herein. In some examples, aspects of the operations of 2920 may be performed by a message component 2240 as described with reference to FIG. 22.

At 2925, the method may include generating a radio link control service data unit that includes a second header associated with the first layer based on the first header and one or more radio functions of the network entity. The operations of 2925 may be performed in accordance with examples as disclosed herein. In some examples, aspects of the operations of 2925 may be performed by a message component 2240 as described with reference to FIG. 22.

At 2930, the method may include transmitting, via the data radio bearer, a second message including the radio link control service data unit. The operations of 2930 may be performed in accordance with examples as disclosed herein. In some examples, aspects of the operations of 2930 may be performed by a message component 2240 as described with reference to FIG. 22.

Figure 30:
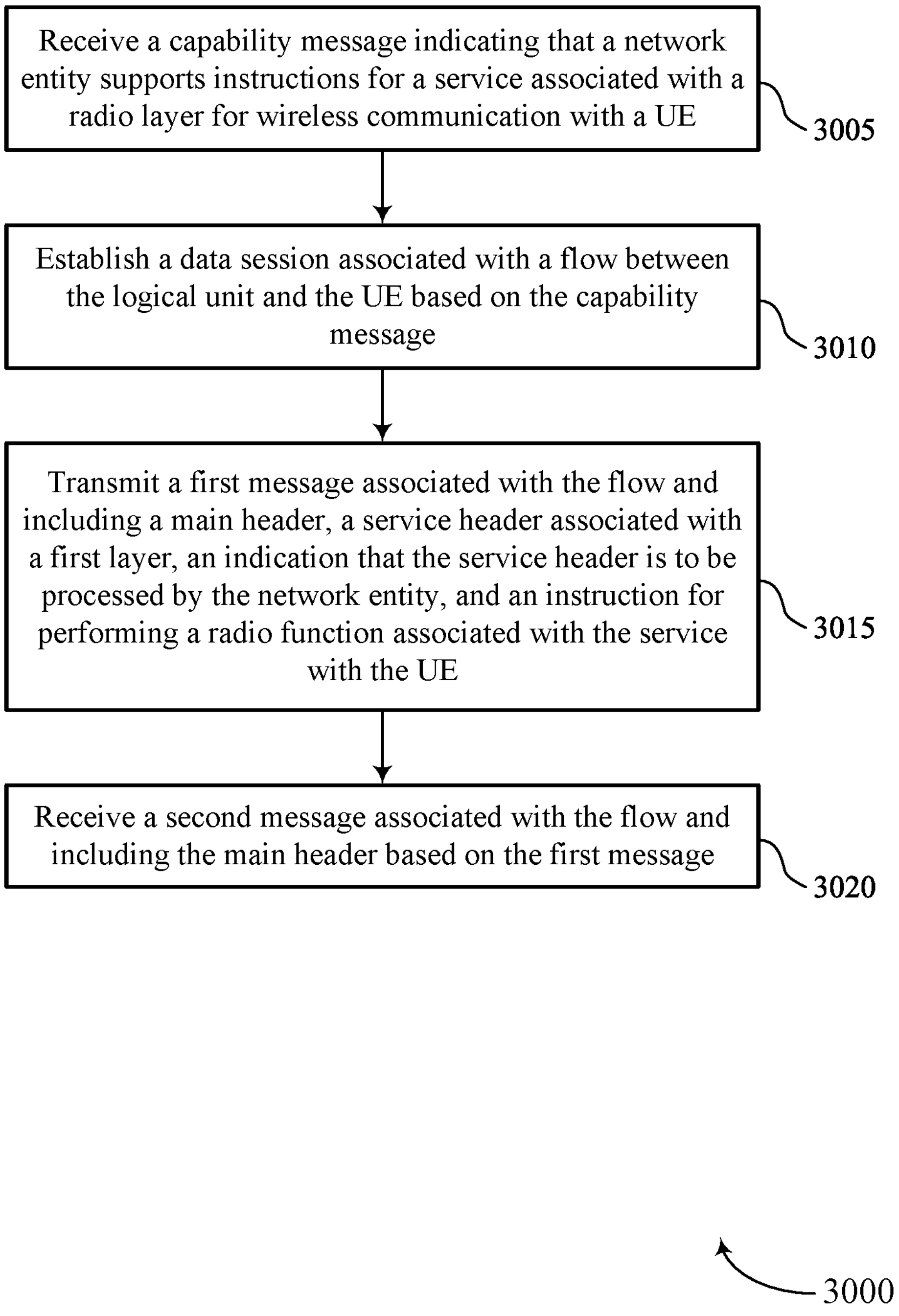

FIG. 30 shows a flowchart illustrating a method 3000 that supports user plane programmable layer for radio communications in accordance with aspects of the present disclosure. The operations of the method 3000 may be implemented by a wireless device or its components as described herein. For example, the operations of the method 3000 may be performed by a wireless device as described with reference to FIGS. 1 through 23. In some examples, a wireless device may execute a set of instructions to control the functional elements of the wireless device to perform the described functions. Additionally, or alternatively, the wireless device may perform aspects of the described functions using special-purpose hardware.

At 3005, the method may include receiving a capability message indicating that a network entity supports instructions for a service associated with a radio layer for wireless communication with a UE. The operations of 3005 may be performed in accordance with examples as disclosed herein. In some examples, aspects of the operations of 3005 may be performed by a capability message component 2225 as described with reference to FIG. 22.

At 3010, the method may include establishing a data session associated with a flow between the logical unit and the UE based on the capability message. The operations of 3010 may be performed in accordance with examples as disclosed herein. In some examples, aspects of the operations of 3010 may be performed by an establishing component 2230 as described with reference to FIG. 22.

At 3015, the method may include transmitting a first message associated with the flow and including a main header, a service header associated with a first layer, an indication that the service header is to be processed by the network entity, and an instruction for performing a radio function associated with the service with the UE. The operations of 3015 may be performed in accordance with examples as disclosed herein. In some examples, aspects of the operations of 3015 may be performed by a message component 2240 as described with reference to FIG. 22.

At 3020, the method may include receiving a second message associated with the flow and including the main header based on the first message. The operations of 3020 may be performed in accordance with examples as disclosed herein. In some examples, aspects of the operations of 3020 may be performed by a message component 2240 as described with reference to FIG. 22.

Figure 31:
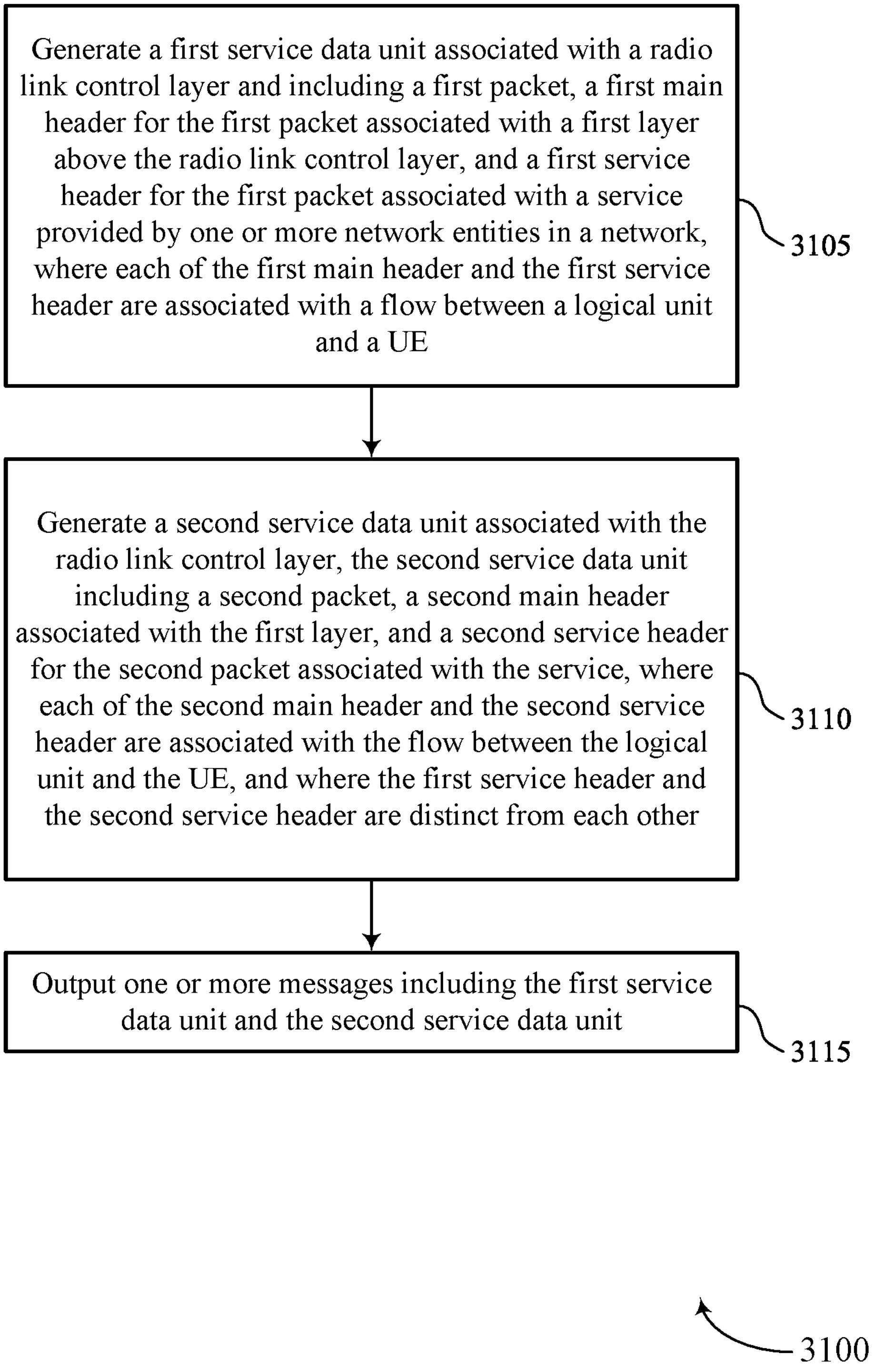

FIG. 31 shows a flowchart illustrating a method 3100 that supports user plane programmable layer for radio communications in accordance with aspects of the present disclosure. The operations of the method 3100 may be implemented by a wireless device or its components as described herein. For example, the operations of the method 3100 may be performed by a wireless device as described with reference to FIGS. 1 through 19 and 24 through 27. In some examples, a wireless device may execute a set of instructions to control the functional elements of the wireless device to perform the described functions. Additionally, or alternatively, the wireless device may perform aspects of the described functions using special-purpose hardware.

At 3105, the method may include generating a first service data unit associated with a radio link control layer and including a first packet, a first main header for the first packet associated with a first layer above the radio link control layer, and a first service header for the first packet associated with a service provided by one or more network entities in a network, where each of the first main header and the first service header are associated with a flow between a logical unit and a UE. The operations of 3105 may be performed in accordance with examples as disclosed herein. In some examples, aspects of the operations of 3105 may be performed by a service data unit generator 2625 as described with reference to FIG. 26.

At 3110, the method may include generating a second service data unit associated with the radio link control layer, the second service data unit including a second packet, a second main header associated with the first layer, and a second service header for the second packet associated with the service, where each of the second main header and the second service header are associated with the flow between the logical unit and the UE, and where the first service header and the second service header are distinct from each other. The operations of 3110 may be performed in accordance with examples as disclosed herein. In some examples, aspects of the operations of 3110 may be performed by a service data unit generator 2625 as described with reference to FIG. 26.

At 3115, the method may include outputting one or more messages including the first service data unit and the second service data unit. The operations of 3115 may be performed in accordance with examples as disclosed herein. In some examples, aspects of the operations of 3115 may be performed by a message component 2630 as described with reference to FIG. 26.

Figure 32:
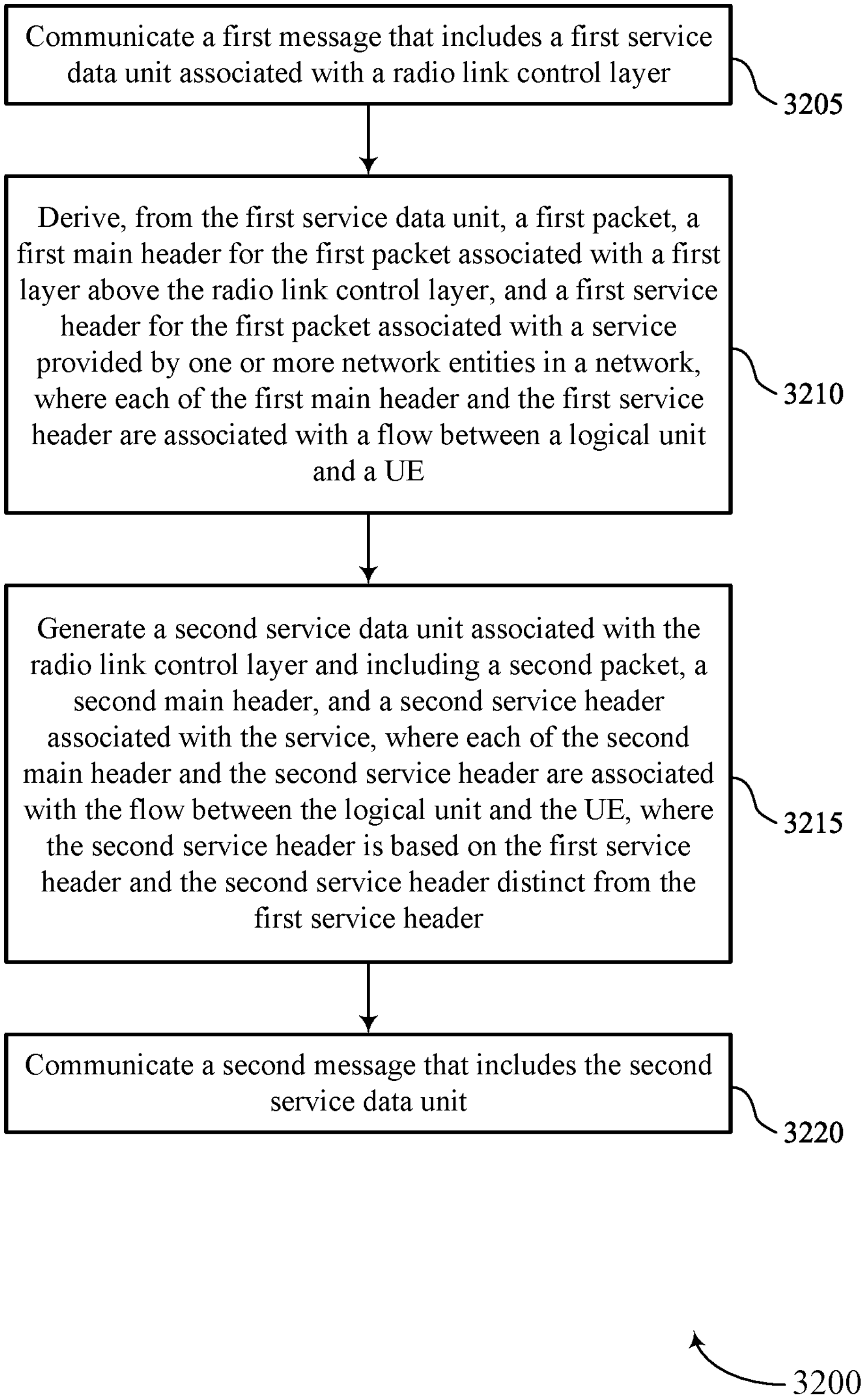

FIG. 32 shows a flowchart illustrating a method 3200 that supports user plane programmable layer for radio communications in accordance with aspects of the present disclosure. The operations of the method 3200 may be implemented by a wireless device or its components as described herein. For example, the operations of the method 3200 may be performed by a wireless device as described with reference to FIGS. 1 through 19 and 24 through 27. In some examples, a wireless device may execute a set of instructions to control the functional elements of the wireless device to perform the described functions. Additionally, or alternatively, the wireless device may perform aspects of the described functions using special-purpose hardware.

At 3205, the method may include communicating a first message that includes a first service data unit associated with a radio link control layer. The operations of 3205 may be performed in accordance with examples as disclosed herein. In some examples, aspects of the operations of 3205 may be performed by a message component 2630 as described with reference to FIG. 26.

At 3210, the method may include deriving, from the first service data unit, a first packet, a first main header for the first packet associated with a first layer above the radio link control layer, and a first service header for the first packet associated with a service provided by one or more network entities in a network, where each of the first main header and the first service header are associated with a flow between a logical unit and a UE. The operations of 3210 may be performed in accordance with examples as disclosed herein. In some examples, aspects of the operations of 3210 may be performed by a deriving component 2635 as described with reference to FIG. 26.

At 3215, the method may include generating a second service data unit associated with the radio link control layer and including a second packet, a second main header, and a second service header associated with the service, where each of the second main header and the second service header are associated with the flow between the logical unit and the UE, where the second service header is based on the first service header and the second service header distinct from the first service header. The operations of 3215 may be performed in accordance with examples as disclosed herein. In some examples, aspects of the operations of 3215 may be performed by a service data unit generator 2625 as described with reference to FIG. 26.

At 3220, the method may include communicating a second message that includes the second service data unit. The operations of 3220 may be performed in accordance with examples as disclosed herein. In some examples, aspects of the operations of 3220 may be performed by a message component 2630 as described with reference to FIG. 26.

The following provides an overview of aspects of the present disclosure:

Aspect 1: A method for wireless communications by a network entity, comprising: transmitting, from the network entity to a logical unit, a capability message that indicates that the network entity supports instructions for a service associated with a radio layer for wireless communication with one or more UEs; establishing, with the logical unit, a data session associated with a UE of the one or more UEs based at least in part on transmitting the capability message; receiving, from the logical unit, an instruction for performing a radio function associated with the service with the UE based at least in part on the data session; and executing the instruction for performing the radio function at the radio layer.

Aspect 2: The method of aspect 1, further comprising: receiving a first message comprising the instruction, a packet, and a header; establishing, with the UE, a data radio bearer based at least in part on the data session; transmitting a second message comprising a first radio link control service data unit based at least in part on establishing the data radio bearer with the UE, wherein the first radio link control service data unit comprises the packet and the header; receiving a third message comprising a second radio link control service data unit based at least in part on the second message, wherein the second radio link control service data unit comprises the header and a response for the packet; embedding a header in a fourth message, wherein the fourth message comprises a response for the packet; and transmitting a fourth message based at least in part on the instruction, and wherein the instruction is executed after receiving the third message.

Aspect 3: The method of aspect 2, wherein the fourth message comprises a service header associated with a flow between the UE and the logical unit, the service header comprises a parameter based at least in part on the instruction.

Aspect 4: The method of any of aspects 1 through 3, further comprising: receiving a first message comprising the instruction and a packet, wherein executing the instruction is based at least in part on the first message; establishing, with the UE, a data radio bearer based at least in part on the data session; transmitting a second message comprising the packet based at least in part on establishing the data radio bearer with the UE and the instruction, wherein the instruction is executed before transmitting the second message.

Aspect 5: The method of any of aspects 1 through 4, wherein the logical unit comprises a second network entity.

Aspect 6: A method for wireless communications by a network entity, comprising: transmitting, to a logical unit, a capability message that indicates a service that the network entity supports; establishing, with the logical unit, a data session associated with a flow between the logical unit and a UE based at least in part on transmitting the capability message; establishing, with the UE, a data radio bearer associated with the flow based at least in part on the data session; receiving, from the logical unit, a first message associated with the flow comprising a first header associated with a first layer based at least in part on the data session with the logical unit; generating a radio link control service data unit that comprises a second header associated with the first layer based at least in part on the first header and one or more radio functions of the network entity; and transmitting, via the data radio bearer, a second message comprising the radio link control service data unit.

Aspect 7: The method of aspect 6, wherein the first message comprises a main header and a first service header associated with a service, the second message comprises the main header, the first service header, and a second service header associated with a radio function of the network entity.

Aspect 8: The method of aspect 7, further comprising: receiving, from the logical unit, a plurality of messages comprising the first message, each of the plurality of messages comprising a service header associated with the service; performing prioritization on the plurality of messages based at least in part on the respective service headers, wherein transmitting the second message is based at least in part on the prioritization.

Aspect 9: The method of any of aspects 7 through 8, further comprising: modifying the first service header based at least in part on an instruction received from a second logical unit, wherein transmitting the second message is based at least in part on the modified first service header.

Aspect 10: The method of any of aspects 7 through 9, wherein the first message comprises a set of service headers comprising the first service header, the method further comprising: adding a third service header to the second message based at least in part on an instruction received from a second logical unit.

Aspect 11: The method of any of aspects 7 through 10, wherein the first message comprises a set of service headers comprising the first service header, the second message comprises a subset of the set of service headers comprising the first service header, and the subset of the set of service headers excludes at least one service header of the set of service headers.

Aspect 12: The method of any of aspects 6 through 11, wherein the first header comprises an indication that the first message is to be processed by the network entity prior to generating the radio link control service data unit, and the second header is based at least in part on the indication that the first message is to be processed by the network entity.

Aspect 13: The method of any of aspects 6 through 12, wherein the first header comprises an identifier of the network entity, an instruction, a measurement, information about the data session, or any combination thereof.

Aspect 14: The method of any of aspects 6 through 13, wherein the logical unit comprises a second network entity, a User Plane Function, or both.

Aspect 15: A method for wireless communications by a logical unit, comprising: receiving a capability message indicating that a network entity supports instructions for a service associated with a radio layer for wireless communication with a UE; establishing a data session associated with a flow between the logical unit and the UE based at least in part on the capability message; transmitting a first message associated with the flow and comprising a main header, a service header associated with a first layer, an indication that the service header is to be processed by the network entity, and an instruction for performing a radio function associated with the service with the UE; and receiving a second message associated with the flow and comprising the main header based at least in part on the first message.

Aspect 16: The method of aspect 15, wherein the indication that the service header is to be processed by the network entity comprises an indication to perform the processing prior to generating a service data unit associated with a radio link control layer, an indication to insert the service header into the first message, or both.

Aspect 17: The method of aspect 16, wherein the service header comprises an identifier of the network entity, a second instruction, a measurement, or any combination thereof.

Aspect 18: The method of any of aspects 15 through 17, wherein the logical unit comprises a second network entity, a User Plane Function, or both.

Aspect 19: A method for wireless communications, comprising: generating a first service data unit associated with a radio link control layer and comprising a first packet, a first main header for the first packet associated with a first layer above the radio link control layer, and a first service header for the first packet associated with a service provided by one or more network entities in a network, wherein each of the first main header and the first service header are associated with a flow between a logical unit and a UE; generating a second service data unit associated with the radio link control layer, the second service data unit comprising a second packet, a second main header associated with the first layer, and a second service header for the second packet associated with the service, wherein each of the second main header and the second service header are associated with the flow between the logical unit and the UE, and wherein the first service header and the second service header are distinct from each other; and outputting one or more messages comprising the first service data unit and the second service data unit.

Aspect 20: The method of aspect 19, further comprising: establishing, with the UE, a data radio bearer, wherein the one or more messages are output by a network entity and are based at least in part on establishing the data radio bearer with the UE.

Aspect 21: The method of any of aspects 19 through 20, further comprising: establishing, with a network entity, a data radio bearer, wherein the one or more messages are output by the UE and is based at least in part on establishing the data radio bearer with the network entity.

Aspect 22: The method of any of aspects 19 through 21, further comprising: obtaining a first message comprising the first packet, the first main header, and the first service header; and modifying the first service header based at least in part on the first message, wherein the first service data unit is generated based at least in part on the modified first service header.

Aspect 23: The method of aspect 22, wherein modifying the first service header comprises updating a timestamp.

Aspect 24: The method of any of aspects 19 through 23, further comprising: obtaining a first message comprising the first packet, the first main header, the first service header, and a third service header associated with a second service; and removing the third service header for generation of the first service data unit such that the first service data unit excludes the third service header.

Aspect 25: The method of any of aspects 19 through 24, further comprising: obtaining a first message comprising the first packet, the first main header, and the first service header; and adding a third service header for generation of the first service data unit such that the first service data unit comprises the third service header, wherein the first message excludes the third service header.

Aspect 26: The method of any of aspects 19 through 25, wherein the first service header, the second service header, or both comprise an instruction.

Aspect 27: The method of aspect 26, wherein the instruction indicates that an acknowledgement is to be sent upon receipt of the one or more messages, that packets associated with the one or more messages are to be reordered according to an arrangement indicated by the instruction, that the packets associated with the one or more messages are to be dropped after a threshold time, that the packets associated with the one or more messages are to be timestamped, or any combination thereof.

Aspect 28: The method of any of aspects 19 through 27, wherein the first service header comprises a reordering timer, a reordering domain, an indication to drop the first packet after the reordering timer expires, an indication to transmit acknowledgement feedback for the first packet, or any combination thereof.

Aspect 29: The method of any of aspects 19 through 28, wherein the first main header and the second main header each comprise a data control flag, a header length, a sequence number, information associated with extension fields, or any combination thereof.

Aspect 30: A method for wireless communications, comprising: communicating a first message that comprises a first service data unit associated with a radio link control layer; deriving, from the first service data unit, a first packet, a first main header for the first packet associated with a first layer above the radio link control layer, and a first service header for the first packet associated with a service provided by one or more network entities in a network, wherein each of the first main header and the first service header are associated with a flow between a logical unit and a UE; generating a second service data unit associated with the radio link control layer and comprising a second packet, a second main header, and a second service header associated with the service, wherein each of the second main header and the second service header are associated with the flow between the logical unit and the UE, wherein the second service header is based at least in part on the first service header and the second service header distinct from the first service header; and communicating a second message that comprises the second service data unit.

Aspect 31: The method of aspect 30, further comprising: establishing, with the UE, a data radio bearer, wherein the first message is communicated, and the second message is output, by a network entity and is based at least in part on establishing the data radio bearer with the UE.

Aspect 32: The method of any of aspects 30 through 31, further comprising: establishing, with a network entity, a data radio bearer, wherein the first message is communicated, and the second message is output, by the UE and is based at least in part on establishing the data radio bearer with the network entity.

Aspect 33: The method of any of aspects 30 through 32, wherein the first service header comprises an instruction, the method further comprising: executing the instruction, wherein generating the second service data unit is based at least in part on the instruction.

Aspect 34: The method of any of aspects 30 through 33, wherein the first service header comprises information about the first packet, a reordering timer, a reordering domain, an indication to drop the first packet after the reordering timer expires, an indication to transmit acknowledgement feedback for the first packet, or any combination thereof.

Aspect 35: The method of any of aspects 30 through 34, wherein the first main header and the second main header each comprise a data control flag, a header length, a sequence number, information associated with extension fields, or any combination thereof.

Aspect 36: A network entity comprising at least one means for performing a method of any of aspects 1 through 5.

Aspect 37: A network entity comprising at least one means for performing a method of any of aspects 6 through 14.

Aspect 38: A logical unit comprising at least one means for performing a method of any of aspects 15 through 18.

Aspect 39: An apparatus comprising at least one means for performing a method of any of aspects 19 through 29.

Aspect 40: An apparatus comprising at least one means for performing a method of any of aspects 30 through 34.

Aspect 41: A network entity, comprising: one or more processors; and one or more memories coupled with the one or more processors and storing processor-executable code that, when executed by the one or more processors, is configured to cause the network entity to: transmit, from the network entity to a logical unit, a capability message that indicates that the network entity supports instructions for a service associated with a radio layer for wireless communication with one or more UEs; establish, with the logical unit, a data session associated with a UE of the one or more UEs based at least in part on the one or more processors being configured to transmit the capability message; receive, from the logical unit, an instruction to perform a radio function associated with the service with the UE based at least in part on the data session; and execute the instruction to perform the radio function at the radio layer.

Aspect 42: The network entity of aspect 41, wherein the processor-executable code, when executed by the one or more processors, is further configured to cause the network entity to: receive a first message comprising the instruction, a packet, and a header; establish, with the UE, a data radio bearer based at least in part on the data session; transmit a second message comprising a first radio link control service data unit based at least in part on the one or more processors being configured to establish the data radio bearer with the UE, wherein the first radio link control service data unit comprises the packet and the header; receive a third message comprising a second radio link control service data unit based at least in part on the second message, wherein the second radio link control service data unit comprises the header and a response for the packet; embed a header in a fourth message, wherein the fourth message comprises a response for the packet; and transmit a fourth message based at least in part on the instruction, and wherein the instruction is executed after the third message is received.

Aspect 43: The network entity of aspect 42, wherein the fourth message comprises a service header associated with a flow between the UE and the logical unit, and the service header comprises a parameter based at least in part on the instruction.

Aspect 44: The network entity of any of aspects 41 through 43, wherein the processor-executable code, when executed by the one or more processors, is further configured to cause the network entity to: receive a first message comprising the instruction and a packet, wherein instruction is executed based at least in part on the first message; establish, with the UE, a data radio bearer based at least in part on the data session; and transmit a second message comprising the packet based at least in part on the one or more processors being configured to establish the data radio bearer with the UE and the instruction, wherein the instruction is executed before the second message is transmitted.

Aspect 45: The network entity of any of aspects 41 through 44, wherein the logical unit comprises a second network entity.

Aspect 46: A network entity, comprising: one or more processors; and one or more memories coupled with the one or more processors and storing processor-executable code that, when executed by the one or more processors, is configured to cause the network entity to: transmit, to a logical unit, a capability message that indicates a service that the network entity supports; establish, with the logical unit, a data session associated with a flow between the logical unit and a UE based at least in part on the one or more processors being configured to transmit the capability message; establish, with the UE, a data radio bearer associated with the flow based at least in part on the data session; receive, from the logical unit, a first message associated with the flow comprising a first header associated with a first layer based at least in part on the data session with the logical unit; generate a radio link control service data unit that comprises a second header associated with the first layer based at least in part on the first header and one or more radio functions of the network entity; and transmit, via the data radio bearer, a second message comprising the radio link control service data unit.

Aspect 47: The network entity of aspect 46, wherein the first message comprises a main header and a first service header associated with a service, and the second message comprises the main header, the first service header, and a second service header associated with a radio function of the network entity.

Aspect 48: The network entity of aspect 47, wherein the processor-executable code, when executed by the one or more processors, is further configured to cause the network entity to: receive, from the logical unit, a plurality of messages comprising the first message, each of the plurality of messages comprising a service header associated with the service; and perform prioritization on the plurality of messages based at least in part on the respective service headers, wherein the second message is transmitted based at least in part on the prioritization.

Aspect 49: The network entity of any of aspects 47 through 48, wherein the processor-executable code, when executed by the one or more processors, is further configured to cause the network entity to: modify the first service header based at least in part on an instruction received from a second logical unit, wherein the second message is transmitted based at least in part on the modified first service header.

Aspect 50: The network entity of any of aspects 47 through 49, wherein the first message comprises a set of service headers comprising the first service header, and wherein the processor-executable code, when executed by the one or more processors, is further configured to cause the network entity to: add a third service header to the second message based at least in part on an instruction received from a second logical unit.

Aspect 51: The network entity of any of aspects 47 through 50, wherein the first message comprises a set of service headers comprising the first service header, the second message comprises a subset of the set of service headers comprising the first service header, and the subset of the set of service headers excludes at least one service header of the set of service headers.

Aspect 52: The network entity of any of aspects 46 through 51, wherein the first header comprises an indication that the first message is to be processed by the network entity prior to generating the radio link control service data unit, and the second header is based at least in part on the indication that the first message is to be processed by the network entity.

Aspect 53: The network entity of any of aspects 46 through 52, wherein the first header comprises an identifier of the network entity, an instruction, a measurement, information about the data session, or any combination thereof.

Aspect 54: The network entity of any of aspects 46 through 53, wherein the logical unit comprises a second network entity, a User Plane Function, or both.

Aspect 55: A logical unit, comprising: one or more processors; and one or more memories coupled with the one or more processors and storing processor-executable code that, when executed by the one or more processors, is configured to cause the logical unit to: receive a capability message indicating that a network entity supports instructions for a service associated with a radio layer for wireless communication with a UE; establish a data session associated with a flow between the logical unit and the UE based at least in part on the capability message; transmit a first message associated with the flow and comprising a main header, a service header associated with a first layer, an indication that the service header is to be processed by the network entity, and an instruction to perform a radio function associated with the service with the UE; and receive a second message associated with the flow and comprising the main header based at least in part on the first message.

Aspect 56: The logical unit of aspect 55, wherein the indication that the service header is to be processed by the network entity comprises an indication to perform the processing prior to generating a service data unit associated with a radio link control layer, an indication to insert the service header into the first message, or both.

Aspect 57: The logical unit of aspect 56, wherein the service header comprises an identifier of the network entity, a second instruction, a measurement, or any combination thereof.

Aspect 58: The logical unit of any of aspects 55 through 57, wherein the logical unit comprises a second network entity, a User Plane Function, or both.

Aspect 59: An apparatus, comprising: one or more processors; and one or more memories coupled with the one or more processors and storing processor-executable code that, when executed by the one or more processors, is configured to cause the apparatus to: generate a first service data unit associated with a radio link control layer and comprising a first packet, a first main header for the first packet associated with a first layer above the radio link control layer, and a first service header for the first packet associated with a service provided by one or more network entities in a network, wherein each of the first main header and the first service header are associated with a flow between a logical unit and a UE; generate a second service data unit associated with the radio link control layer, the second service data unit comprising a second packet, a second main header associated with the first layer, and a second service header for the second packet associated with the service, wherein each of the second main header and the second service header are associated with the flow between the logical unit and the UE, and wherein the first service header and the second service header are distinct from each other; and output one or more messages comprising the first service data unit and the second service data unit.

Aspect 60: The apparatus of aspect 59, wherein the processor-executable code, when executed by the one or more processors, is further configured to cause the apparatus to: establish, with the UE, a data radio bearer, wherein the one or more messages are output by a network entity and are based at least in part on the one or more processors being configured to establish the data radio bearer with the UE.

Aspect 61: The apparatus of any of aspects 59 through 60, wherein the processor-executable code, when executed by the one or more processors, is further configured to cause the apparatus to: establish, with a network entity, a data radio bearer, wherein the one or more messages are output by the UE and is based at least in part on the one or more processors being configured to establish the data radio bearer with the network entity.

Aspect 62: The apparatus of any of aspects 59 through 61, further comprising: one or more transceivers configured to obtain a first message comprising the first packet, the first main header, and the first service header, wherein the one or more processors are further configured to modify the first service header based at least in part on the first message, wherein the first service data unit is generated based at least in part on the modified first service header.

Aspect 63: The apparatus of aspect 62, wherein, to modify the first service header, the processor-executable code, when executed by the one or more processors, is further configured to cause the apparatus to update a timestamp.

Aspect 64: The apparatus of any of aspects 59 through 63, wherein the processor-executable code, when executed by the one or more processors, is further configured to cause the apparatus to: obtain a first message comprising the first packet, the first main header, the first service header, and a third service header associated with a second service; and remove the third service header for generation of the first service data unit such that the first service data unit excludes the third service header.

Aspect 65: The apparatus of any of aspects 59 through 64, wherein the processor-executable code, when executed by the one or more processors, is further configured to cause the apparatus to: obtain a first message comprising the first packet, the first main header, and the first service header; and add a third service header for generation of the first service data unit such that the first service data unit comprises the third service header, wherein the first message excludes the third service header.

Aspect 66: The apparatus of any of aspects 59 through 65, wherein the first service header, the second service header, or both comprise an instruction.

Aspect 67: The apparatus of aspect 66, wherein the instruction indicates that an acknowledgement is to be sent upon receipt of the one or more messages, that packets associated with the one or more messages are to be reordered according to an arrangement indicated by the instruction, that the packets associated with the one or more messages are to be dropped after a threshold time, that the packets associated with the one or more messages are to be time-stamped, or any combination thereof.

Aspect 68: The apparatus of any of aspects 59 through 67, wherein the first service header comprises a reordering timer, a reordering domain, an indication to drop the first packet after the reordering timer expires, an indication to transmit acknowledgement feedback for the first packet, or any combination thereof.

Aspect 69: The apparatus of any of aspects 59 through 68, wherein the first main header and the second main header each comprise a data control flag, a header length, a sequence number, information associated with extension fields, or any combination thereof.

Aspect 70: A apparatus, comprising: one or more processors; and one or more memories coupled with the one or more processors and storing processor-executable code that, when executed by the one or more processors, is configured to cause the apparatus to: communicate a first message that comprises a first service data unit associated with a radio link control layer; derive, from the first service data unit, a first packet, a first main header for the first packet associated with a first layer above the radio link control layer, and a first service header for the first packet associated with a service provided by one or more network entities in a network, wherein each of the first main header and the first service header are associated with a flow between a logical unit and a UE; generate a second service data unit associated with the radio link control layer and comprising a second packet, a second main header, and a second service header associated with the service, wherein each of the second main header and the second service header are associated with the flow between the logical unit and the UE, wherein the second service header is based at least in part on the first service header and the second service header distinct from the first service header; and communicate a second message that comprises the second service data unit.

Aspect 71: The apparatus of aspect 70, wherein the processor-executable code, when executed by the one or more processors, is further configured to cause the apparatus to: establish, with the UE, a data radio bearer, wherein the first message is communicated, and the second message is output, by a network entity and is based at least in part on the one or more processors being configured to establish the data radio bearer with the UE.

Aspect 72: The apparatus of any of aspects 70 through 71, wherein the processor-executable code, when executed by the one or more processors, is further configured to cause the apparatus to: establish, with a network entity, a data radio bearer, wherein the first message is communicated, and the second message is output, by the UE and is based at least in part on the one or more processors being configured to establish the data radio bearer with the network entity.

Aspect 73: The apparatus of any of aspects 70 through 72, wherein the first service header comprises an instruction, and wherein the one or more processors are further configured to: execute the instruction, wherein generation the second service data unit is based at least in part on the instruction.

Aspect 74: The apparatus of any of aspects 70 through 73, wherein the first service header comprises information about the first packet, a reordering timer, a reordering domain, an indication to drop the first packet after the reordering timer expires, an indication to transmit acknowledgement feedback for the first packet, or any combination thereof.

Aspect 75: The apparatus of any of aspects 70 through 74, wherein the first main header and the second main header each comprise a data control flag, a header length, a sequence number, information associated with extension fields, or any combination thereof.

Aspect 76: A non-transitory computer-readable medium storing code for wireless communications by a network entity, the code comprising instructions executable by one or more processors to cause the network entity to: transmit, from the network entity to a logical unit, a capability message that indicates that the network entity supports instructions for a service associated with a radio layer for wireless communication with one or more user equipments (UEs); establish, with the logical unit, a data session associated with a UE of the one or more UEs based at least in part on transmitting the capability message; receive, from the logical unit, an instruction for performing a radio function associated with the service with the UE based at least in part on the data session; and execute the instruction for performing the radio function at the radio layer.

Aspect 77: The non-transitory computer-readable medium of aspect 76, wherein the instructions are further executable by the one or more processors to cause the network entity to: receive a first message comprising the instruction, a packet, and a header; establish, with the UE, a data radio bearer based at least in part on the data session; transmit a second message comprising a first radio link control service data unit based at least in part on establishing the data radio bearer with the UE, wherein the first radio link control service data unit comprises the packet and the header; receive a third message comprising a second radio link control service data unit based at least in part on the second message, wherein the second radio link control service data unit comprises the header and a response for the packet; embed a header in a fourth message, wherein the fourth message comprises a response for the packet; and transmit a fourth message based at least in part on the instruction, and wherein the instruction is executed after receiving the third message.

Aspect 78: The non-transitory computer-readable medium of aspect 77, wherein the fourth message comprises a service header associated with a flow between the UE and the logical unit, the service header comprises a parameter based at least in part on the instruction Aspect 79: The non-transitory computer-readable medium of any of aspects 76 through 78, wherein the instructions are further executable by the one or more processors to cause the network entity to: receiving a first message comprising the instruction and a packet, wherein executing the instruction is based at least in part on the first message; establishing, with the UE, a data radio bearer based at least in part on the data session; transmitting a second message comprising the packet based at least in part on establishing the data radio bearer with the UE and the instruction, wherein the instruction is executed before transmitting the second message.

Aspect 80: The non-transitory computer-readable medium of any of aspects 76 through 79, wherein the logical unit comprises a second network entity.

Aspect 81: A non-transitory computer-readable medium storing code for wireless communications by a network entity, the code comprising instructions executable by one or more processors to cause the network entity to: transmit, to a logical unit, a capability message that indicates a service that the network entity supports; establish, with the logical unit, a data session associated with a flow between the logical unit and a UE based at least in part on transmitting the capability message; establish, with the UE, a data radio bearer associated with the flow based at least in part on the data session; receive, from the logical unit, a first message associated with the flow comprising a first header associated with a first layer based at least in part on the data session with the logical unit; generate a radio link control service data unit that comprises a second header associated with the first layer based at least in part on the first header and one or more radio functions of the network entity; and transmit, via the data radio bearer, a second message comprising the radio link control service data unit.

Aspect 82: The non-transitory computer-readable medium of aspect 81, wherein the first message comprises a main header and a first service header associated with a service, the second message comprises the main header, the first service header, and a second service header associated with a radio function of the network entity Aspect 83: The non-transitory computer-readable medium of aspect 82, wherein the instructions are further executable by the one or more processors to cause the network entity to: receive, from the logical unit, a plurality of messages comprising the first message, each of the plurality of messages comprising a service header associated with the service; and perform prioritization on the plurality of messages based at least in part on the respective service headers, wherein transmitting the second message is based at least in part on the prioritization.

Aspect 84: The non-transitory computer-readable medium of any of aspects 82 through 83, wherein the instructions are further executable by the one or more processors to cause the network entity to: modify the first service header based at least in part on an instruction received from a second logical unit, wherein transmitting the second message is based at least in part on the modified first service header.

Aspect 85: The non-transitory computer-readable medium of any of aspects 82 through 84, wherein the first message comprises a set of service headers comprising the first service header, wherein the instructions are further executable by the processor to: add a third service header to the second message based at least in part on an instruction received from a second logical unit.

Aspect 86: The non-transitory computer-readable medium of any of aspects 82 through 85, wherein the first message comprises a set of service headers comprising the first service header, the second message comprises a subset of the set of service headers comprising the first service header, and the subset of the set of service headers excludes at least one service header of the set of service headers Aspect 87: The non-transitory computer-readable medium of any of aspects 81 through 86, wherein the first header comprises an indication that the first message is to be processed by the network entity prior to generating the radio link control service data unit, and the second header is based at least in part on the indication that the first message is to be processed by the network entity Aspect 88: The non-transitory computer-readable medium of any of aspects 81 through 87, wherein the first header comprises an identifier of the network entity, an instruction, a measurement, information about the data session, or any combination thereof.

Aspect 89: The non-transitory computer-readable medium of any of aspects 81 through 88, wherein the logical unit comprises a second network entity, a User Plane Function, or both.

Aspect 90: A non-transitory computer-readable medium storing code for wireless communications by a logical unit, the code comprising instructions executable by one or more processors to cause the logical unit to: receive a capability message indicating that a network entity supports instructions for a service associated with a radio layer for wireless communication with a UE; establish a data session associated with a flow between the logical unit and the UE based at least in part on the capability message; transmit a first message associated with the flow and comprising a main header, a service header associated with a first layer, an indication that the service header is to be processed by the network entity, and an instruction for performing a radio function associated with the service with the UE; and receive a second message associated with the flow and comprising the main header based at least in part on the first message.

Aspect 91: The non-transitory computer-readable medium of aspect 90, wherein the indication that the service header is to be processed by the network entity comprises an indication to perform the processing prior to generating a service data unit associated with a radio link control layer, an indication to insert the service header into the first message, or both.

Aspect 92: The non-transitory computer-readable medium of aspect 91, wherein the service header comprises an identifier of the network entity, a second instruction, a measurement, or any combination thereof.

Aspect 93: The non-transitory computer-readable medium of any of aspects 90 through 92, wherein the logical unit comprises a second network entity, a User Plane Function, or both.

Aspect 94: A non-transitory computer-readable medium storing code for wireless communications by an apparatus, the code comprising instructions executable by one or more processors to cause the apparatus to: generate a first service data unit associated with a radio link control layer and comprising a first packet, a first main header for the first packet associated with a first layer above the radio link control layer, and a first service header for the first packet associated with a service provided by one or more network entities in a network, wherein each of the first main header and the first service header are associated with a flow between a logical unit and a UE; generate a second service data unit associated with the radio link control layer, the second service data unit comprising a second packet, a second main header associated with the first layer, and a second service header for the second packet associated with the service, wherein each of the second main header and the second service header are associated with the flow between the logical unit and the UE, and wherein the first service header and the second service header are distinct from each other; and output one or more messages comprising the first service data unit and the second service data unit.

Aspect 95: The non-transitory computer-readable medium of aspect 94, wherein the instructions are further executable by the one or more processors to cause the apparatus to: establish, with the UE, a data radio bearer, wherein the one or more messages are output by a network entity and are based at least in part on establishing the data radio bearer with the UE.

Aspect 96: The non-transitory computer-readable medium of any of aspects 94 through 95, wherein the instructions are further executable by the one or more processors to cause the apparatus to: establish, with a network entity, a data radio bearer, wherein the one or more messages are output by the UE and is based at least in part on establishing the data radio bearer with the network entity.

Aspect 97: The non-transitory computer-readable medium of any of aspects 94 through 96, wherein the instructions are further executable by the one or more processors to cause the apparatus to: obtain a first message comprising the first packet, the first main header, and the first service header; and modify the first service header based at least in part on the first message, wherein the first service data unit is generated based at least in part on the modified first service header.

Aspect 98: The non-transitory computer-readable medium of aspect 97, wherein modifying the first service header comprises updating a timestamp.

Aspect 99: The non-transitory computer-readable medium of any of aspects 94 through 98, wherein the instructions are further executable by the one or more processors to cause the apparatus to: obtain a first message comprising the first packet, the first main header, the first service header, and a third service header associated with a second service; and remove the third service header for generation of the first service data unit such that the first service data unit excludes the third service header.

Aspect 100: The non-transitory computer-readable medium of any of aspects 94 through 99, wherein the instructions are further executable by the one or more processors to cause the apparatus to: obtain a first message comprising the first packet, the first main header, and the first service header; and add a third service header for generation of the first service data unit such that the first service data unit comprises the third service header, wherein the first message excludes the third service header.

Aspect 101: The non-transitory computer-readable medium of any of aspects 94 through 100, wherein the first service header, the second service header, or both comprise an instruction.

Aspect 102: The non-transitory computer-readable medium of aspect 101, wherein the instruction indicates that an acknowledgement is to be sent upon receipt of the one or more messages, that packets associated with the one or more messages are to be reordered according to an arrangement indicated by the instruction, that the packets associated with the one or more messages are to be dropped after a threshold time, that the packets associated with the one or more messages are to be timestamped, or any combination thereof.

Aspect 103: The non-transitory computer-readable medium of any of aspects 94 through 102, wherein the first service header comprises a reordering timer, a reordering domain, an indication to drop the first packet after the reordering timer expires, an indication to transmit acknowledgement feedback for the first packet, or any combination thereof.

Aspect 104: The non-transitory computer-readable medium of any of aspects 94 through 103, wherein the first main header and the second main header each comprise a data control flag, a header length, a sequence number, information associated with extension fields, or any combination thereof.

Aspect 105: A non-transitory computer-readable medium storing code for wireless communications by an apparatus, the code comprising instructions executable by one or more processors to cause the apparatus to: communicate a first message that comprises a first service data unit associated with a radio link control layer; derive, from the first service data unit, a first packet, a first main header for the first packet associated with a first layer above the radio link control layer, and a first service header for the first packet associated with a service provided by one or more network entities in a network, wherein each of the first main header and the first service header are associated with a flow between a logical unit and a UE; generate a second service data unit associated with the radio link control layer and comprising a second packet, a second main header, and a second service header associated with the service, wherein each of the second main header and the second service header are associated with the flow between the logical unit and the UE, wherein the second service header is based at least in part on the first service header and the second service header distinct from the first service header; and communicate a second message that comprises the second service data unit.

Aspect 106: The non-transitory computer-readable medium of aspect 105, wherein the instructions are further executable by the one or more processors to cause the apparatus to: establish, with the UE, a data radio bearer, wherein the first message is communicated, and the second message is output, by a network entity and is based at least in part on establishing the data radio bearer with the UE.

Aspect 107: The non-transitory computer-readable medium of any of aspects 105 through 106, wherein the instructions are further executable by the one or more processors to cause the apparatus to: establish, with a network entity, a data radio bearer, wherein the first message is communicated, and the second message is output, by the UE and is based at least in part on establishing the data radio bearer with the network entity.

Aspect 108: The non-transitory computer-readable medium of any of aspects 105 through 107, wherein the first service header comprises an instruction, wherein the instructions are further executable by the processor to: execute the instruction, wherein generating the second service data unit is based at least in part on the instruction.

Aspect 109: The non-transitory computer-readable medium of any of aspects 105 through 108, wherein the first service header comprises information about the first packet, a reordering timer, a reordering domain, an indication to drop the first packet after the reordering timer expires, an indication to transmit acknowledgement feedback for the first packet, or any combination thereof.

Aspect 110: The non-transitory computer-readable medium of any of aspects 105 through 109, wherein the first main header and the second main header each comprise a data control flag, a header length, a sequence number, information associated with extension fields, or any combination thereof.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by one or more processors, firmware, or any combination thereof. If implemented using software executed by one or more processors, the functions may be stored as or transmitted using one or more instructions or code of a computer-readable medium. Other examples and implementations are within the scope of the disclosure and appended claims. For example, due to the nature of software, functions described herein may be implemented using software executed by one or more processors, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

The article "a" as used in the claims shall be understood to refer to one or more than one of the specified components. Thus, the terms "a," "at least one," and "one or more" are to be construed to be interchangeable. Subsequent reference to a component introduced with the article "a" using the terms "the" or "said" shall be construed as referring to any or all of the one or more components. That is, a component introduced with the article "a" shall be understood to mean "one or more components," and referring to "the component" subsequently in the claims shall be understood to be equivalent to referring to "the one or more components, individually or collectively." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity, comprising:

one or more processors; and one or more memories coupled with the one or more processors and storing processor-executable code that, when executed by the one or more processors, is configured to cause the first network entity to:

transmit, from the first network entity, a capability message that indicates that the first network entity supports instructions to perform a radio function for a service that programs a radio layer of a protocol stack for wireless communication with one or more user equipments (UEs);

establish, with a second network entity, a data session associated with a UE of the one or more UEs based at least in part on the one or more processors being configured to transmit the capability message;

receive, at the first network entity, an instruction to perform the radio function for the service with the UE based at least in part on the data session; and execute the instruction to perform the radio function at the radio layer.

2. The first network entity of claim 1, wherein the processor-executable code, when executed by the one or more processors, is further configured to cause the first network entity to:

receive a first message comprising the instruction, a packet, and a header;

establish, with the UE, a data radio bearer based at least in part on the data session;

transmit a second message comprising a first radio link control service data unit based at least in part on the one or more processors being configured to establish the data radio bearer with the UE, wherein the first radio link control service data unit comprises the packet and the header;

receive a third message comprising a second radio link control service data unit based at least in part on the second message, wherein the second radio link control service data unit comprises the header and a response for the packet;

embed the header in a fourth message, wherein the fourth message comprises the response for the packet; and transmit the fourth message based at least in part on the instruction, and wherein the instruction is executed after the third message is received.

3. The first network entity of claim 2, wherein:

the fourth message comprises a service header associated with a flow between the UE and the second network entity, and the service header comprises a parameter based at least in part on the instruction.

4. The first network entity of claim 1, wherein the processor-executable code, when executed by the one or more processors, is further configured to cause the first network entity to:

receive a first message comprising the instruction and a packet, wherein the instruction is executed based at least in part on the first message;

establish, with the UE, a data radio bearer based at least in part on the data session; and transmit a second message comprising the packet based at least in part on the one or more processors being configured to establish the data radio bearer with the UE and the instruction, wherein the instruction is executed before the second message is transmitted.

5. A first network entity, comprising:

one or more processors; and one or more memories coupled with the one or more processors and storing processor-executable code that, when executed by the one or more processors, is configured to cause the first network entity to:

transmit, from the first network entity, a capability message that indicates a service that the first network entity supports;

establish, with a second network entity, a data session associated with a flow between the second network entity and a user equipment (UE) based at least in part on the one or more processors being configured to transmit the capability message;

establish, with the UE, a data radio bearer associated with the flow based at least in part on the data session;

receive, at the first network entity, a first message associated with the flow comprising a first header of a first layer based at least in part on the data session with the second network entity;

generate a radio link control service data unit that comprises a second header of the first layer based at least in part on the first header and one or more radio functions of the first network entity; and transmit, via the data radio bearer, a second message comprising the radio link control service data unit.

6. The first network entity of claim 5, wherein:

the first message further comprises a main header and a first service header associated with a service, and the second message further comprises the main header, the first service header, and a second service header associated with a radio function of the first network entity.

7. The first network entity of claim 6, wherein the processor-executable code, when executed by the one or more processors, is further configured to cause the first network entity to:

receive, at the first network entity, a plurality of messages comprising the first message, each of the plurality of messages comprising a service header associated with the service; and perform prioritization on the plurality of messages based at least in part on respective service headers of each of the plurality of messages, wherein the second message is transmitted based at least in part on the prioritization.

8. The first network entity of claim 6, wherein the processor-executable code, when executed by the one or more processors, is further configured to cause the first network entity to:

modify the first service header based at least in part on an instruction received from a third network entity, wherein the second message is transmitted based at least in part on the modified first service header.

9. The first network entity of claim 6, wherein the first message comprises a set of service headers comprising the first service header, and wherein the processor-executable code, when executed by the one or more processors, is further configured to cause the first network entity to:

add a third service header to the second message based at least in part on an instruction received from a third network entity.

10. The first network entity of claim 7, wherein:

the first message comprises a set of service headers comprising the first service header, the second message comprises a subset of the set of service headers comprising the first service header, and the subset of the set of service headers excludes at least one service header of the set of service headers.

11. The first network entity of claim 5, wherein:

the first header comprises an indication that the first message is to be processed by the first network entity prior to generation of the radio link control service data unit, and the second header is based at least in part on the indication that the first message is to be processed by the first network entity.

12. The first network entity of claim 5, wherein the first header comprises an identifier of the first network entity, an instruction, a measurement, information about the data session, or any combination thereof.

13. A second network entity, comprising:

one or more processors; and one or more memories coupled with the one or more processors and storing processor-executable code that, when executed by the one or more processors, is configured to cause the second network entity to:

receive a capability message indicating that a first network entity supports instructions to perform a radio function for a service that programs a radio layer of a protocol stack for wireless communication with a user equipment (UE);

establish a data session associated with a flow between the second network entity and the UE based at least in part on the capability message;

transmit a first message associated with the flow and comprising a main header, a service header associated with a first layer, an indication that the service header is to be processed by the first network entity, and an instruction to perform the radio function for the service with the UE; and receive a second message associated with the flow and comprising the main header based at least in part on the first message.

14. The second network entity of claim 13, wherein the indication that the service header is to be processed by the first network entity comprises an indication to process the service header prior to generation of a service data unit associated with a radio link control layer, an indication to insert the service header into the first message, or both.

15. The second network entity of claim 14, wherein the service header comprises an identifier of the first network entity, a second instruction, a measurement, or any combination thereof.

16. A method at a first network entity, comprising:

transmitting, from the first network entity, a capability message that indicates that the first network entity supports instructions to perform a radio function for a service that programs a radio layer of a protocol stack for wireless communication with one or more user equipments (UEs);

establishing, with a second network entity, a data session associated with a UE of the one or more UEs based at least in part on transmitting the capability message;

receiving, at the first network entity, an instruction to perform the radio function associated with the service with the UE based at least in part on the data session; and executing the instruction to perform the radio function at the radio layer.

17. The method of claim 16, further comprising:

receiving a first message comprising the instruction, a packet, and a header;

establishing, with the UE, a data radio bearer based at least in part on the data session;

transmitting a second message comprising a first radio link control service data unit based at least in part on establishing the data radio bearer with the UE, wherein the first radio link control service data unit comprises the packet and the header;

receiving a third message comprising a second radio link control service data unit based at least in part on the second message, wherein the second radio link control service data unit comprises the header and a response for the packet;

embedding the header in a fourth message, wherein the fourth message comprises the response for the packet; and transmitting the fourth message based at least in part on the instruction, and wherein the instruction is executed after the third message is received.

18. The method of claim 17, wherein:

the fourth message comprises a service header associated with a flow between the UE and the second network entity, and the service header comprises a parameter based at least in part on the instruction.

19. The method of claim 16, further comprising:

receiving a first message comprising the instruction and a packet, wherein the instruction is executed based at least in part on the first message;

establishing, with the UE, a data radio bearer based at least in part on the data session; and transmitting a second message comprising the packet based at least in part on establishing the data radio bearer with the UE and the instruction, wherein the instruction is executed before the second message is transmitted.

20. A method at a first network entity, comprising:

transmitting, from the first network entity, a capability message that indicates a service that the first network entity supports;

establishing, with a second network entity, a data session associated with a flow between the second network entity and a user equipment (UE) based at least in part on transmitting the capability message;

establishing, with the UE, a data radio bearer associated with the flow based at least in part on the data session;

receiving, at the first network entity, a first message associated with the flow comprising a first header of a first layer based at least in part on the data session with the second network entity;

generating a radio link control service data unit that comprises a second header of the first layer based at least in part on the first header and one or more radio functions of the first network entity; and transmitting, via the data radio bearer, a second message comprising the radio link control service data unit.

21. The method of claim 20, wherein:

the first message comprises a main header and a first service header associated with a service, and the second message comprises the main header, the first service header, and a second service header associated with a radio function of the first network entity.

22. The method of claim 21, further comprising:

receiving, at the first network entity, a plurality of messages comprising the first message, each of the plurality of messages comprising a service header associated with the service; and performing prioritization on the plurality of messages based at least in part on respective service headers for each of the plurality of messages, wherein the second message is transmitted based at least in part on the prioritization.

23. The method of claim 21, further comprising:

modifying the first service header based at least in part on an instruction received from a third network entity, wherein the second message is transmitted based at least in part on the modified first service header.

24. The method of claim 21, wherein the first message comprises a set of service headers comprising the first service header, the method further comprising:

adding a third service header to the second message based at least in part on an instruction received from a third network entity.

25. The method of claim 21, wherein:

the first message comprises a set of service headers comprising the first service header, the second message comprises a subset of the set of service headers comprising the first service header, and the subset of the set of service headers excludes at least one service header of the set of service headers.

26. The method of claim 20, wherein:

the first header comprises an indication that the first message is to be processed by the first network entity prior to generation of the radio link control service data unit, and the second header is based at least in part on the indication that the first message is to be processed by the first network entity.

27. The method of claim 20, wherein the first header comprises an identifier of the first network entity, an instruction, a measurement, information about the data session, or any combination thereof.

* * * * *